United States Patent
Takeda et al.

(10) Patent No.: US 7,658,885 B2
(45) Date of Patent: Feb. 9, 2010

(54) MICROPUMP, MICROPUMP UNIT INCLUDING THE MICROPUMP, SAMPLE PROCESSING CHIP FOR USE WITH THE UNIT, AND SHEET CONNECTOR FOR USE WITH THE UNIT

(75) Inventors: Masatoshi Takeda, Kasuya-Gun (JP); Kenichi Nakano, Fukuoka (JP)

(73) Assignee: Panasonic Corporation, Osaka (JP)

( * ) Notice: Subject to any disclaimer, the term of this patent is extended or adjusted under 35 U.S.C. 154(b) by 1021 days.

(21) Appl. No.: 10/734,568

(22) Filed: Dec. 15, 2003

(65) Prior Publication Data

US 2004/0155211 A1 Aug. 12, 2004

(30) Foreign Application Priority Data

Dec. 18, 2002 (JP) .......................... P2002-366567
Jan. 7, 2003 (JP) .......................... P2003-000949
Jan. 8, 2003 (JP) .......................... P2003-002051

(51) Int. Cl.
*G01N 33/00* (2006.01)
(52) U.S. Cl. .......................... 422/83; 422/99; 422/103; 422/104
(58) Field of Classification Search .................. 422/83, 422/99, 103, 104
See application file for complete search history.

(56) References Cited

U.S. PATENT DOCUMENTS 6,283,440 B1 * 9/2001 Evans .......................... 251/11

6,309,043 B1 10/2001 Lerat et al.

FOREIGN PATENT DOCUMENTS

| JP | 5306683 | 11/1993 |
|---|---|---|
| JP | 8295400 | 11/1996 |
| JP | 200227984 | 1/2002 |
| WO | 0032972 | 6/2000 |

OTHER PUBLICATIONS

European Search Report dated Feb. 21, 2005.
Patent Abstracts of Japan, vol. 1997, No. 3, Mar. 31, 1997.
S. Bohm, et al., "An Integrated Micromachined Electrochemical Pump and Dosing System," Biomedical Microdevices, vol. 1, No. 2, XP002315583, pp. 121-130, 1999.

* cited by examiner

*Primary Examiner*—Sam P Siefke
(74) *Attorney, Agent, or Firm*—Dickinson Wright, PLLC

(57) ABSTRACT

The present invention relates to a device which is to be utilized at the time of observation of a mixed state or a chemically-combined state of a mixture attained by mixing together trace amounts of gases or trace amounts of liquids or mixing a trace amount of a gas with a trace amount of liquid. A micropump 1 comprises a pump structural material having a reaction chamber formed therein; a reaction agent 4 which is housed in a reaction chamber 6 and produces a gas of predetermined pressure; reaction initiation means 5 which is disposed beside the reaction agent and causes the reaction agent to produce a gas; and a channel 7 which is provided in the pump structural material and guides the gas of predetermined pressure produced by the reaction agent from the reaction chamber to an outlet port. The pump structural material and the reaction initiation means are stacked one on top of the other.

13 Claims, 29 Drawing Sheets

X-X

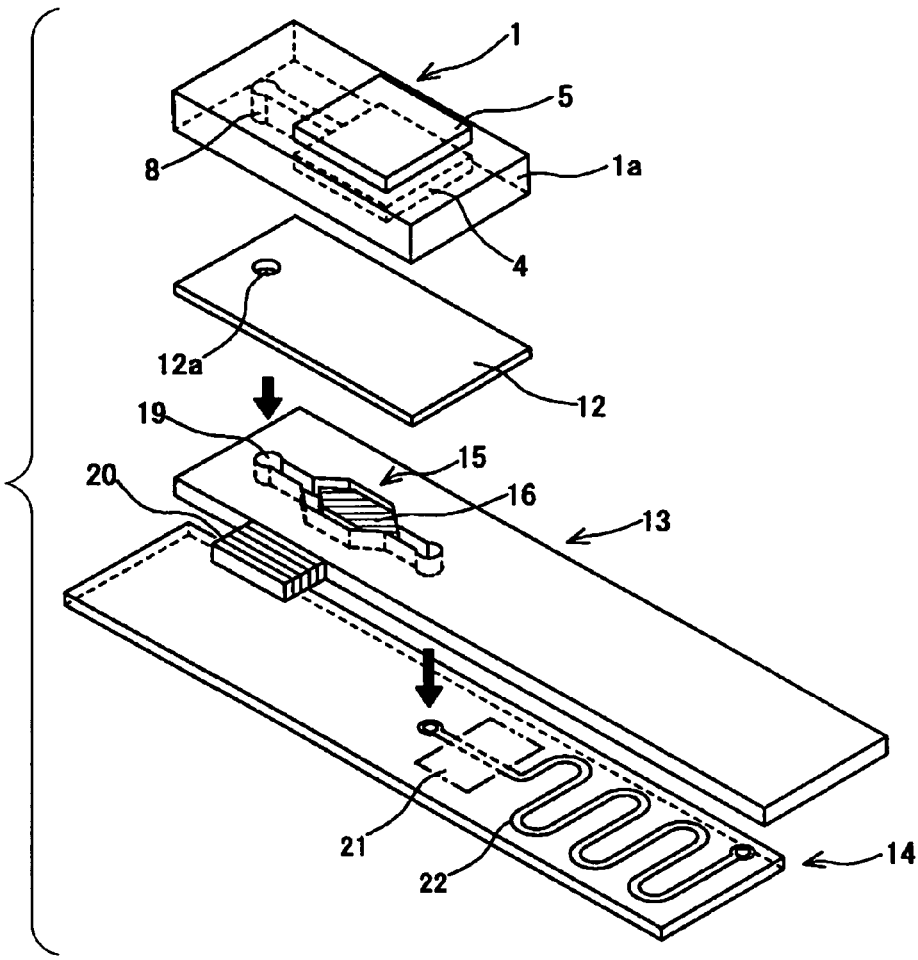
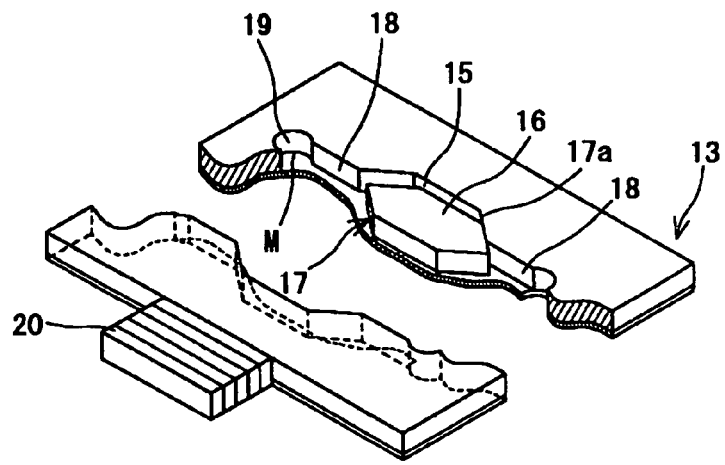
FIG. 3 (a)
FIG. 3 (b)

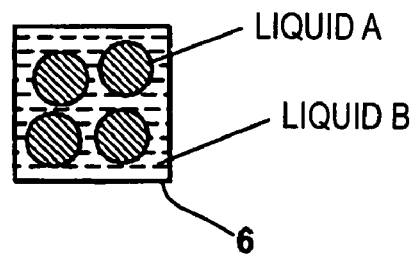
FIG. 9 (a)
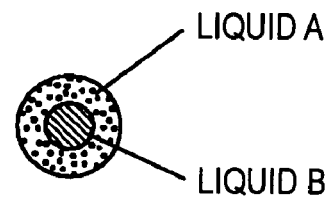
FIG. 9 (b)
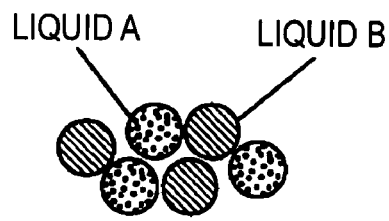
FIG. 9 (c)
FIG. 9 (d)
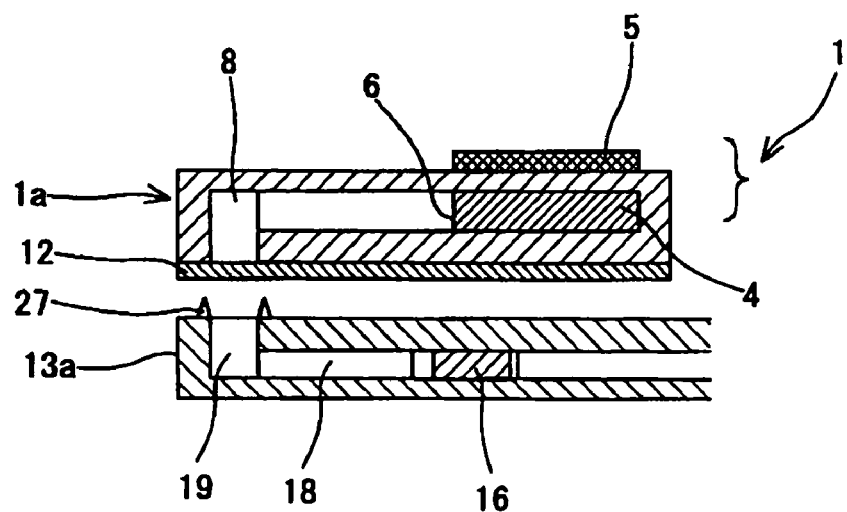

X-X

ENLARGED SECTION A

ENLARGED SECTION A

ENLARGED SECTION A

MICROPUMP, MICROPUMP UNIT
INCLUDING THE MICROPUMP, SAMPLE
PROCESSING CHIP FOR USE WITH THE
UNIT, AND SHEET CONNECTOR FOR USE
WITH THE UNIT

CROSS REFERENCE TO RELATED
APPLICATION

This application is based upon and claims the benefit of priority of Japanese Patent Application No P2002-366567 filed on Dec. 18, 2002 and Japanese Patent Application No P2003-000949 filed on Jan. 7, 2003, and Japanese Patent Application No P2003-002051 filed on Jan. 8, 2003 the contents of which are incorporated herein by reference in its entirety.

BACKGROUND OF THE INVENTION

1. Field of the Invention

The present invention relates to a device utilized at the time of mixing together trace amounts of gases, trace amounts of liquids, or trace amounts of gas and liquid and observing a mixed state or a combined state of the resultant mixture.

2. Description of the Related Art

Recent progress in nanotechnology and ultramicro processing techniques is remarkable, and combination of these technologies is henceforth expected to evolve into various applications.

A technology pertaining to a micro-electromechanical system (MEMS) into which a semiconductor chip and a microactuator are assembled; that is, a so-called micromachine, gains attention as one of such merged technologies. This MEMS technology is for packaging, in a chip measuring millimeters per side, an LSI and an actuator which performs actual work. Combination of a microhydraulic circuit and an LSI circuit is expected to yield another amalgam.

Such a conventional chip, or the like, is a mere incorporation, on a substrate in an easily-mountable arrangement, of a micropump, channels thereof, sensors, microvalves, and an LSI circuit to be used for activating them. In other words, the chip is to be discarded after a single use. The channels have flow passages which are essentially on the order of micrometers to hundreds of micrometers. The micropump is basically influenced by the size of the flow passages. Accordingly, the micropump must assume a ultrafine structure isolated from the structure of an ordinary pump. Further, the micropump must be slim so as to be mounted on a chip. Although the micropump is ultra small, the pump must have superior transfer ability and responsiveness. If control of the micropump is neither easy nor accurate, the pump cannot be used as an element for the hydraulic circuit. Moreover, a high sealing characteristic must be maintained before, during, and after mounting of the micropump, and the micropump must be easy to assemble.

For these reasons, a pump using a piezoelectric element has been proposed as such a micropump, and a method for manufacturing the pump has also been proposed (see JP-A-5-306683).

FIG. 27 is a block diagram of the conventional micropump. In FIG. 27, reference numeral 401 designates a silicon substrate; 402 designates a thermal oxide film; 403, 404 designate glass substrates; 405 designates a piezoelectric element; 406 designates a pipe; 407 designates a thin layer of sodium chloride; and 408 designates influent fluid.

This micropump has a structure embodied by sandwiching the silicon substrate 401 between the glass substrates 403, 404 or the like, wherein a diaphragm, flow passages, and a valve section are fabricated on the silicon substrate 401. Improvements in priming and debubbling characteristics of liquid and continuation of stable action after lapse of time must be attained. For these reasons, after fabrication of the micropump, liquid containing at least one kind of water-soluble salt or polyhydric alcohol is injected into the pump, and the pump is then dried in order to cause the substances to adhere to an interior surface of the micropump. The water-soluble salts or polyhydric alcohols adhering to the interior surface portion have wettability against a water solution, and hence inflow of liquid into the pump can be performed with considerable ease, thereby improving the ability to discharge bubbles.

However, the micropump performs a pumping action by means of actuating the minute diaphragm formed in the silicon substrate 401 through use of the micro-piezoelectric element 405. Hence, there are achieved only a small pumping characteristic, a low delivery pressure, and low discharge capacity. The piezoelectric element 405 is mounted on the silicon substrate 401. If liquid to be ejected is changed while such a pump having a fine and complicated structure is used, the entire micropump must be discarded, because cleansing of the inside of the pump is not easy, and would incur high running costs.

The size of the micropump is also basically dominated by the size of the piezoelectric element. An attempt to increase the stroke of the diaphragm through use of a piezoelectric element also encounters a limitation. Increasing the delivery pressure and the discharge capacity requires another drive source. For this reason, attention has been paid to an electrochemical-cell-drive pump which generates a gas by means of electrochemical reaction (see JP-A-8-295400).

FIG. 28 is a block diagram of a conventional electrochemical-cell-drive pump.

In FIG. 28, reference numeral 511 designates a first sheet; 512 designates a second sheet; 513 designates a third sheet; 514 designates a first chamber; 515 designates a second chamber; 516 designates fluid stored in the first chamber 514; 517 designates a fluid supply port attached to the first chamber 514; 518 designates a gas inlet pipe attached to the second chamber 515; 519 designates an electrochemical cell; 520 designates a power source; and 521 designates a switch.

This conventional electrochemical-cell-drive pump is constituted of a bag-shaped member and the electrochemical cell 519, wherein the bag-shaped member is constituted of three sheets; that is, the first sheet 511, the second sheet 512, and the third sheet 513. The first sheet 511 is given rubber elastic stress larger than that of the third sheet 513, and the third sheet 513 is given rubber elastic stress larger than that of the second sheet 512. The first sheet 511 and the second sheet 512 constitute the first chamber 514 serving as a fluid storage section, and the second sheet 512 and the third sheet 513 constitute the second chamber 515 serving as a gas pressurizing section. The first chamber 514 is equipped with the fluid ejection port 517. A gas produced as a result of application of a d.c. current to the electrochemical cell 519 is introduced into the second chamber 515, thereby discharging fluid from the fluid ejection port 517.

The conventional electrochemical-cell-drive pump provides a compact, lightweight fluid supply device having superior usability and operability. However, the conventional electrochemical-cell-drive pump basically fails to have a structure suitable for mounting the pump on a chip. Hence, adoption of this electrochemical-cell-drive pump as a micropump is difficult.

In addition to the pump, a microreactor chip for chemosynthesis purpose has also been proposed heretofore (see JP-A-2002-27984). FIG. 29 is a block diagram of a conventional microreactor chip for chemosynthesis.

In FIG. 29, reference numeral 630 designates a microreactor chip for chemosynthesis; 631 designates a chip substrate; 631a designates a surface layer; 632 designates a thin film member; 633 designates an aperture section; and 634 designates a flow passage.

The chip substrate 631 constituting the conventional microreactor chip 630 for chemosynthesis is formed from material to be readily processed. However, the surface layer 631a, whose material does not cause chemical reaction with a sample flowing through the flow passage 634, is formed over the surface of the chip substrate 631 on which the thin film member 632 is to be affixed (i.e., the surface which comes into contact with a sample) so as to avoid exertion of an influence on synthetic reaction. The thin film member 632 is set to the same plane size as that of the chip substrate 631, and the thickness of the thin film member 632 is set within the range of 3 μm to 500 μm. Further, one surface of the thin film member 632 is coated with an adhesive, and the thus-coated surface of the thin film member 632 is affixed to the chip substrate 631. The aperture section 633 is formed so as to penetrate through the thin film member 632, by means of laser processing or punching.

SUMMARY OF THE INVENTION

The present invention aims at providing a micropump which can be formed in a chip module in a microstructure; which has superior ease of transport, a superior sealing characteristic, and superior responsiveness; and which enables sliming, recycling, and easy assembly.

The present invention also aims at providing a micropump unit which enables placement and handling of the micropump.

The present invention also aims at providing a sample processing chip which enables combination of the micropump or micropump unit with another chip module in the form of a chip module.

The micropump of the invention comprises a pump structural material having a reaction chamber formed therein; a reaction agent which is housed in the reaction chamber and generates a gas of predetermined pressure; reaction initiation means which is disposed beside the reaction agent and causes the reaction agent to generate a gas; and a channel which is provided in the pump structural material and leads a gas of predetermined pressure produced by the reaction agent from a reaction chamber to an outlet port, wherein the pump structural material and the reaction initiation means are stacked one on top of the other.

By means of this configuration, the present invention can facilitate assembly of a micropump which can be formed on a chip with a microstructure; which has a superior ease of transport, a superior sealing characteristic, and superior responsiveness; and which can be made slim and recycled.

Another micropump of the invention is characterized by having a pump structural material having a reaction chamber formed therein, a reaction agent which is housed in the reaction chamber and generates a gas of predetermined pressure, a reaction initiation section for causing the reaction agent to generate a gas, a channel which is provided in the pump structural material and introduces the gas of predetermined pressure produced by the reaction agent to an outlet port from the reaction chamber, and a control section for controlling operation of the reaction start section, the reacted gas being supplied to the other chip when the pump structural material is combined with another chip, the micropump comprising: recognition means which outputs a match signal only when a match exists between the pump structural material and another chip in terms of a position and/or a combination.

By means of such a configuration, a micropump can be formed in a micro-chip-module. The reaction agent is controlled by a reaction start section, and hence a predetermined characteristic can be stably achieved by means of easy control. Since the recognition means determines whether or not a match exists between another chip and the structure pump material in terms of a position and a combination, erroneous placement of another chip or occurrence of a faulty operation are prevented, and hence the micropump is safe and economical.

The sheet connector of the invention is characterized in that the sheet connector is interposed between chips to establish communication between flow passages and in that a group of pores are formed in the sheet connector so as to penetrate through the sheet in a direction in which fluid flows. Migration of fluid is allowed only in an area of the sheet connector where fluid flows, and the remaining area of the sheet connector acts as a seal.

Another micropump of the invention is a micropump having a pump structural material having a reaction chamber formed therein, a reaction agent which is housed in the reaction chamber and generates a gas of predetermined pressure, a reaction initiation section which is provided beside the reaction agent and causes the reaction agent to generate a gas, a channel which is provided in the pump structural material and introduces the gas of predetermined pressure produced by the reaction agent to an outlet port from the reaction chamber, and a control section for controlling operation of the reaction start section, the micropump comprising: detection means provided in the channel or the reaction chamber for detecting the pressure or flow rate of the gas, wherein a signal detected by the detection means is delivered to the control section, and the control section controls the reaction start section such that the pressure or flow rate approaches a target level in accordance with a signal.

By means of such a configuration, the detection means detects the pressure or flow rate of the gas and performs feedback control such that the pressure or flow rate approaches a predetermined target level. Hence, control can be carried out such that the pressure and flow rate have predetermined stable characteristics. The reaction start section and the reaction agent are stacked into a microstructure, and hence reaction for generating a gas can be performed at high speed. Since the micropump has superior responsiveness and great transport power and can be slimmed, assembly of the micropump by stacking the micropump on another chip is easy. The reaction start section is stacked as a separate member, and hence the micropump can be recycled.

A micropump unit of the invention has a pump structure material having a plurality of independent micropumps formed therein and enables the respective micropumps to be employed solely or in combination. Since the micropumps are provided independently, a plurality of samples are supplied through use of one chip so as to react with each other, and the result of reaction can be detected. The respective micropumps have microstructures and can be assembled into a chip module, thereby achieving superior responsiveness, a reduction in thickness, recycling, and easy assembly.

A sample processing chip of the invention has the micropump; a flow passage control chip which is stacked on the micropump, and supplies a sample by means of the gas ejected from the micropump, thereby controlling a flow passage; and a processing chip for processing the sample supplied from the flow passage control chip. The micropump, the flow passage control chip, and the processing chip are stacked one on top of the other and can be made compact, slim, and easy to process.

BRIEF EXPLANATIONS OF THE DRAWINGS

FIG. 3A is an exploded perspective view of a sample processing chip on which micropumps according to a second embodiment of the invention are stacked;

FIG. 3B is a fragmentary broken enlarged view of a flow passage control chip constituting the sample processing chip shown in FIG. 3A;

FIG. 9A is a descriptive view of a case where a microcapsule having liquid enclosed therein is dispersed within liquid;

FIG. 9B is a descriptive view of a case where a microcapsule having liquid enclosed therein is doubly placed in a microcapsule with liquid;

FIG. 9C is a descriptive view of a case where two types of microcapsules, each having liquid enclosed therein, are mixed together;

FIG. 9D is a descriptive view of a case where sealing material of the micropump is broken so as to establish mutual communication when the micropump is in use;

Figure 18:
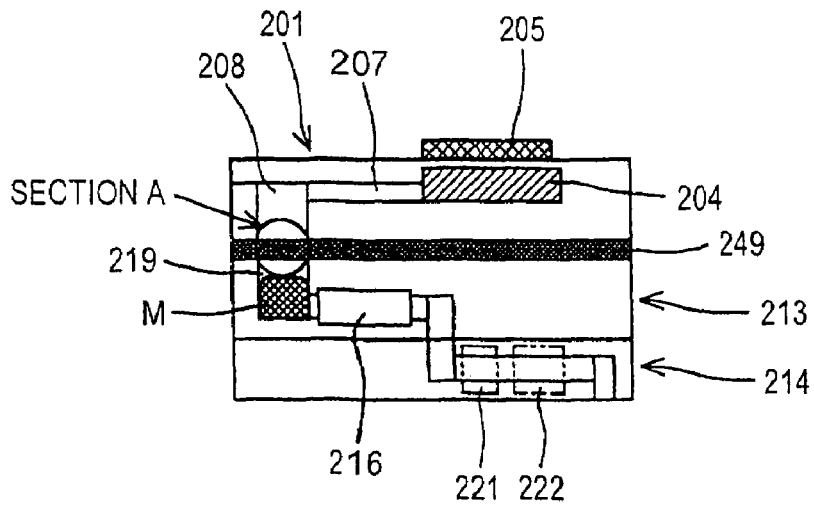
FIG. 18A is a descriptive view of the micropump according to the tenth embodiment of the invention and a sheet connector of a sample processing chip on which the micropumps are stacked.
FIG. 18B is an enlarged view of a section A which can prevent back flow in one direction through use of the sheet connector shown in FIG. 18A.
FIG. 18C is an enlarged view of the section A which enables easy passage of a gas when bi-directional gas pressure acts on the sheet connector.
Figure 18:
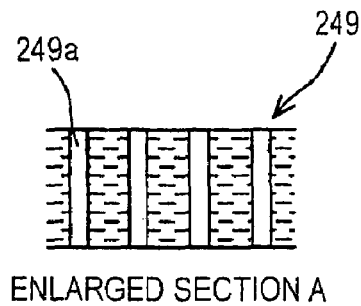
Figure 18:
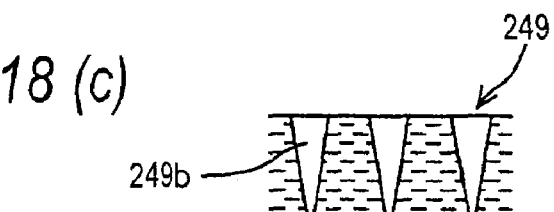
Figure 18:
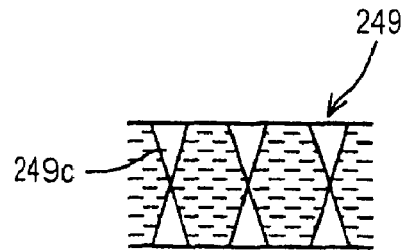
Figure 19:
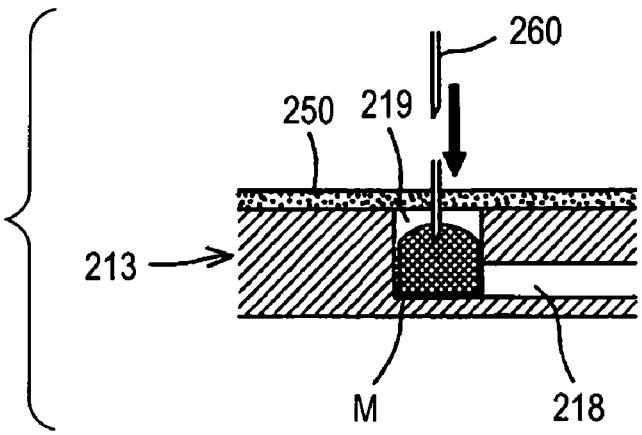
Figure 19:
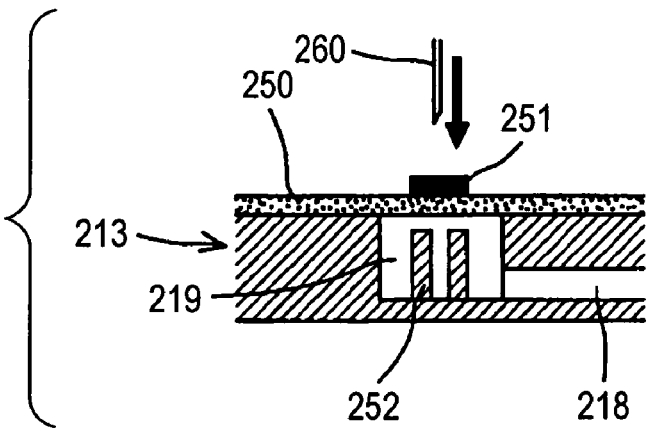
Figure 19:
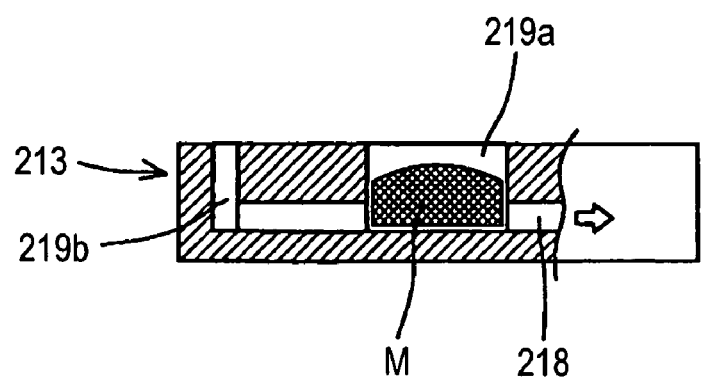
Figure 20:
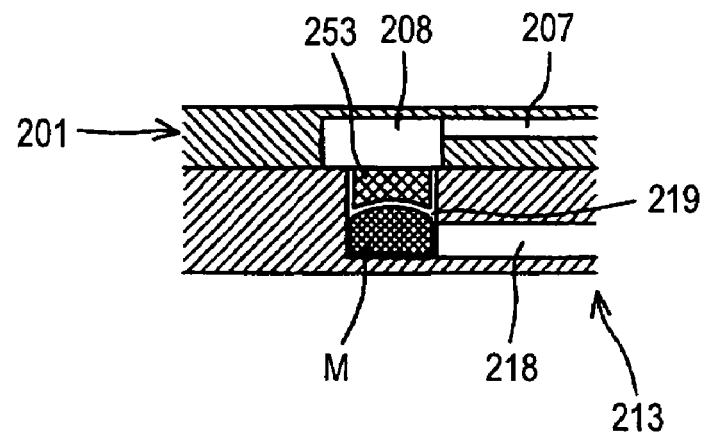
Figure 20:
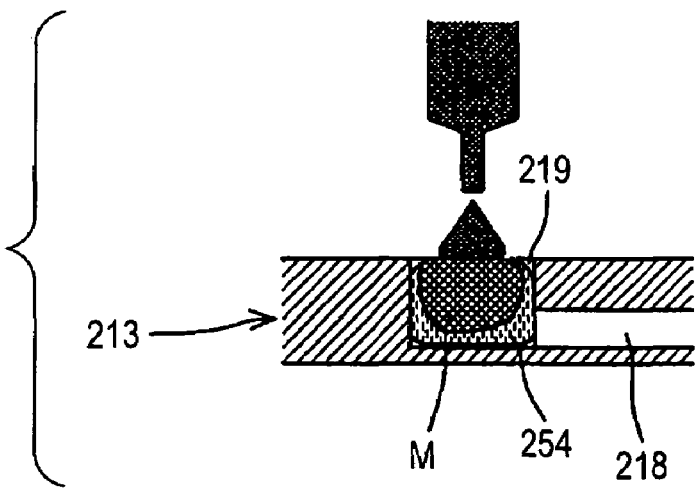
Figure 20:
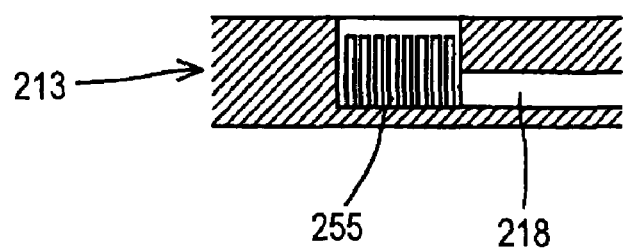
Figure 21:
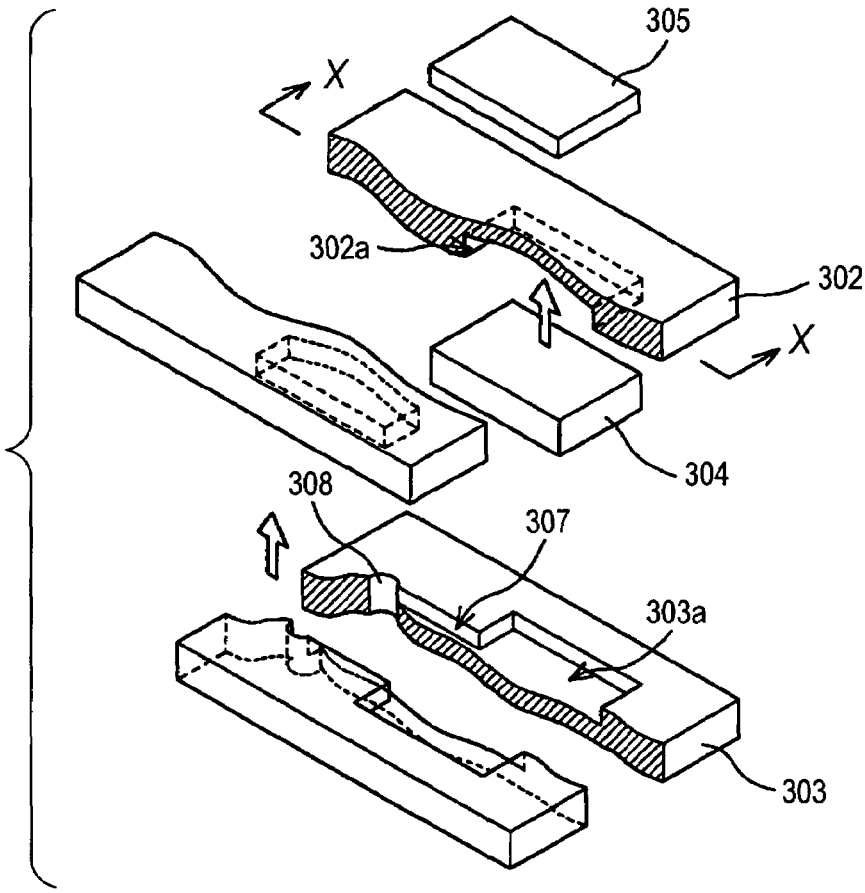
Figure 21:
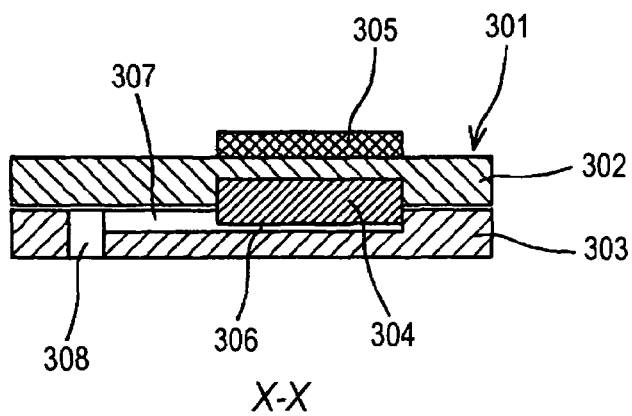
Figure 22:
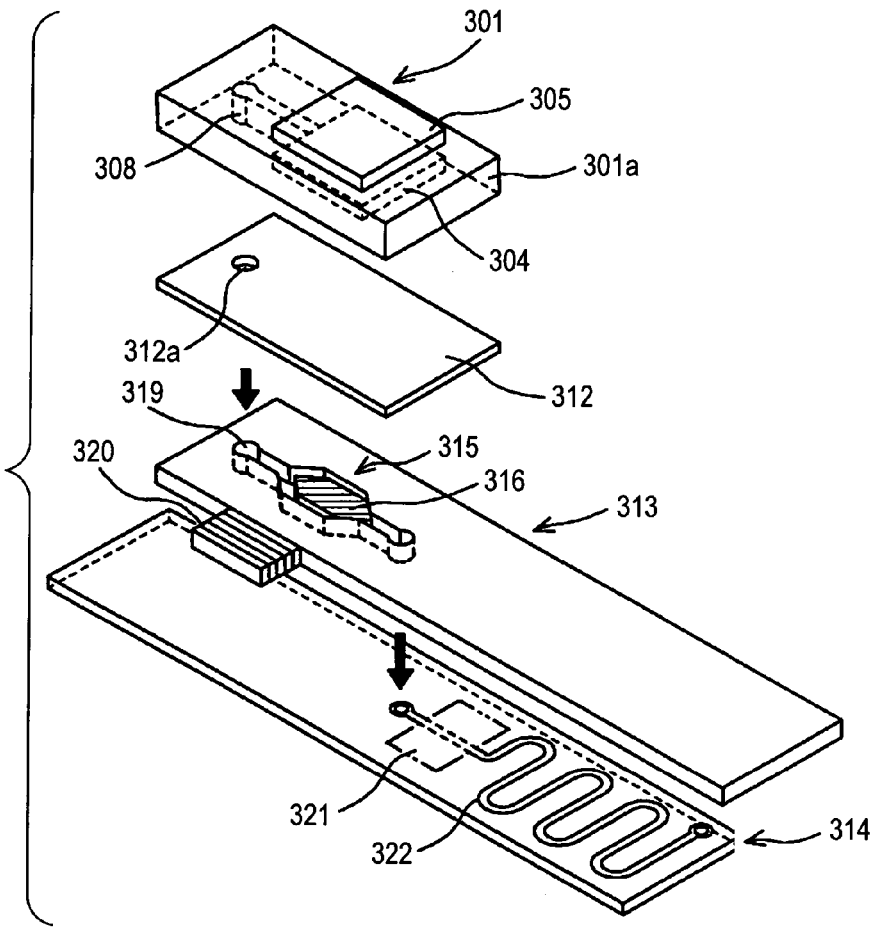
Figure 22:
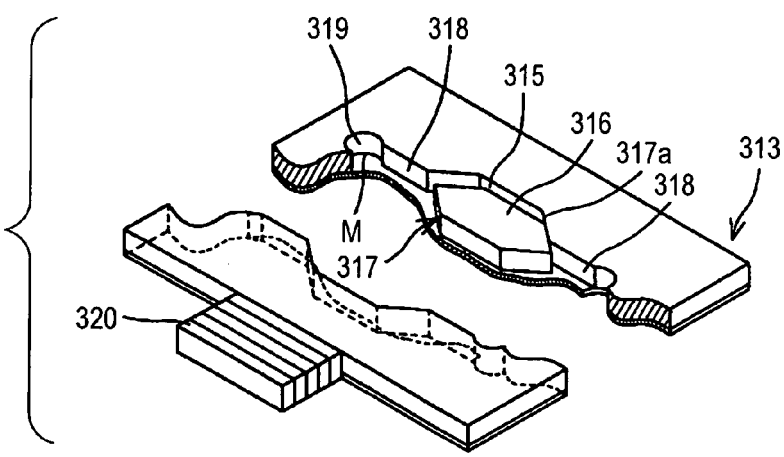
Figure 23:
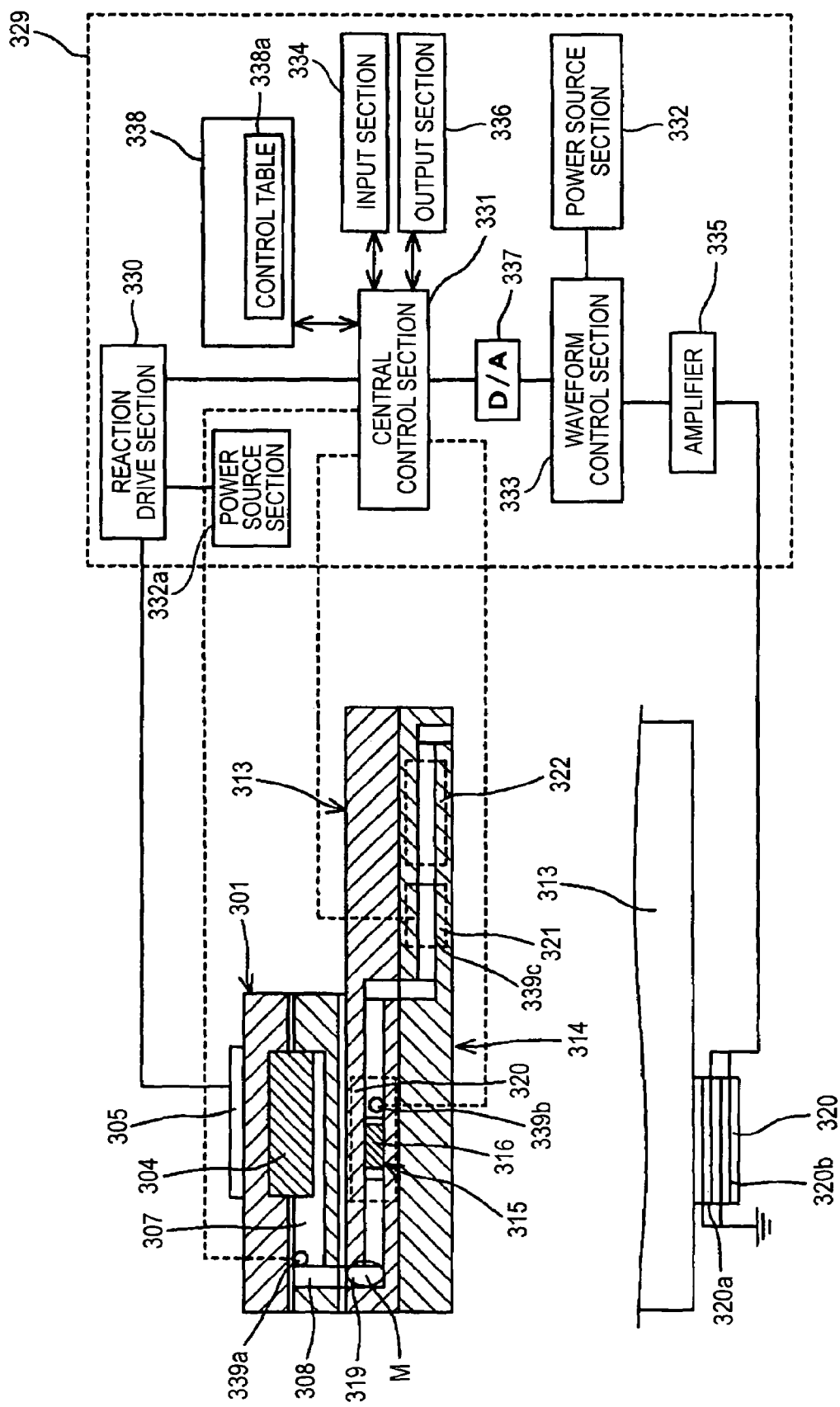
Figure 25:
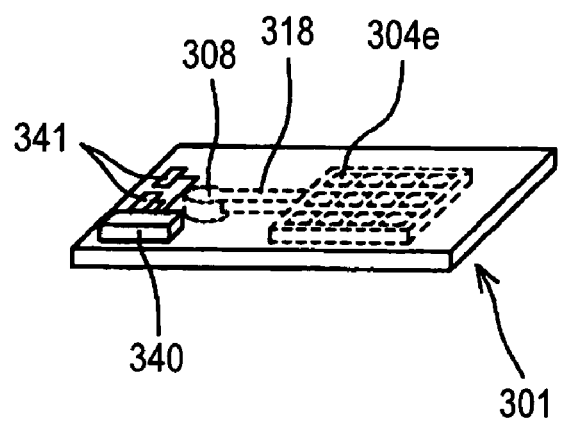
Figure 25:
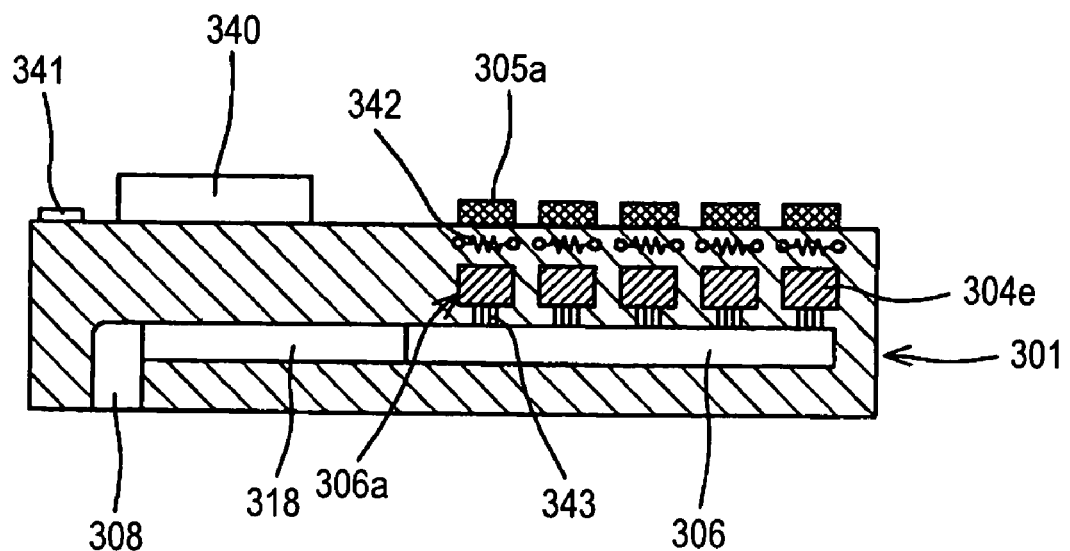
Figure 26:
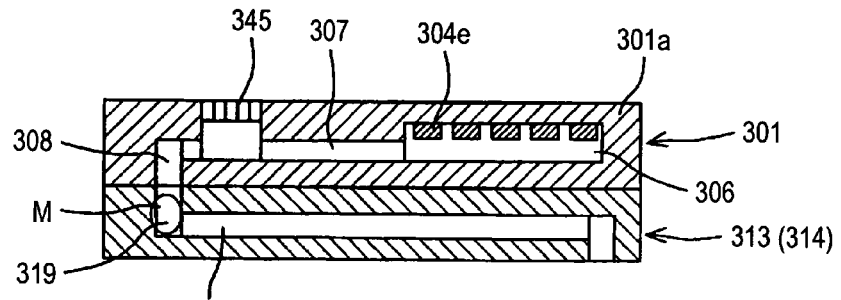
Figure 26:
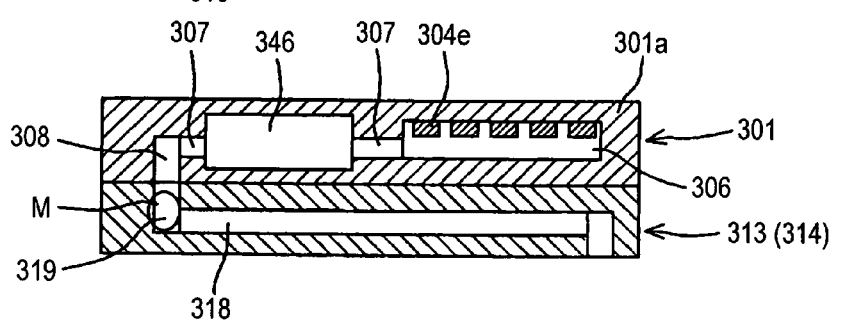
Figure 26:
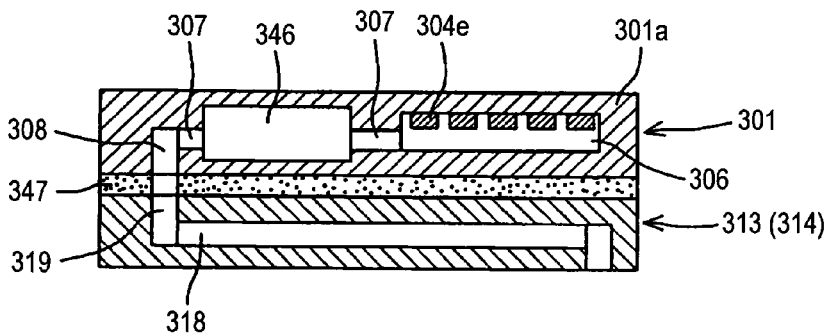
Figure 26:
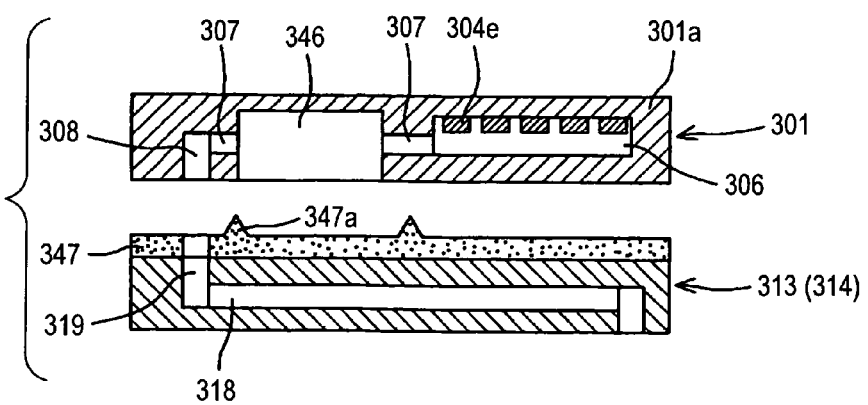
Figure 27:
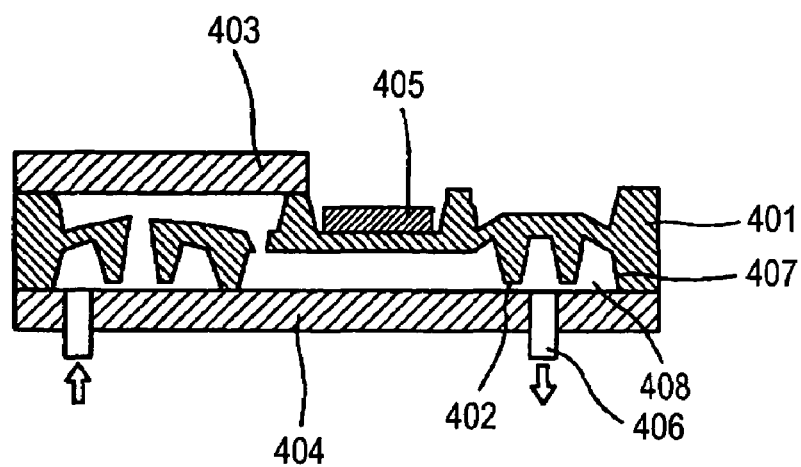
Figure 28:
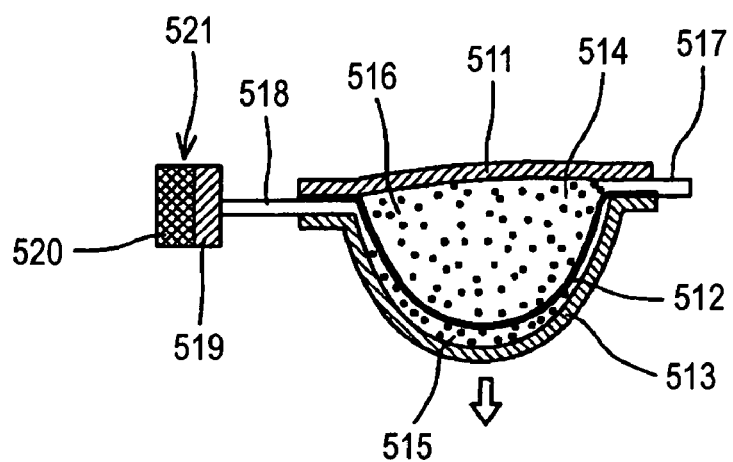
Figure 29:
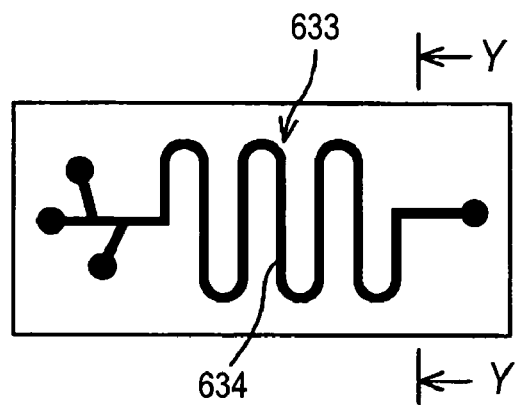
Figure 29:
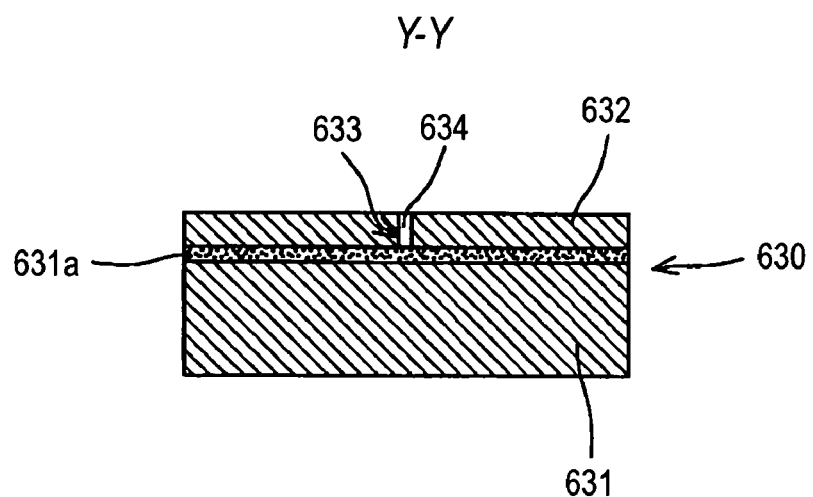

FIG. 18D designates barrel-shaped micropores in which the cross-sectional area of the flow passage becomes reduced and again becomes larger toward the flow passage control chip;

FIG. 19A is a descriptive view of a first contamination prevention configuration of a sample processing chip according to an eleventh embodiment of the invention;

FIG. 19B is a descriptive view of a second contamination prevention configuration of a sample processing chip according to the eleventh embodiment of the invention;

FIG. 19C is a descriptive view of a third contamination prevention configuration of a sample processing chip according to the eleventh embodiment of the invention;

FIG. 20A is a descriptive view of a fourth contamination prevention configuration of a sample processing chip according to a twelfth embodiment of the invention;

FIG. 20B is a descriptive view of a fifth contamination prevention configuration of a sample processing chip according to the twelfth embodiment of the invention;

FIG. 20C is a descriptive view of a sixth contamination prevention configuration of a sample processing chip according to the twelfth embodiment of the invention;

FIG. 21A is an exploded perspective view of a micropump according to a thirteenth embodiment of the invention;

FIG. 21B is a cross-sectional view of the micropump taken along line X-X in FIG. 21A;

FIG. 22A is an exploded perspective view of a sample processing chip on which the micropumps according to the first embodiment of the invention are stacked;

FIG. 22B is a fragmentary broken enlarged view of a flow passage control chip constituting the sample processing chip shown in FIG. 22A;

FIG. 23 is a view showing the micropump according to the first embodiment of the invention and a controller of a sample processing chip on which the micropumps are stacked;

FIGS. 24A to 24C are descriptive views of a reaction agent and a reaction chamber, which are provided in a micropump according to the second embodiment of the invention;

FIG. 25A is an external view of a memory section for a pre-used reaction agent of the micropump according to the second embodiment of the invention;

FIG. 25B is a descriptive view of a memory mechanism of the micropump according to the second embodiment of the invention;

FIG. 26A is a descriptive view of a first constant pressure configuration according to the third embodiment of the invention;

FIG. 26B is a descriptive view of a second constant pressure configuration according to the third embodiment of the invention;

FIG. 26C is a descriptive view of a first decompression configuration according to the third embodiment of the invention;

FIG. 26D is a descriptive view of a second decompression configuration according to the third embodiment of the invention;

FIG. 27 is a block diagram of a conventional micropump;

FIG. 28 is a block diagram of a conventional electrochemical-cell-drive pump; and FIG. 29 is a block diagram of a conventional microreactor chip for chemosynthesis.

DESCRIPTION OF THE PREFERRED EMBODIMENTS

A first embodiment group of the invention will be described herein below. Embodiments of the invention will now be described by reference to FIGS. 1 through 6.

First Embodiment

Figure 1A:
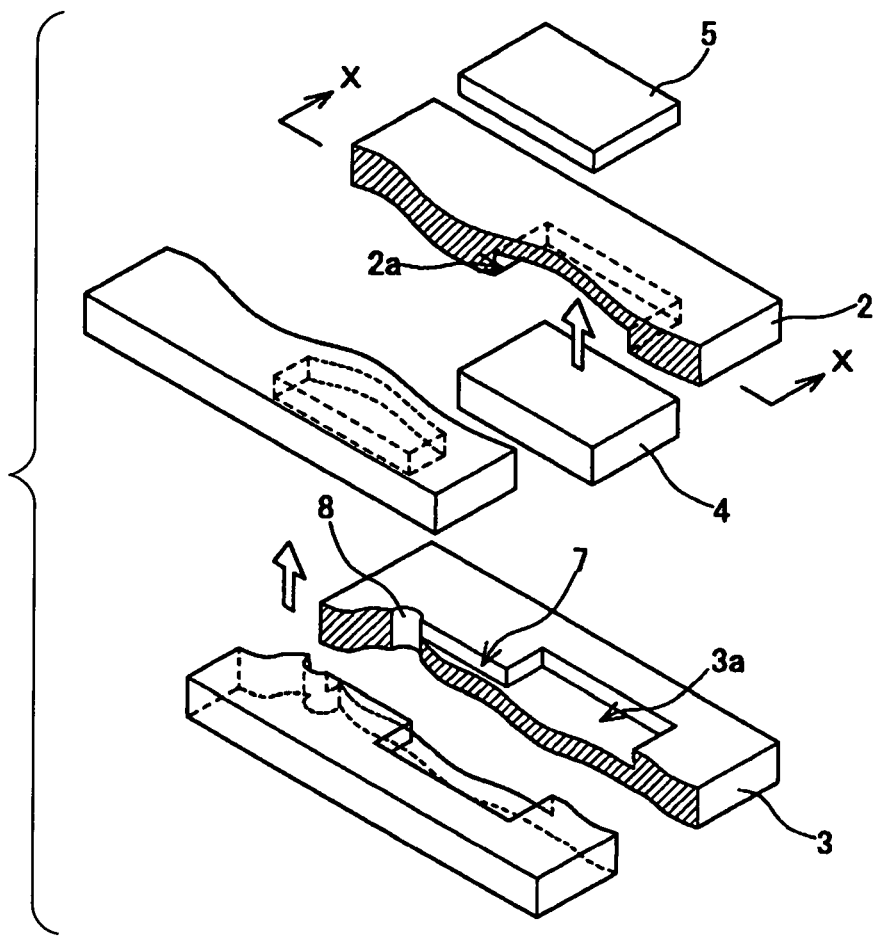
FIG. 1A is an exploded descriptive view of a micropump according to a first embodiment of the invention.
Figure 1B:
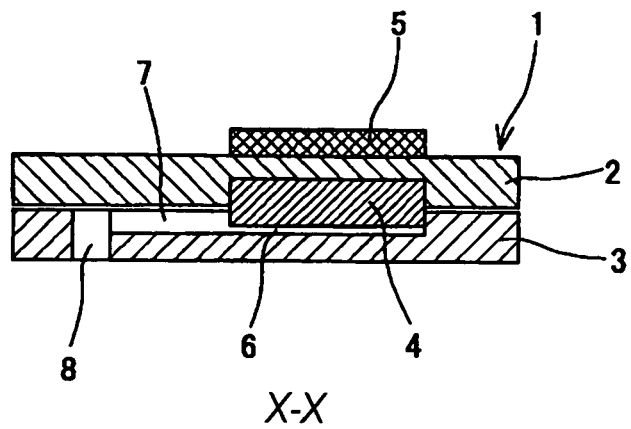
FIG. 1B is a cross-sectional view of the micropump shown in FIG. 1A taken along line X-X.
Figure 2:
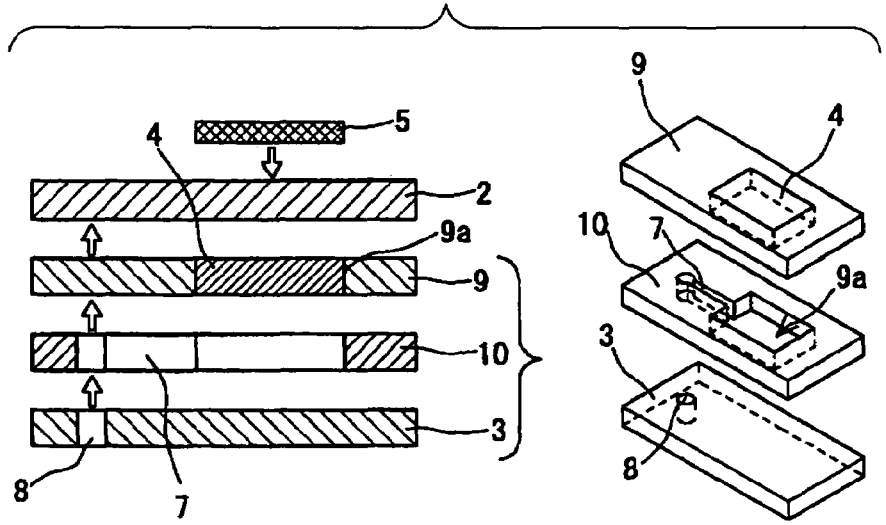
FIGS. 2A to 2D are exploded descriptive views of another configuration of the micropump according to the first embodiment of the invention.
Figure 2:
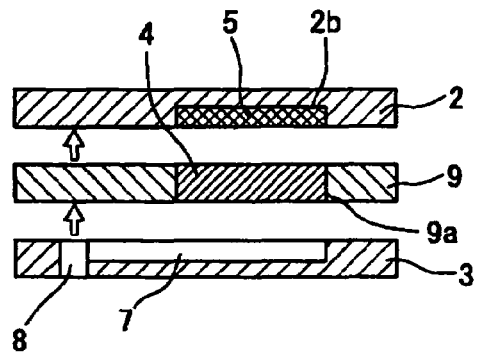
Figure 2:
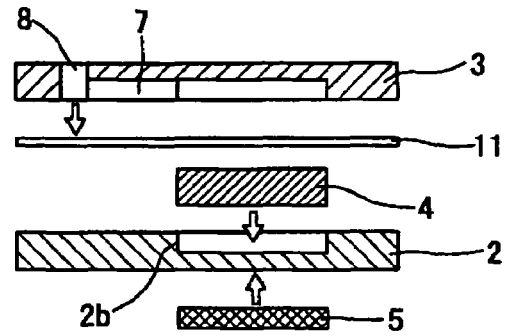
Figure 2:
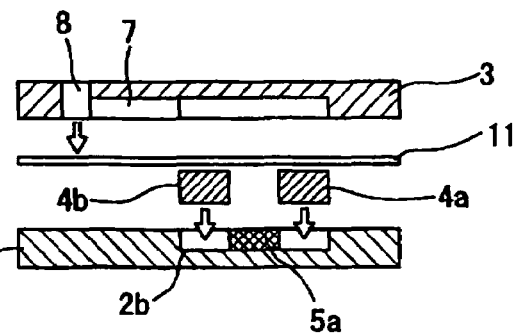
Figure 4:
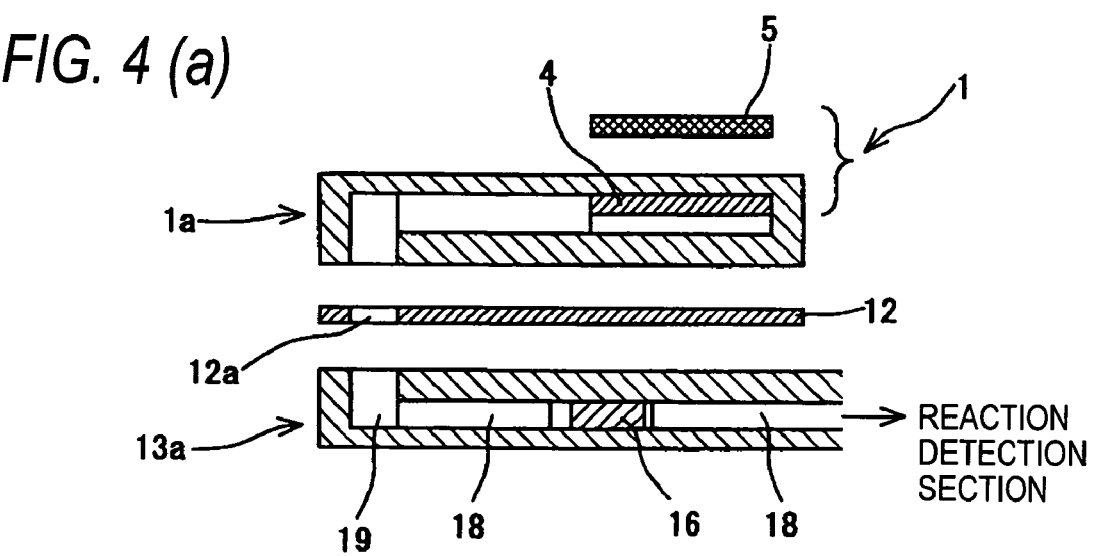
FIG. 4A is an exploded cross-sectional view of the sample processing chip on which the micropumps of the second embodiment of the invention are stacked.
FIG. 4B is an exploded cross-sectional view of a sample processing chip in which the micropumps of the second embodiment of the invention and a reaction detection section are combined together.
Figure 4:
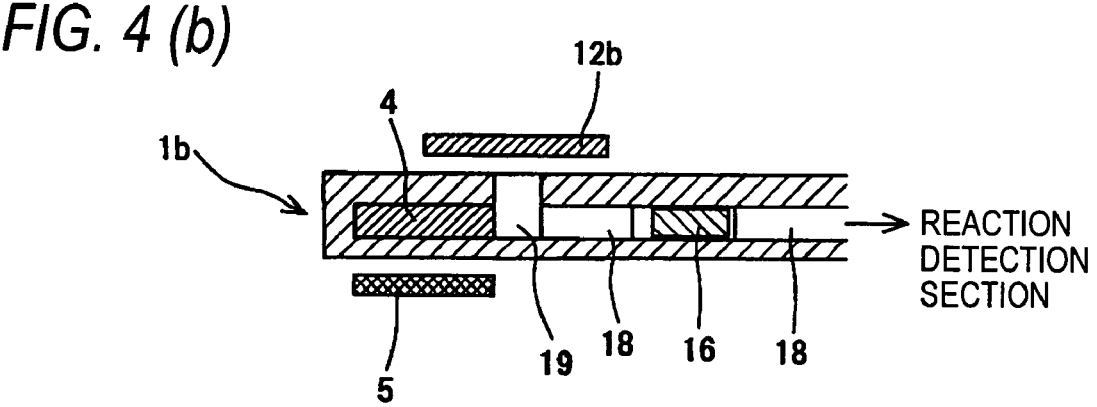
Figure 5:
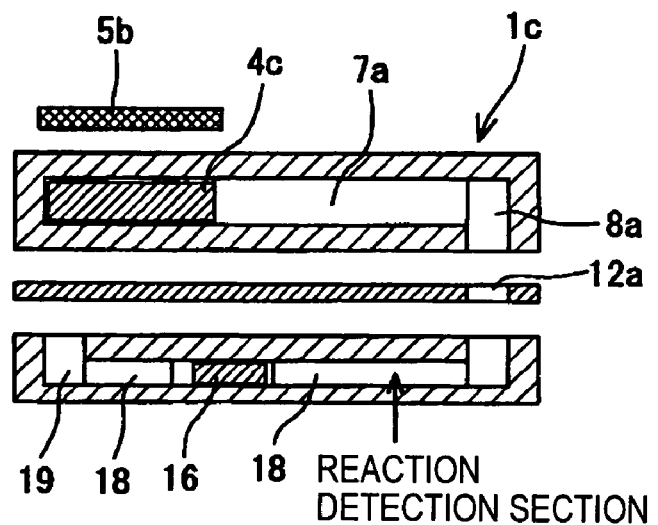
FIG. 5A is an exploded cross-sectional view of a sample processing chip on which micropumps according to a third embodiment of the invention are stacked.
FIG. 5B is an exploded cross-sectional view of the sample processing chip into which the micropumps of the third embodiment of the invention and circuit boards are combined together.
Figure 5:
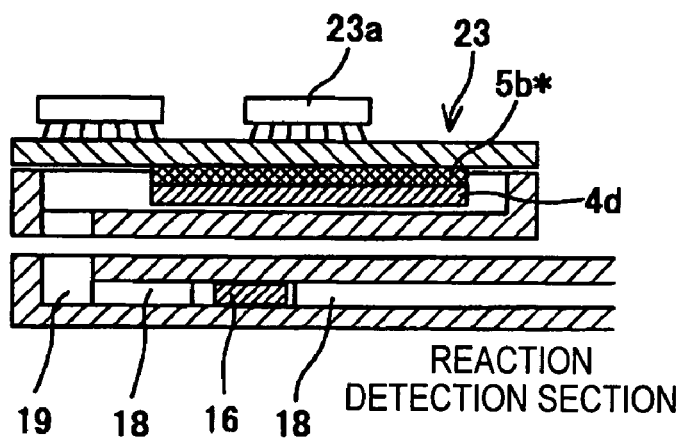
Figure 6:
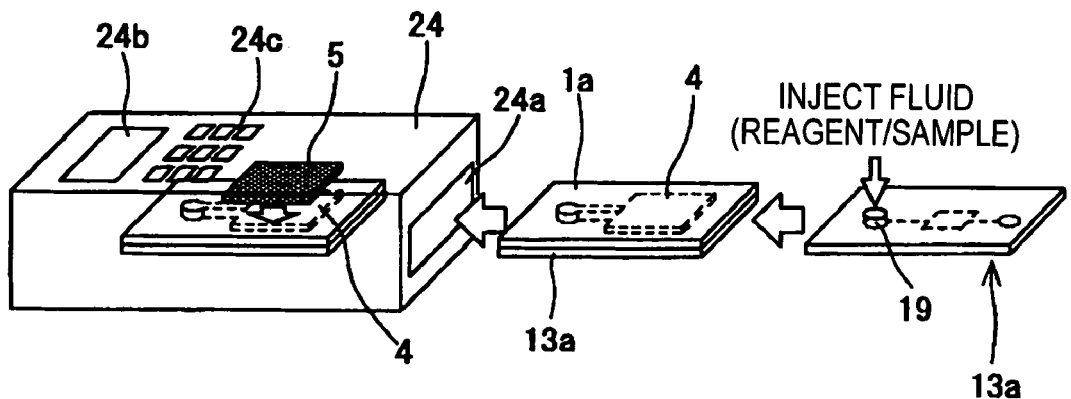
FIG. 6A is a conceptual descriptive view of a first measurement device for performing measurement through use of a sample processing chip having no reaction initiation means.
FIG. 6B is a conceptual descriptive view of a second measurement device for performing measurement through use of a sample processing chip having no reaction initiation means.
Figure 6:
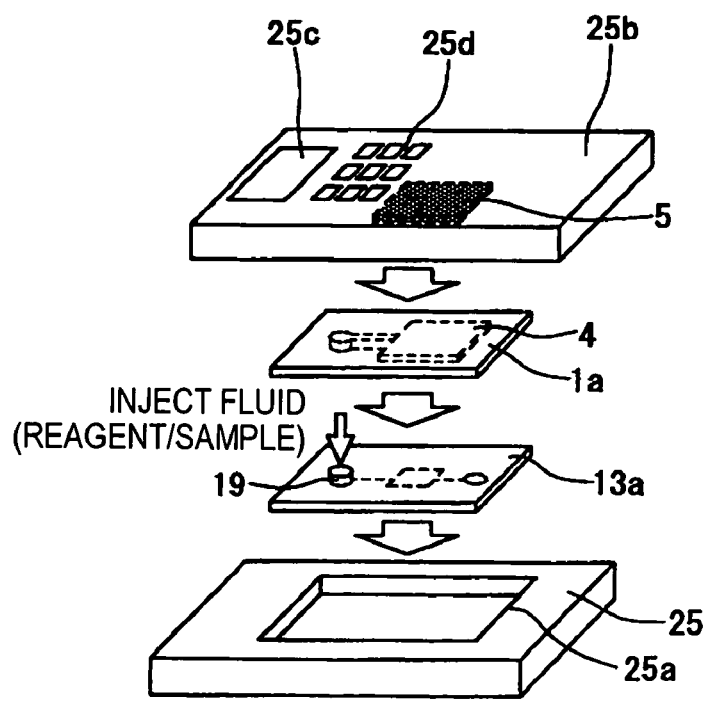

FIG. 1A is an exploded descriptive view of a micropump according to a first embodiment of the invention; FIG. 1B is a cross-sectional view of the micropump shown in FIG. 1A taken along line X-X; and FIGS. 2A to 2D are exploded descriptive views of another configuration of the micropump according to the first embodiment of the invention.

In FIGS. 1A and 1B, reference numeral 1 designates a micropump which produces a high-pressure gas by means of chemical reaction, to thereby transfer, by means of the high pressure gas, a sample M stored in a reservoir of another chip remaining in communication with the micropump; 2 designates a first structural material of the micropump 1; 2a designates an indentation formed in the first structural material 2 (i.e., a first indentation of the invention); 3 designates a second structural material of the micropump 1; and 3a designates an indentation formed in the second structural material 3 (a second indentation of the invention). Reference numeral 4 designates a reaction agent which is stored in the indentations 2a, 3a and produces a gas by means of chemical reaction; and 5 designates reaction initiation means which initiates, interrupts, or stops reaction by application of heat and pressure to the reaction agent 4. The reaction initiation means 5 can easily control heating operation by means of a heating element dependent on a reaction temperature and most suitable for use with a micromachine. In addition, reaction may also be commenced by application of pressure or the like. Reference numeral 6 designates a reaction chamber formed from the indentations 2a, 3a; 7 designates a channel for introducing a reacted high-pressure gas from the reaction chamber 6 to another chip; and 8 designates a communication hole (i.e., a discharge port) which is provided at the end of the channel 7 and is intended for establishing connection with another chip.

The first structural material 2 is a sheet-like upper casing for housing the reaction agent 4 within the reaction chamber 6. Similarly, the second structural material 3 is a sheet-like lower casing for housing the reaction agent 4 within the reaction chamber 6. The first and second structural materials 2, 3 are formed from metal, ceramics, glass, resin, or the like and have a thickness ranging from tens of micrometers to millimeters. Etching, machining, laser beam machining, plasma processing, printing, optical forming, or a like technique is appropriate as a method for processing details of the indentations 2a, 3a constituting the reaction chamber 6, the channel 7, and the communication hole 8.

Although various materials are available for the reaction agent 4 which produces a gas by means of chemical reaction, sodium azide, tetrazoles, sodium bicarbonates, or a like material is desirable. Sodium azide and tetrazoles cause reaction when heated to 150° C. or higher, thereby producing an $N_2$ gas. When heated up to 100° C. or higher, sodium bicarbonate cause reaction, thereby producing $N_2$ and $CO_2$ gases. As mentioned above, an inactive gas such as an $N_2$ gas, a $CO_2$ gas, or the like is produced. Hence, the reaction agent does not affect a human body, the environment, or the sample M. Thus, the safety of the micropump 1 is enhanced. Use of a noncontamination chemical, such as tetrazoles and sodium bicarbonates, as the reaction agent 4 enables realization of the micropump 1 which is highly safe even when discarded.

By reference to FIGS. 2A to 2D, another configuration of the micropump 1 will now be described. FIGS. 2A and 2B show a configuration suitable for loading a solid reaction agent or a liquid reaction agent solidified by a microcapsule or the like. FIGS. 2C and 2D show various configurations suitable for use with the case of a liquid reaction agent. A reaction agent—which handles liquid by means of solidifying the liquid with a microcapsule—will be described in detail in connection with a fifth embodiment.

In FIG. 2A, reference numerals 9, 10 designate first, second intermediate structural materials interposed between the first structural material 2 and the second structural material 3; and 9a designates an opening to be filled with the reaction agent 4. The micropump 1 shown in FIG. 1 is complicated, wherein indentations 2a, 3a are formed in the first, second structural materials 2, 3; and wherein a channel 7 and a communication hole 8 are formed in the second structural material 3. In relation to the micropump shown in FIG. 2A, a portion of the reaction chamber 6 is formed as an opening in the first intermediate structural material 9 in order to facilitate processing operations. The remaining portion of the reaction chamber 6, the channel 7, and the communication hole 8 are formed as openings in the second intermediate structural material 10 to be stacked under the first intermediate structural material 9. At this time, the first structural material 2 is a simple flat plate, and the second structural material 3 is a flat plate in which solely the communication hole 8 is formed. When they are stacked one on top of the other, the micropump 1 having a complicated structure can be embodied by means of only simple two-dimensional processing.

In FIG. 2B, reference numeral 2b designates an indentation formed in the surface of the first structural material 2 opposing the first intermediate structural material 9. The reaction initiation means 5 is housed in the indentation 2b. In this case, the previously-described second intermediate structural material 10 is not provided, and the channel 7 or the like is formed in the second structural material 3. The opening 9a of the first intermediate structural material 9 is filled with the reaction agent 4. At this time, the reaction initiation means 5 is not stacked from the outside of the first structural material 2 but housed in the indentation 2b. Hence, the micropump 1 becomes compact, and the reaction initiation means 5 comes into contact with the reaction agent 4, whereupon the reaction efficiency of the reaction agent 4 is improved, thereby speeding up response of the reaction agent 4 to the reaction initiation means 5.

Reference numeral 11 shown in FIG. 2C designates a sheet material to be used for sealing liquid. In this case, the reaction agent 4 is liquid. After the first structural material 2 has been filled with the reaction agent 4 while being oriented upward, the reaction agent 4 is sealed with the sheet material 11. The sheet material 11 is resin, rubber, elastomer resin, an elastic member, or the like, has the thickness ranging from micrometers to millimeters, and prevents evaporation of the internal liquid and leakage of a gas byway of a clearance stemming from elastic lamination. Accordingly, when reaction is initiated by means of the reaction initiation means 5, an opening (which will be described later) for permitting penetration of the gas developing in the communication hole 8 must be formed or the sheet material 11 must be formed as a sheet which enables penetration of only a gas by blocking liquid. Once sealed with the sheet material 11, the micropump 1 can be inverted in the course of handling without concern for leakage or evaporation, as in the case of the micropump 1 shown in FIG. 1.

Finally, in FIG. 2D, reference numerals 4a, 4b designate liquid reaction agents. When mixed together, the reaction agents 4a, 4b react with each other, to thereby produce a gas. Reference numeral 5a designates reaction initiation means such as a valve. The reaction initiation means 5a may be equipped with a heater for promoting reaction. When liquid is taken as the reaction agent 4, the reaction agent may be handled in the same manner as a solid by filling a microcapsule with the reaction agent. In this regard, detailed explanations are provided in connection with a fifth embodiment.

As mentioned above, the micropump 1 of the first embodiment enables realization of accurate correspondence between the position of the reaction agent 4 and that of the reaction initiation means 5 by means of stacking a structural material, the reaction agent 4, and the reaction initiation means 5. As a result, direct control of the micropump in a minute area becomes possible, thereby enabling realization of the micropump 1 whose reaction speed has been increased and which has superior responsiveness. As shown in FIGS. 1 and 2A to 2D, the structure is embodied by stacking a plurality of sheet-like structural materials, and hence the micropump can be subjected to micromachining with a high degree of accuracy. As typified particularly by FIG. 2A, the micropump can be manufactured by means of solely two-dimensional machining, and in this case machining becomes easier. Moreover, there is employed a structure embodied by stacking sheet-like structural materials. The micropump 1 is eventually imparted with a chip structure and can constitute a sample processing chip for a variety of applications when used in combination with another chip.

Second Embodiment

There will now be described another micropump which is suitable for use in combination with another chip module, such as a flow passage control chip and a reaction detection chip. FIG. 3A is an exploded perspective view of a sample processing chip in which micropumps according to a second embodiment of the invention are stacked; FIG. 3B is a fragmentary broken enlarged view of a flow passage control chip constituting the sample processing chip shown in FIG. 3A; FIG. 4A is an exploded cross-sectional view of the sample processing chip in which the micropumps of the second embodiment of the invention are stacked; and FIG. 4B is an exploded cross-sectional view of a sample processing chip in which the micropumps of the second embodiment of the invention and a reaction detection section are combined together. In FIGS. 3A and 3B, reference numeral 1a designates a pump chip (i.e., a pump structural material of the invention) constituting a micropump main body exclusive of the reaction initiation means 5; 12 designates a sealing material interposed between pump chips 1a when the pump chips 1a are stacked; 12a designates an opening connected to a communication hole 8; 13 designates a flow passage control chip for controlling a flow when a sample M is ejected by means of a reactant gas delivered from the micropump 1; and 14 designates a reaction detection chip (i.e., a processing chip of the invention) on which the flow passage control chips 13 are stacked.

The flow passage control chip 13 and the reaction detection chip 14 can be assembled into a single chip. Reference numeral 13a shown in FIG. 4A designates a reaction control chip into which the flow passage control chip 13 and the reaction detection chip 14 are assembled into one piece. The reaction control chip 13a is compact and useful in a case where the flow passage control chip 13 and the reaction detection 14 can be processed simultaneously.

In addition, the pump chip 1a and the flow passage control chip 13 constitute a single chip which is to serve as a flow passage control unit. The chip is stacked on the reaction detection chip 14, to thereby realize as a whole a stacked sample processing chip in which two chips are stacked. When the flow passage control unit is assembled into one chip, the chip acts as a flow passage control chip 1b to be described later. Moreover, the pump chip 1a and the reaction control chip 13a can also be assembled into one perfect sample processing chip, or the flow passage control chip 1b and the reaction detection chip 14 can also be assembled into one perfect sample processing chip (see FIG. 4B). The reaction initiation means 5 is preferably formed as a separate member.

Reference numeral 15 designates a microvalve which is provided in the flow passage control chip 13 and opened and closed by means of the inertia of a valve element derived from application of vibration, the reaction force originating from a V-shaped interior wall surface, and the pressure of supplied fluid. Reference numeral 16 designates a valve element of the microvalve 15; 17 designates a valve chamber; 17a designates a V-shaped valve seat which engages with the valve element 16, to thereby allow interruption and passage of a flow; and 18 designates a channel connected to the microvalve 15. Reference numeral 19 designates a reservoir which is connected to the opening 12a and the communication hole 8 and is to be filled with the sample M; and 20 designates a piezoelectric element for applying vibration to the valve element 16 of the microvalve 15 in a direction orthogonal to the flow. Although the embodiments have described the microvalve 15, the embodiments are mere illustrations of some preferred embodiments of the invention. Naturally, the invention is not limited to these embodiments; and a diaphragm valve or another flow passage control method which enables realization of a microstructure can be employed.

The width of the channel 18 is on the order of micrometers to hundreds of micrometers. The width of the valve chamber 17 is larger than that of the channel 18 but is substantially of the same order. The length of a valve element is about two to ten times the width of the channel. When pressure (back pressure) originates from the reservoir 19, the valve element 16 can fit into the valve seat 17a without involvement of rattling, by means of a wedge effect. Namely, as a result of application of force to a tapered surface from the direction of back pressure, the force is amplified by means of leverage.

When the frequency and amplitude of a current and those of a voltage, both being supplied from the power source by way of a waveform control section (not shown), are changed, the pattern of expansion and contraction is changed. Accordingly, the maximum movement range in which the valve element 16 is vibrated can be changed by means of merely adjusting the frequency and amplification of vibration of the piezoelectric element 20, thereby enabling adjustment of an opening of the microvalve 15 and flow control operation.

The flow passage control chip 13 equipped with the microvalve 15 of the second embodiment can be stacked on top of the reaction detection chip 14 which detects the sample M and effects reaction. By use of the flow passage control chip 13 in combination with various reaction detection chips 14, there can be constituted a sample processing chip that in effect has a variety of applications. When a reaction control chip 13a as shown in FIG. 4A is employed, control of a flow passage and control of reaction detection can be performed by a single chip, and hence the reaction control chip 13a can be made in a compact structure. The reaction initiation means 5 can be removably attached to the pump chip 1a, and hence the reaction initiation means 5 can be recycled on a semipermanent basis. As will be described later, the pump chip 1a can incorporate the reaction agent 4 while the agent is divided into a plurality of bodies each consisting of a smaller reaction agent. In this case, the reaction agent can be used a plurality of times. In contrast, the reaction control chip 13a and the sealing material 12, to which the pump chip 1a is removably attached, are discarded after a single use.

In FIG. 4B, reference numeral 1b designates a flow passage control unit chip into which the flow passage control chip 13 and the pump chip 1a are integrated; and 12b designates a sealing material to be used for sealing the reservoir 19 after the reservoir 19 has been filled with the sample M from the outside. FIG. 4B shows a perfect one-chip sample processing chip into which the flow passage control unit chip 1b and the reaction detection chip 14 are integrated as a single chip. When this flow passage control unit chip 1b is used, the reaction initiation means 5 is recycled, and the flow passage control unit chip 1b is discarded after a single use.

The sample processing chip of the second embodiment that has been described above comprises one micropump 1 and one reaction detection flow passage, both being formed in one sample processing chip. In contrast, a plurality of independent micropumps are provided on one sample processing chip, and a plurality of independent reaction detection flow passages are formed, as will be described in detail in connection with the eighth embodiment.

Third Embodiment

The micropumps that have been described above each comprise the reaction initiation means serving as a drive source and the reaction agent, and pressurize a sample with a produced gas. However, there will now be described a micropump according to a third embodiment employing a special drive source. FIG. 5A is an exploded cross-sectional view of a sample processing chip on which micropumps according to a third embodiment of the invention are stacked; and FIG. 5B is an exploded cross-sectional view of the sample processing chip into which the micropumps of the third embodiment of the invention and circuit boards are combined together.

A micropump shown in FIG. 5A is of suction type. Reference numeral 1c designates a suction micropump which aspirates a gas. Reference numeral 4C designates a gas absorbing material; 5b designates absorption initiation means for commencing absorption of a gas; 7a designates a channel which performs sucking of the sample M from the reservoir 19 when imparted with negative pressure; and 8a designates a communication hole. The gas absorbing material 4c aspirates a gas from the inside of the channels 18, 7a and the communication hole 8a, thereby applying negative pressure to the inside thereof, whereupon the sample M is drawn into the reaction detection section, thereby processing the sample. The gas absorbing material 4c is formed in accordance with a method for aspirating oxygen through use of an oxygen scavenger or a method for aspirating hydrogen which has been produced from a hydrogen occluding material beforehand, through use of the hydrogen occluding material.

Next, FIG. 5B shows that the reaction initiation means 5 is attached not to the pump chip 1a but to another chip. In FIG. 5B, reference numeral 23 designates a circuit board; and 23a designates an IC chip mounted on the circuit board 23. Reference numeral 4d designates a reaction agent; and 5b* designates reaction initiation means formed from a heating element formed in the circuit board 23. Providing the circuit board 23 with the heating element is easy, and the heating element can be recycled if the heating element is made removably attachable to the circuit board 23. The circuit board 23 and the micropump 1 are combined together in order to provide the circuit board 23 with the heating element, thereby transferring the configuration of the micropump 1 to the substrate. As a result, the sample processing chip can be simplified and manufactured inexpensively. Further, the temperature sensor and the control circuit can be mounted on the circuit board 23, and hence the control function of the reaction initiation means 5b* can be readily implemented. Control of a microvalve of the flow passage control chip 13, the control and detection of reaction of the reaction detection chip 14, and control of the micropump 1 can all be performed simultaneously. Accordingly, a compact, high-performance, and low-cost sample processing chip shown in FIG. 5B can be implemented.

The reaction initiation means 5 can be provided on a measurement instrument rather than on the circuit board 23. A similar working-effect can be expected by mounting the sample processing chip on the measurement instrument. FIG.

6A is a conceptual descriptive view of a first measurement device for performing measurement through use of a sample processing chip having no reaction initiation means; and FIG. 6B is a conceptual descriptive view of a second measurement device for performing measurement through use of a sample processing chip having no reaction initiation means.

In FIG. 6A, reference numeral 24 designates a measurement instrument for measuring the sample processing chip—into which the sample has been injected—while the chip is mounted on the measurement instrument. Reference numeral 24a designates a chipset section having a sample processing chip insert opening; 24b designates a display section; and 24c designates an operation section. The reaction initiation means 5 is provided on a side housing provided within the chipset section 24a, 25a. When the sample processing chip is inserted into the measurement instrument 24, the reaction agent 4 is set in the position of the reaction initiation means 5, and reaction is initiated by means of operating the operation section 24c.

Similarly, in FIG. 6B, reference numeral 25 designates a measurement instrument for measuring a sample processing chip while the chip is attached to the measurement instrument; 25a designates a chipset section on which the sample processing chip is mounted; 25b designates a cover section of the sample processing chip; 25c designates a display section; and 25d designates an operation section. The reaction initiation means 5 is provided on the side housing of the chipset sections 24a, 25a. The sample processing chip is mounted on the chipset section 25a of the measurement instrument 25. When the cover section 25b is set, the reaction agent 4 is set at the position of the reaction initiation means 5. Reaction is commenced by actuation of the operation section 25d.

When the chipset sections 24a, 25a of the measurement instruments 24, 25 are provided with the reaction initiation means 5, the reaction initiation means 5 can be recycled. There can be embodied a measurement device capable of detecting a general-purpose reaction by attaching sample processing chips of various forms to the chipset sections.

Fourth Embodiment

Figure 7:
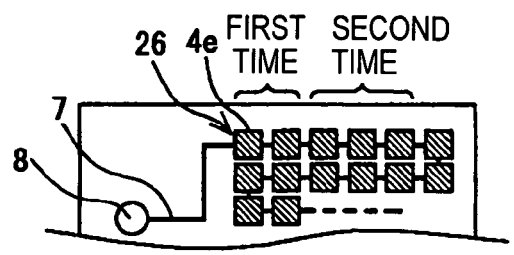
FIGS. 7A to 7C are descriptive views showing a reaction agent and reaction chamber of a micropump according to a fourth embodiment of the invention.
FIG. 7D is a descriptive view of a reaction agent and reaction initiation means of the micropump according to the fourth embodiment of the invention.
FIG. 7E is a descriptive view of reaction initiation means of the micropump according to the fourth embodiment of the invention.
Figure 7:
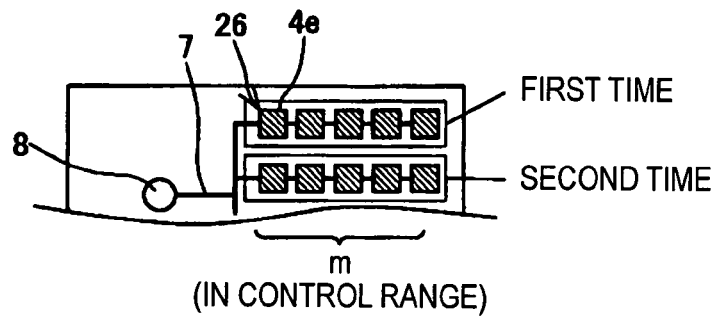
Figure 7:
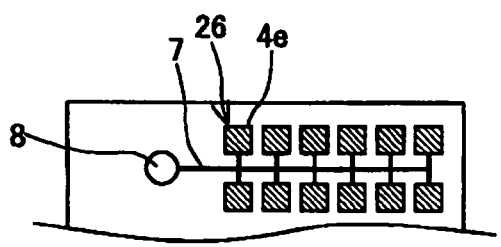
Figure 7:
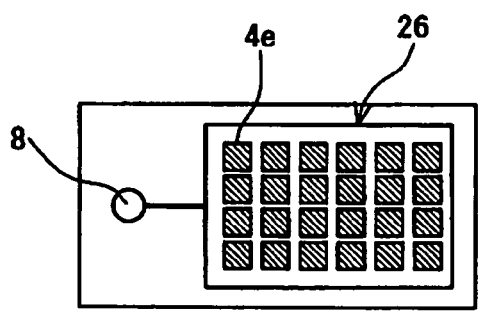
Figure 7:
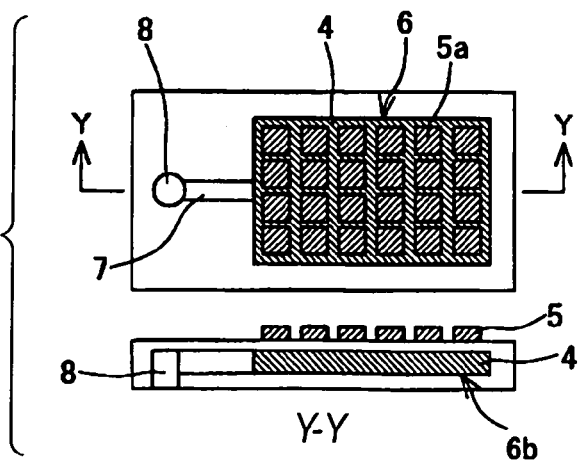

Subsequently, a micropump which enables multiple use of a drive source will now be described. To this end, the fourth embodiment is provided with a plurality of small reaction agents and a plurality of small reaction initiation means. FIGS. 7A to 7C are descriptive views showing a reaction agent and reaction initiation chamber of a micropump according to a fourth embodiment of the invention; FIG. 7D is a descriptive view of a reaction agent and reaction initiation means of the micropump according to the fourth embodiment of the invention; and FIG. 7E is a descriptive view of reaction initiation means of the micropump according to the fourth embodiment of the invention.

In FIGS. 7A to 7D, reference numeral 4e designates a small reaction agent; 5a designates small reaction initiation means; and 26 designates a small reaction chamber. Of these drawings, FIG. 7A shows a case where a plurality of small reaction chambers 26 are arranged in series and the small reaction agents 4e are housed in the respective small reaction chambers 26. In this case, the small reaction chambers 26 are used in the sequence of increasing distance from the communication hole 8 connected to the reservoir 19. In FIG. 7A, two small reaction agents 4e are used in a first operation, and three small reaction agents 4e are used in a second operation. In this way, when the small reaction chambers 26 are arranged in series, a loss of reaction agent which would be caused at the end of use becomes smaller.

FIG. 7B shows a case where "n" trains are connected in parallel with the communication hole 8, in correspondence to "n" times, and in which each train is formed by arranging in series "m" small reaction chambers 26 for housing "m" small reaction agents 4e to be used for a single reaction. In this case, "m" small reaction agents 4e used in one reaction are arranged in totally the same state. Hence, a small difference exists between reactions, and the reactions become stable. Next, FIG. 7C shows a case where the small reaction chambers 26 are separately branched from one channel 7. In contrast with the cases shown in FIGS. 7A and 7B, the reactant gas does not pass through the small reaction chambers 26 that have finished reaction, and hence reaction becomes stable. As in the case shown in FIG. 7A, it is evident that the micropump can be utilized a plurality of times, to thereby cause a small loss of reaction agent.

FIG. 7D shows a case where a plurality of small reaction agents 4e and the small reaction initiation means 5a are dispersed within one large reaction chamber 6. The small reaction agents 4e do not remain unused at the end of use. Further, the mounting efficiency of the reaction agents 4 is increased. Finally, FIG. 7E shows a case where the reaction agent 4 is a single piece and the small reaction initiation means 5a is divided into a plurality of pieces. The quantity of gas produced from the reaction agent 4 does not depend on a location, and few variations arise in pressure. However, as in the case shown in FIG. 7A, the reaction agents must be used in the sequence of increasing distance from the communication hole 8. The quantity of produced gas is changed in accordance with a distance from the communication hole 8, and hence the reaction area must be changed by means of increasing the quantity or number of reaction initiation means 5a to be used, in order to effect reaction at a distant location.

As mentioned above, the micropump 1 equipped with the plurality of small reaction agents 4e and the plurality of small reaction initiation means 5a, both belonging to the fourth embodiment, involves an increase in reaction speed for miniaturizing the reaction agents 4, thereby enhancing responsiveness. Specifically, when the small reaction initiation means 5a are activated, the small reaction agents 4e cause reaction at a stroke, and the pressure stemming from the produced gas exhibits a sharp rise and can reach a target pressure at a stroke. Since the plurality of small reaction agents 4e are provided, the pump chip 1a can be used a plurality of times without being discarded after a single use. The only requirement is to effect pressure control on the basis of the number and arrangement of the small reaction agents 4e, thus facilitating control.

Figure 8:
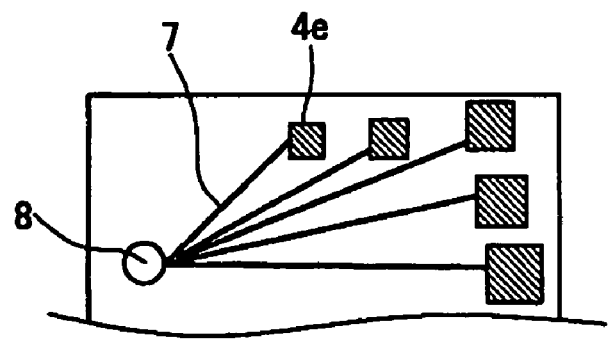
FIGS. 8A to 8C are descriptive views showing a reaction agent and the configuration of a channel, both being intended for reducing variations in the pressure of a generated gas.
Figure 8:
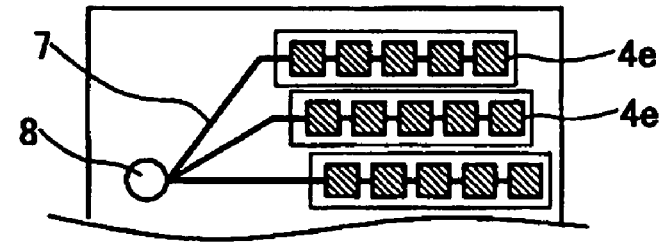
Figure 8:
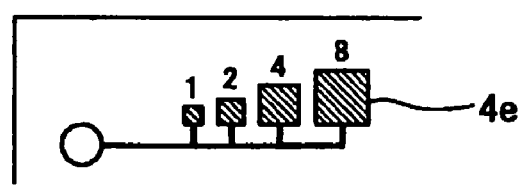

The reason why the arrangement of the small reaction agents 4e affects pressure control when pressure control is performed is that a pressure drop arises in the same produced gas for reasons of the volume of the channel 7 connected to the communication hole 8 or the volume of the used small reaction chambers 26. FIGS. 8A and 8B shows the configuration of the small reaction agent 4e and that of the channel 7 for reducing pressure variations. FIGS. 8A, 8B, and 8C are descriptive views of the configuration of the reaction agent and that of the channel for reducing variations in the pressure of a produced gas.

FIG. 8A shows an increase in the volume of a vacant reaction chamber with progress in the number of times the reaction chamber is used. For the chambers whose reactions are initiated later as a result of an increase in volume, the quantity of reaction agent 4e is increased. FIG. 8B shows a case where "n" trains are connected in parallel with the communication hole 8, each train being formed by arranging in series "m" small reaction chambers 26 for housing "m" small reaction agents 4e shown in FIG. 7B. In order to reduce variations in the volume of the channels, "n" channels 7 are made equal in length with each other.

FIG. 8C shows a case where the quantity of small reaction agents 4e is increased so that each becomes a predetermined multiple of the unit quantity; for instance, one unit, two units, four units, and eight units. The small reaction agent is caused to react freely from one unit to fifteen units by combination of the units, thereby improving a mounting efficiency while high-precision pressure control remains feasible. Provision of only four small reaction agents 4e rather than provision of 15 unit quantity of small reaction agent results in an improvement in the efficiency of mounting reaction agents on the micropump.

Fifth Embodiment

There will now be described a micropump according to a fifth embodiment, which is made so that a liquid reaction agent can be handled as a solid, by means of forming a microcapsule. FIG. 9A is a descriptive view of a case where a microcapsule having liquid enclosed therein is dispersed within liquid; FIG. 9B is a descriptive view of a case where a microcapsule having liquid enclosed therein is doubly placed in a microcapsule with liquid; FIG. 9C is a descriptive view of a case where two types of microcapsules, each having liquid enclosed therein, are mixed together; and FIG. 9D is a descriptive view of a case where sealing material of the micropump is broken so as to establish mutual communication when the micropump is in use.

A chemical method, such as an in-situ polymerization method, a physical chemistry method such as a coacervation method, and a mechanical method such as spray dry method are available as methods for encapsulating a liquid reaction agent in the form of a microcapsule. Although any one of the methods can be adopted, adoption of a method which enables formation of a microcapsule whose radius ranges from hundreds of nanometers to hundreds of micrometers is preferable. The microcapsule is printed in a reaction chamber along with a binder, or a binder and fluid are pipetted into the reaction chamber, thereby manufacturing a reaction agent of the micropump. The binder and the fluid are volatilized after printing or pipetting. When the microcapsule is actually used to cause reaction, the capsule is broken by heating or pressurization. The capsule can also be broken from the inside thereof by heating and pressurization through use of the pressure of a gas produced from the liquid in the microcapsule, or the capsule can be fused by means of heat of reaction.

There may also be case where two types of liquids are caused to react with each other, to there by produce a gas, rather than reaction being initiated by means of heating or pressurization of one type of liquid. The microcapsule shown in FIG. 9A is for encapsulating liquid A in the form of a microcapsule and filling the reaction chamber 6 with liquid B while the liquid B remains liquefied. In this case, the sealing material 12 is required for sealing the communication hole 8 of the micropump 1 with a view toward preventing evaporation of the liquid B. When the micropump 1 is in use, pressurization cannot be carried out unless the sealing material 12 is opened. For this reason, as shown in FIG. 9D, breaker projections 27 (i.e., sealing material breaking means of the invention) are provided around a reservoir 19 of the flow passage control chip, thereby breaking the sealing material 12 covering the communication hole 8 to establish communication. This method is effective for a case where the reaction chamber is filled with liquid, regardless of whether or not the microcapsule is utilized.

The microcapsule shown in FIG. 9B (i.e., a first microcapsule of the invention) encapsulates another microcapsule enclosing the liquid B (i.e., a second microcapsule of the invention) along with the liquid A. The microcapsule shown in FIG. 9C is a mixture of the microcapsule of liquid A (i.e., the first microcapsule of the invention) and the microcapsule of liquid B (i.e., the second microcapsule of the invention). In addition, the liquid encapsulated in the form of the microcapsule may also be dispersed in a solid reaction agent. Although not shown in the drawings, for instance, the liquid A may be encapsulated in the form of a microcapsule, and the solid reaction agent B formed as powder. The microcapsule and the powder may be fixed within the reaction chamber through use of a binder. The microcapsule of liquid A may be dispersed in the solid reaction agent B.

The micropump of the fifth embodiment can also handle a liquid reaction agent as a solid by means of forming a microcapsule.

Sixth Embodiment

Figure 10:
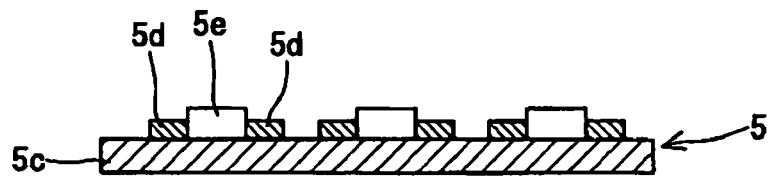
FIG. 10A is a descriptive view of reaction initiation means which is constituted of a resistor and electrodes and performs electrical heating.
FIG. 10B is a descriptive view of reaction initiation means which is constituted of conductive particles contained in a reaction agent and electrodes and which employs Joule heat.
FIG. 10C is a descriptive view of reaction initiation means having a high-temperature conduction section arranged between a heating element and a reaction agent.
FIG. 10D is a descriptive view of reaction initiation means in which a heating element remains in direct contact with a reaction agent.
Figure 10:
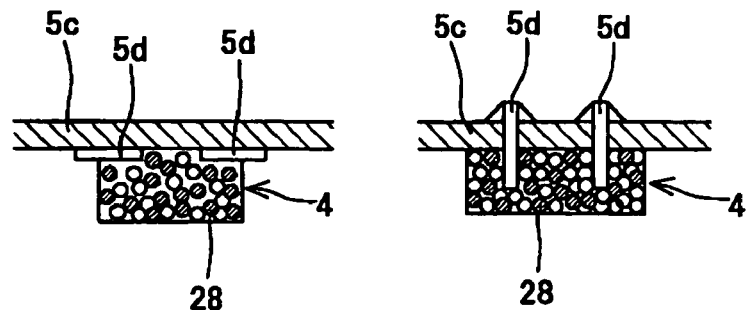
Figure 10:
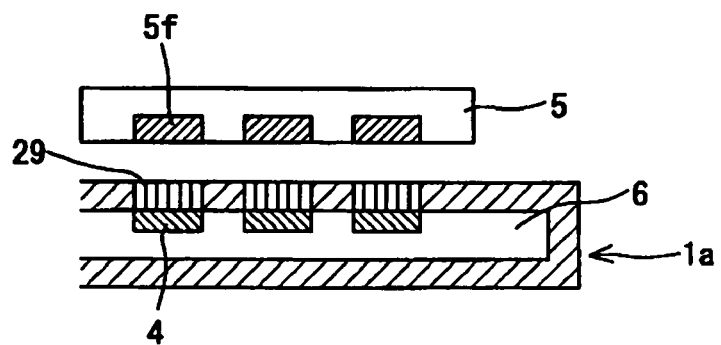
Figure 10:
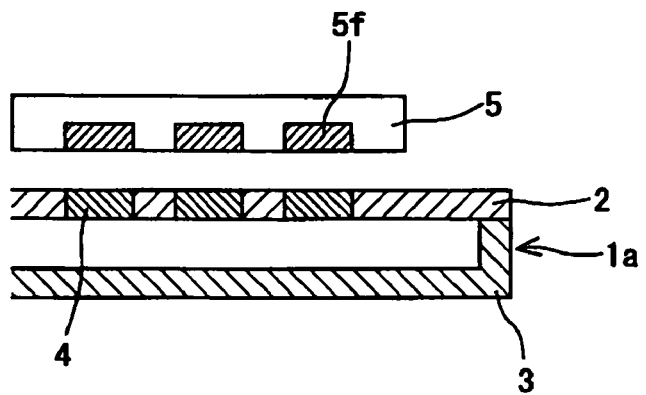

Next will be described reaction initiation means constituting a drive source. All the reaction initiation means initiate reaction by means of heating. FIG. 10A is a descriptive view of reaction initiation means which is constituted of a resistor and electrodes and performs electrical heating; FIG. 10B is a descriptive view of reaction initiation means which is constituted of conductive particles contained in a reaction agent and electrodes and which employs Joule heat; FIG. 10C is a descriptive view of reaction initiation means having a high-temperature conduction section arranged between a heating element and a reaction agent; and FIG. 10D is a descriptive view of reaction initiation member in which a heating element remains in direct contact with a reaction agent.

In FIGS. 10A to 10D, reference numeral 5c designates a heat transfer structural material; 5d designates an electrode; 5e designates a resistor; 5f designates a heating element; 28 designates a conductive particle; and 29 designates a high heat conduction section.

The reaction initiation means 5 shown in FIG. 10A heats the reaction agent 4 by energizing the electrode 5d to heat the resistor 5e and transferring the heat to the heat transfer structural material 5c. The reaction initiation means 5 shown in FIG. 10B is for mixing the reaction agent 4 with metal particles, i.e., conductive particles 28, and energizing the electrode 5d. By means of energization, the reaction agent 4 generates heat at the level of Joule heat, thereby initiating reaction. The electrode 5d is embodied as a plurality of types of electrodes; for example, a plane electrode formed on the surface of the heat transfer structural material 5c and a rod electrode formed so as to penetrate through the heat transfer structural material 5c. In any case, the electrode 5d is brought into contact with the reaction agent 4. Here, when the reaction agent 4 is made of conductive material, the conductive particles 28 are not necessarily used.

FIG. 10C shows that the heating element 5f is formed on the reaction initiation means 5 and that the high heat conduction section 29 is disposed at a position of the pump chip 1a where the reaction agent 4 is provided. The heat produced by the heating element 5d travels to the high heat conduction section 29, to thereby initiate reaction of the reaction agent 4. If a metal pin is embedded in the high heat conduction section 29 and the high heat conduction section 29 is sharpened such that the tip end of the metal pin digs into the reaction agent 4, the efficiency of heat conduction is improved. Alternatively, the high heat conduction section 29 may be embedded in conjunction with the binder. When the high heat conduction section 29 is formed in a substrate such as a circuit board 23 (see FIG. 5B), the high heat conduction section 29 can be embedded in the substrate by means of plating.

In the case of the reaction initiation means shown in FIG. 10D, the reaction agent 4 is embedded into the first structural material 2 of the pump chip 1a. Accordingly, the reaction agent 4 is exposed on the surface of the first structural material 2, and the heating element 5f of the reaction initiation means 5 is brought into direct contact with the thus-exposed portion. In order to protect the heating element 5f from the reaction agent 4, the heating element 5f is preferably coated with a resin coating or plating such as Teflon (registered trademark). The reaction agent 4 can be heated directly by means of placing a projection between tip ends of the rod electrode in the same manner as is the rod electrode shown in FIG. 10B, taking the projection as the heating element 5f, and embedding the heating element 5f in the reaction agent 4.

Seventh Embodiment

Figure 11:
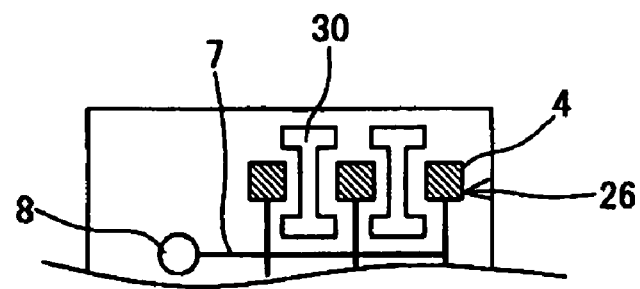
FIG. 11A is a descriptive view for insulating heat between reaction chambers.
FIG. 11B is a descriptive view for cooling between reaction chambers.
Figure 11:
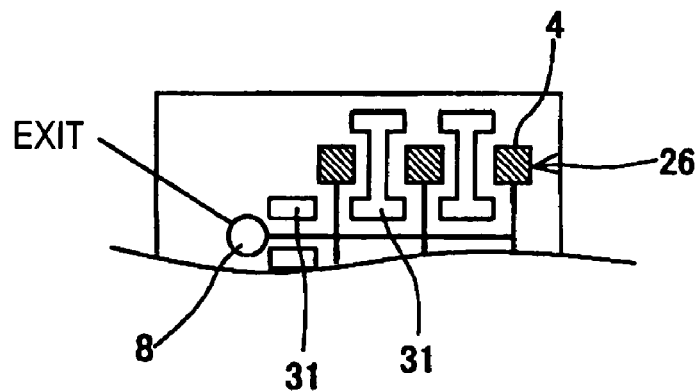

When a plurality of reaction agents are provided as elements of the drive source of the micropump, the reaction heat of the used reaction agent or the heating action of the reaction initiation means may affect unused reaction agents, which would in turn cause chain reaction of unused reaction agents or heat deterioration or affect another chip such as a reaction detection chip. A structure for coping with the heat will now be described. FIG. 11A is a descriptive view for insulating heat between reaction chambers, and FIG. 11B is a descriptive view for cooling between reaction chambers.

In FIGS. 11A and 11B, reference numeral 30 designates a heat insulation section for forming an internal air layer or liquid layer by means of slits or the like; and 31 designates a heat radiation section for cooling the inside of the reaction chamber by circulating fluid through the inside of the reaction chamber by way of the slits or the like.

The heat insulation section 30 shown in FIG. 11A is interposed between the reaction chambers 26, each housing a plurality of the reaction agents 4, to thereby retard transfer of heat developing in a heating section to another reaction chamber 26. As a result, influence of the reaction heat of the used reaction agent 4 or influence of the heat produced by the reaction initiation means 5 to another unused reaction agent can be obstructed. Further, provision of the heat insulation section 30 between the reaction chamber 26 and the communication hole 8 enables obstruction of the influence of heating action to the communication hole 8 and subsequent stages, by means of a similar effect.

The heat radiation section 31 shown in FIG. 11B is interposed between the reaction chambers 26, each housing a plurality of the reaction agents 4, or the reaction chamber 26 and the communication hole 8, and fluid which is to act as a coolant is circulated through the heat radiation section 31 by way of a circulation channel (not shown). At this time, the heat radiation section 31 acts as a cooler for effecting heat exchange operation. In order to stimulate a heat dissipating effect, provision of a heat sink or the like by means of forming fins in the substrate is also preferable. As a result of provision of the heat radiation section 31, the temperature of the area between the communication hole 8 and the reaction chamber 26 becomes stable, and hence a change in the volume derived from a temperature change can be diminished, whereby the temperature of a reactant gas is reduced and safety is enhanced. Further, heating of the reaction detection section, which would otherwise be caused by the heat of the reactant gas, can also be prevented. Moreover, the heat radiation section 31 provided between the reaction chambers 25 can also yield the same effect. Hence, chain reaction of unused reaction agents among the reaction chambers or occurrence of heat deterioration can be prevented.

However, another preferable measure is to reduce heat by means of natural dissipation by means of increasing the distance between the reaction chambers 26 or the distance between the reaction chamber 26 and the communication hole 8 rather than forming the heat radiation section 31 in the form of slits through which a coolant is to circulate. In this case, another preferable measure is to determine a distance which reduces heat so as to become lower than a temperature at which adjacent reaction agents 4 do not cause reaction or a temperature at which no influence is exerted on the communication hole 8 and subsequent stages, through natural dissipation.

Further, the length of the channel 7 existing between the reaction chambers 26 or the length of the channel 7 existing between the reaction chamber 26 and the communication hole 8 may be made longer, to thereby reduce a temperature through natural dissipation. In this case, the length of the channel may be determined such that a temperature becomes lower than a temperature at which adjacent reaction agents 4 do not cause reaction or a temperature which does not affect the communication hole 8 or subsequent stages, through natural dissipation.

Eighth Embodiment

Figure 12:
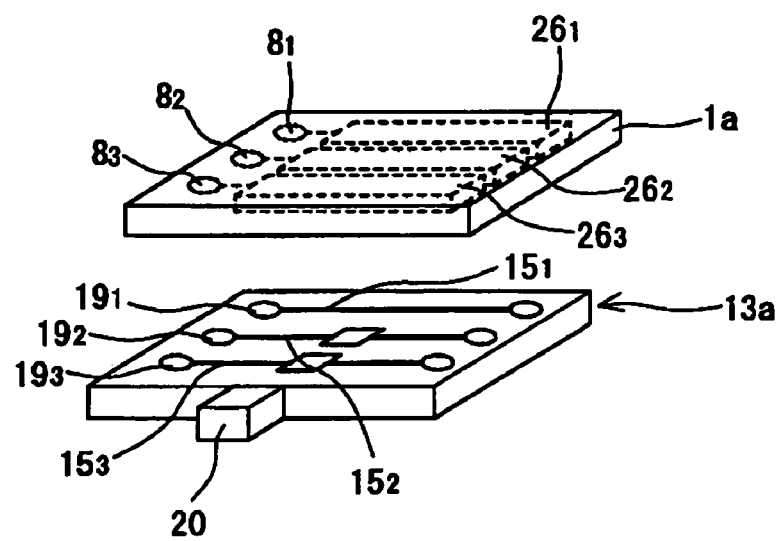
FIG. 12A is an exploded perspective view of a sample processing chip according to an eighth embodiment of the invention.
FIG. 12B is a descriptive view of a reaction agent of the micropump of the sample processing chip shown in FIG. 12A.
Figure 12:
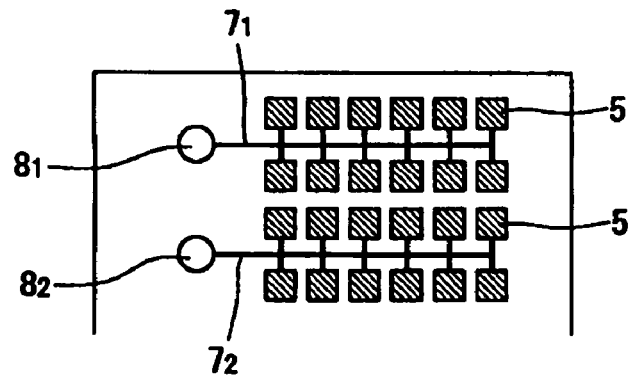
Figure 13:
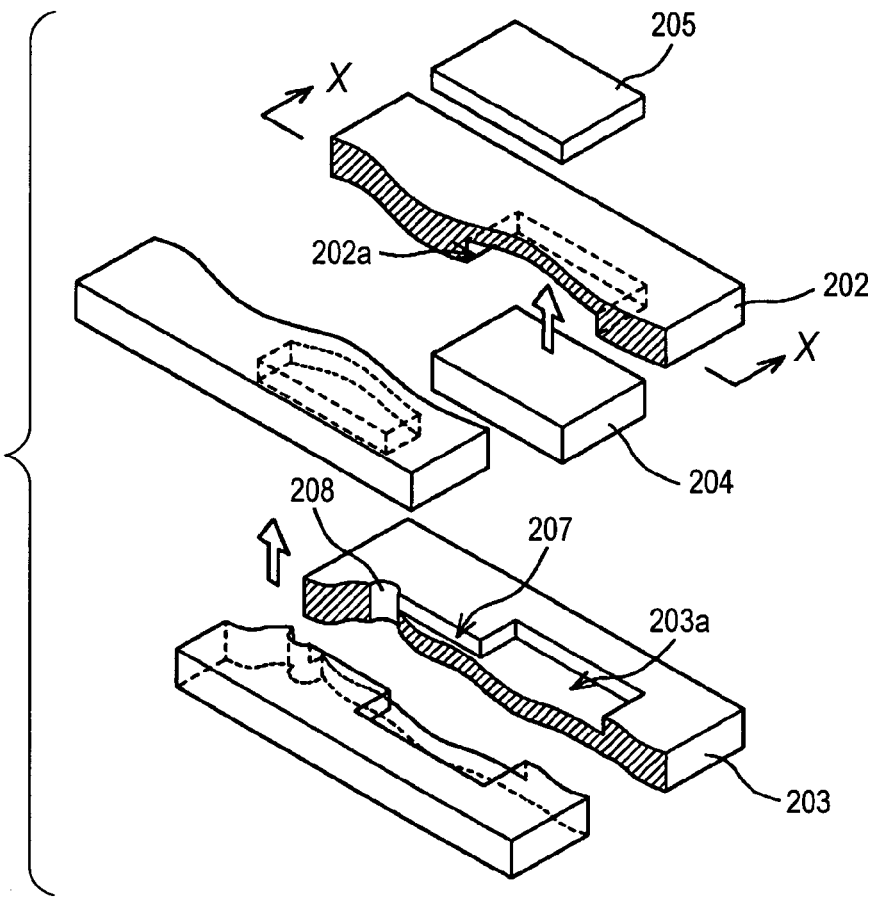
FIG. 13A is an exploded descriptive view of a micropump according to a ninth embodiment of the invention.
FIG. 13B is a cross-sectional view of the micropump taken along line X-X in FIG. 13A.
Figure 13:
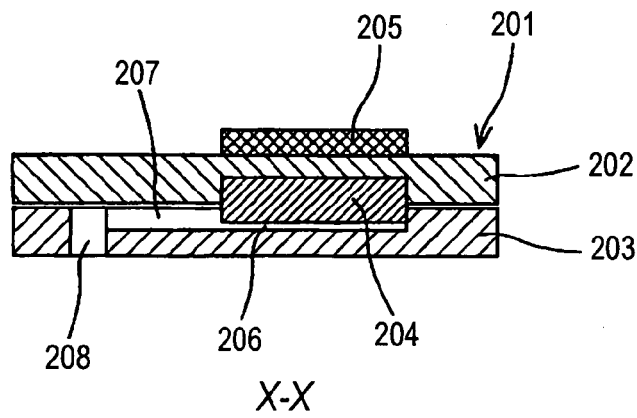
Figure 14:
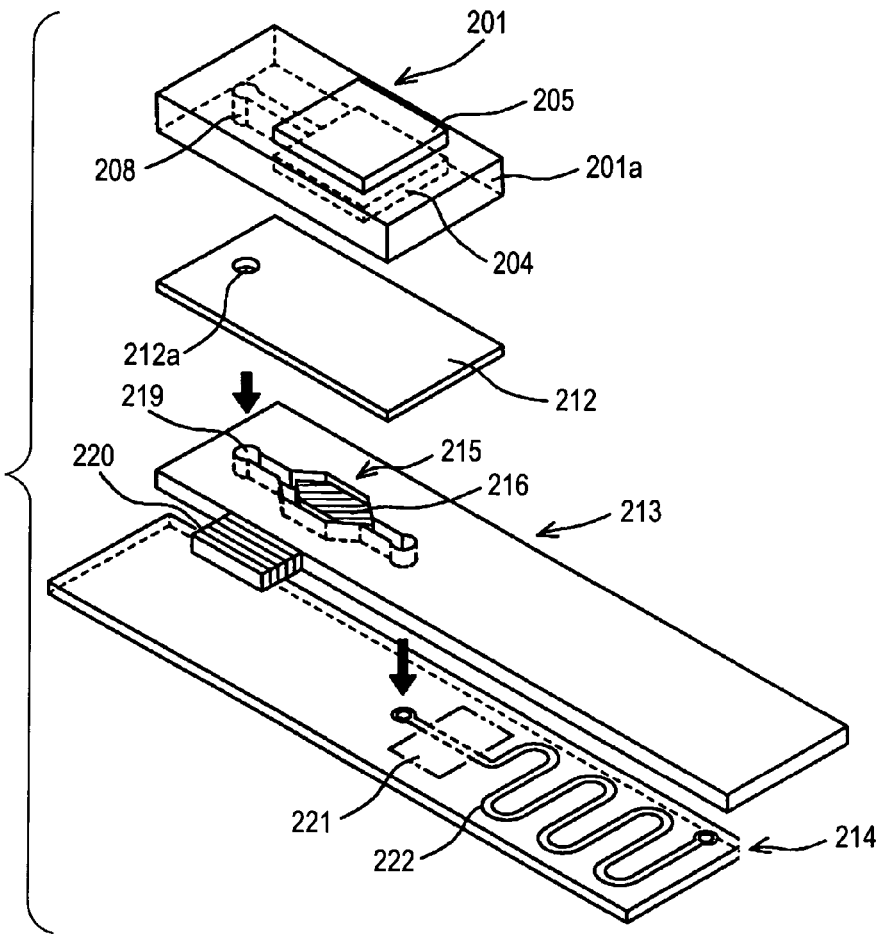
FIG. 14A is an exploded perspective view of a sample processing chip on which the micropumps according to the ninth embodiment of the invention are stacked.
FIG. 14B is a fragmentary broken enlarged view of a flow passage control chip constituting the sample processing chip shown in FIG. 14A.
Figure 14:
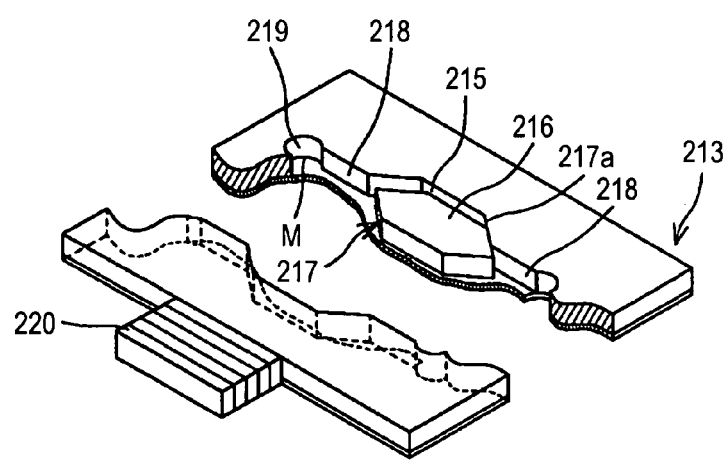

The embodiments have been described, wherein one micropump and one reaction detection flow passage are provided for one sample processing chip. In contrast, in a sample processing chip according to an eighth embodiment, a plurality of independent micropumps are formed and stacked for one chip, and a plurality of independent reaction detection flow passages are formed and stacked for one chip. FIG. 12A is an exploded perspective view of a sample processing chip according to an eighth embodiment of the invention; and FIG. 12B is a descriptive view of a reaction agent of the micropump of the sample processing chip shown in FIG. 12A.

In FIGS. 12A and 12B, reference numerals 71, 72, and 73 designate a plurality of independent channels; 81, 82, and 83 designate a plurality of independent communication holes of the micropumps; 151, 152, and 153 designate a plurality of independent microvalve mechanisms; 191, 192, and 193 designate a plurality of independent reservoirs; and 261, 262, and 263 designate independent reaction chambers. When reaction detection processes differ from each other, the reaction chambers 261, 262, and 263 are optimized so as to correspond to the respective processes, thereby forming a sample processing chip having a higher degree of accuracy.

A plurality of the independent microvalve mechanisms 151, 152, and 153 have valve elements, which have different, unique vibration frequencies. Accordingly, a plurality of the microvalves can be controlled independently by means of superimposing on vibrations the natural frequency of any one of the microvalve mechanisms 151, 152, and 153 which is desired to be controlled by way of the piezoelectric element 20, or causing excitation of the valve element at a single frequency. All the reaction agents 4 provided in the reaction chambers 261, 262, and 263 shown in FIG. 12B are identical with each other and are of the same size. No difference exists between the channels 71, 72, and 73. The quantity of gas produced is changed by determining the number of channels, thereby controlling pressure. Further, the frequency and amplitude of an electric current and those of a voltage, both being supplied to the piezoelectric element 20, are changed, thereby enabling independent control of the reaction detection flow passage.

As mentioned above, by means of adoption of the sample processing chip of the eighth embodiment, the plurality of independent reaction detection flow passages are controlled solely or simultaneously by means of a single chip. As a result, measurement can be performed without preparation of multiple chips for applications. If the reaction agent is formed in such a manner as shown in FIG. 12B, pressure control will become considerably easy and can be made versatile.

Working-effects of the first through eighth embodiments will be described hereinbelow.

The micropumps of the embodiments enable lamination of reaction initiation means and reaction agents; high-speed reactive generation of a gas by virtue of a microstructure; easy performance of high-precision micromachining operation which has superior responsiveness and produces large transport force; slimming of a micropump and lamination and assembly of the micropump on and in another chip; achievement of a high sealing characteristic; and recycling of the reaction initiation means because the reaction initiation means is stacked as a separate element.

The pump structural material is formed by stacking the first and second structural materials. Hence, the pump structural material can be made slim, and assemble of the pump structural material on another chip is easy. A high sealing characteristic is achieved, and the reaction initiation means is stacked as a separate member. Hence, the reaction initiation means can be recycled, because it is stacked as a separate element.

An opening to be used for loading a reaction agent is formed in the first intermediate structural material, and an opening of the reaction chamber and that of the channel are formed in the second intermediate structural material. High-precision microprocessing can be very easily performed through two-dimensional processing. The structural elements can be slimmed, and hence assembly of the structural elements by stacking the structural elements on another chip is easy. A sealing characteristic of the structural elements is high, and reaction initiation means is stacked as a separate element, thereby enabling recycling of the reaction initiation means.

Since the structural elements can be slimmed, assembly of the structural elements by stacking the structural elements on another chip is easy. A high sealing characteristic is achieved, thereby enabling recycling of the reaction initiation means, because it is stacked as a separate element.

Since the micropump is covered with the sheet material, neither leakage nor evaporation arises even when the reaction agent is liquid. Hence, the sealing characteristic of the micropump is high. The structure of the micropump can be made suitable for direct reaction between two kinds of liquids. Since a liquid reaction agent is encapsulated in a microcapsule, the reaction agent can be handled in the same manner as is a solid reaction agent. A reaction agent can be stably and readily housed in a pump. Eventually, the kinds of usable reaction agents can be broadened in scope.

Since first liquid is substantially dispersed in second liquid, reaction becomes faster. Since required amounts of two liquids are housed in microcapsule as a pair, reaction becomes more stable and faster.

Even in the case of a reaction agent consisting of two liquids, the reaction agent can be handled in the same manner as is a solid reaction agent, and hence the reaction agent can be stably and readily housed in a pump. Even in the case of a reaction agent consisting of a solid reaction agent and a liquid reaction agent, the reaction agent can be stably and readily housed in the pump. Since an inactive gas is produced, no influence is exerted on a human body, the environment, and a sample. Hence, the micropump has high safety. As a result of use of a non-contamination chemical, a highly safe micropump can be implemented without affecting the human body and the environment and without contaminating a sample.

Since the reaction agent is miniaturized, reaction speed is increased and responsiveness can be enhanced. A small reaction agent causes reaction at a stroke, and a pressure stemming from a produced gas shows a sharp rise and can reach a target pressure immediately.

When small reaction agents are arranged in series, a reaction loss which arises at the end of use becomes smaller.

When a plurality of trains are connected in parallel with the channel, each train comprising a predetermined number of small reaction agents that are arranged in series, small reaction agents to be used in one reaction are arranged in completely the same state. Hence, a small difference arises between respective reacting operations, and reaction becomes stable. Since the small reaction agents are connected directly to the channels, the small reaction chambers that have caused reaction do not permit passage of a reactant gas, and hence reaction becomes stable.

Since the reaction chambers are individually separated from each other, the chambers become stable. Further, the reaction agent is miniaturized, and hence the reaction speed becomes faster, thereby enhancing responsiveness and facilitating pressure control. Since a plurality of small reaction agents are housed in the reaction chambers, a reaction loss which is caused at the end of use becomes smaller. Since the reaction chambers are not partitioned by means of small chambers, a packaging efficiency of small reaction agents within a given volume is improved. Since the micropump is constituted of a plurality of small reaction initiation means, reaction can be controlled on the scale of a small-reaction-initiation means, and hence reaction becomes stable.

The quantity of reaction agent is sequentially increased in accordance with the volume of a reaction agent gasified by reaction. Hence, the quantity of small reaction agent is determined in consideration of the volume of the employed reaction agent, whereby more stable pressure is obtained. A plurality of small reaction agents are as a predetermined multiple of small reaction agents of predetermined unit quantity. Hence, packaging efficiency of reaction agent is improved.

Since the reaction initiation means is attached to the surface of another structural material which opposes a reaction agent and is to be stacked on the pump structural material, the structure of the micropump can be simplified, thereby rendering a chip compact and enabling an attempt to reduce costs.

Measurement can be performed by means of only removal and attachment of the chip of the micropump. Even when a chip is replaced and disposed of, the reaction initiation means can be recycled.

The reaction initiation means is heating means for heating a reaction agent, and hence control of reaction of the reaction agent is easy, and response is quick.

Provision of reaction initiation means on a circuit board is easy, and reaction initiation means can be recycled by means of removal and attachment of the circuit board. Since the reaction initiation means is provided on the circuit board, the configuration of the micropump is shifted to the board and can be simplified by combination of the circuit board with the micropump. Thus, a sample processing chip can be formed inexpensively. Since a sensor or a control circuit can be mounted on the circuit board, the control function of the reaction initiation means can be implemented readily. Control of the micropump and control, reaction control, and detection of another chip can be performed.

Since the reaction agents per se produce heat at the level of Joule heat, there is no necessity for providing the heating means with a resistor. Control of reaction of the reaction agent is easy, and response is also fast. When the reaction agent has a nonconductive characteristic, a conductive material is mixed in the reaction agent. Hence, a non-conductive reaction agent also produces heat at the Joule heat, thereby enabling control of reaction.

The heat produced by the reaction initiation means can be transmitted to the reaction agent in a highly efficient manner by means of a high-heat conduction section. Since the heat of the reaction initiation means is applied directly to the portion where the reaction agent is exposed, response is fast.

Since a heat insulation section is interposed between the reaction chamber and the outlet port, the heat of the reaction chamber is prevented from transmitting to the gas flowing through the outlet port, thereby rendering the temperature of the gas stable. Occurrence of chain reaction of other reaction chambers, which would otherwise be caused by the heat derived from reaction of the small reaction chamber, is prevented. Since the heat insulation section is formed from slits, processing of the heat insulation section is easy.

Since a heat insulation section is interposed between the reaction chamber and the outlet port, a change in the volume of gas stemming from a temperature rise can be made small by cooling the produced gas to a constant temperature, thereby rendering control stable. The temperature of the reactant gas is made safe, and chemical reaction in another connected chip is not affected by temperature. As a result of the produced gas being cooled to a constant temperature, a change in the volume of the gas derived from a temperature change existing between the respective small reaction chambers can be made small, thereby stabilizing control. The temperature of the reactant gas is made safe, and chemical reaction in another connected chip is not affected by temperature. Since the heat insulation section is formed from slits, processing of the heat insulation section is easy.

The length or distance of a channel existing between a reaction chamber and an outlet port is formed to a predetermined length or more, and the temperature of the gas produced by the reaction chamber drops to a predetermined temperature or less. Transfer of the heat of the reaction chamber to the gas flowing through the outlet port is prevented, thereby rendering the temperature of the gas stable.

The temperature of the gas produced in the small reaction chamber drops to a temperature below a predetermined temperature at the outlet port. Hence, occurrence of chain reaction of another reaction chamber, which would otherwise be caused by the reaction heat of the small reaction chamber, is prevented.

In the micropump unit of the embodiment, a plurality of micropumps are provided independently, and hence a plurality of samples are supplied and subjected to reaction by means of a single chip, thereby enabling detection of a result of reaction. Each of the micropumps has a microstructure, and a plurality of micropumps can be assembled into a chip module. As a result, superior responsiveness, a slim profile, recycling, and ease of assembly are achieved. Among the micropumps, the small reaction agents are of identical configuration, and hence pressure control is easy, and the sample processing chip can be made versatile.

In the sample processing chip of the embodiment, the micropump, the flow passage control chip, and the processing chip are stacked one on top of the other, thereby achieving a compact, slim sample processing chip which is easy to process.

Since the flow passage control chip and the processing chip are assembled into a single chip, the sample processing chip can be made more compact, slim, and easy to process. The flow passage control chip and the sample processing chip are replaced and disposed of, thereby enabling recycling of the micropump. The micropump and the flow passage control chip are assembled into a single chip, and hence the sample processing chip can be made more compact, slim, and easy to process. The micropump, the flow passage control chip, and the processing chip are assembled into a single chip, and hence a very compact, slim sample processing chip can be realized.

A micropump unit having a plurality of micropumps provided independently, the flow passage control chip, and the processing chip are stacked one on top of the other, thereby rendering the sample processing chip compact, slim, and easy to process. The flow passage control chip and the sample processing chip are replaced and disposed of, thereby enabling recycling of the micropump unit.

Since the flow passage control chip and the processing chip are assembled into a single chip, the sample processing chip can be made more compact, slim, and easy to process. The micropump and the flow passage control chip are assembled in a single chip, and hence the sample processing chip can be made more compact, slim, and easy to process.

Since the micropump unit, the flow passage control unit, and the processing chip are assembled into a single chip, a very compact, slim sample processing chip can be realized. Even when a reaction agent is liquid, the micropump does not cause any leakage or evaporation of the liquid and has a high sealing characteristic. When the micropump is attached to the flow passage control chip, a sealing material is broken immediately, thereby bringing the micropump into mutual communication with the reservoir.

The reaction initiation means is stacked on the micropump, and the micropump produces a predetermined gas within a reaction chamber by means of operation of the reaction initiation means. Since the micropump has a microstructure, gas generation reaction can occur at high speed, thereby achieving superior responsiveness and great transport force. High-precision micromachining can be performed easily, and the micropump can be made slim. Therefore, assembly of another chip by stacking the micropump on the chip is easy, and a high sealing characteristic is achieved. Since the reaction initiation means is heating means for heating a reaction agent, control of reaction of the reaction agent is easy, and reaction is also fast.

A first invention is directed toward a micropump comprising: a pump structural material having a reaction chamber formed therein; a reaction agent which is housed in the reaction chamber and produces a gas of predetermined pressure; reaction initiation means which is disposed beside the reaction agent and causes the reaction agent to produce a gas; and a channel which is provided in the pump structural material and guides the gas of predetermined pressure produced by the reaction agent to an outlet from the reaction chamber, wherein the pump structural material and the reaction initiation means are stacked one on top of the other. The reaction initiation means and the reaction agent are stacked one on top of the other, and reaction for generating a gas can be carried out at high speed because of a microstructure. The micropump has superior responsiveness and great transport force and can easily perform high-precision micromachining and be slimmed. Hence, the micropump is easily assembled by stacking the micropump on another chip. Since the micropump has a high sealing characteristic and the reaction initiation means is stacked as a separate members the reaction initiation means can be recycled.

A second invention is directed toward the micropump of the invention defined in claim 1, characterized in that the pump structural material is formed by stacking a first structural material and a second structural material one on top of the other; an indentation section is formed in at least either the first or second structural material; and the first and second structural materials are stacked so as to oppose each other, thereby constituting the reaction chamber. The pump structural material is formed by stacking the first structural material and the second structural material. Since the micropump can be slimmed, the micropump is easily assembled by stacking the micropump on another chip. The micropump has a high sealing characteristic, and the reaction initiation means is stacked as a separate member. Hence, the reaction initiation means can be recycled.

A third invention is directed toward the micropump of the invention defined in claim 1, characterized in that the pump structural material is formed by stacking a first structural material, a second structural material, a first intermediate structural material, and a second intermediate structural material; an opening to be used for attachment of at least the reaction agent is formed in the first intermediate structural material; and at least an opening which is to serve as the channel is formed in the second intermediate structural material. High-precision micromachining can be performed very easily through two-dimensional processing. Since the micropump can be slimmed, the micropump is easily assembled by stacking the micropump on another chip. The micropump has a high sealing characteristic, and the reaction initiation means is stacked as a separate member. Hence, the reaction initiation means can be recycled.

A fourth invention is directed toward the micropump of the invention defined in claim 1, characterized in that the pump structural material is formed by stacking first and second structural materials one on top of the other, and the reaction initiation means is provided within the indentation section of the first structural material. Since the pump structural material is formed by stacking the first and second structural materials one on top of the other, the micropump can be slimmed. Hence, the micropump is easily assembled by stacking the micropump on another chip. The micropump has a high sealing characteristic, and the reaction initiation means is stacked as a separate member. Hence, the reaction initiation means can be recycled.

A fifth invention is directed toward the micropump of the invention defined in claim 2, characterized in that, when the reaction agent is liquid, the reaction agent is housed in a first indentation section of the first structural material and covered with a sheet material. Even when the reaction agent is liquid, neither leakage nor evaporation of the reaction agent arises, and hence a high sealing characteristic is achieved.

A sixth invention is directed toward the micropump of the invention defined in claim 5, characterized in that, when the reaction agent is formed from first and second liquids, the first and second liquids are housed in the first indentation section in a separated state; and the reaction initiation means releases the first and second liquids from a separated state, to thereby cause the liquids to react with each other. The micropump can be imparted with a structure suitable for causing two kinds of liquids to directly react with each other.

A seventh invention is directed toward the micropump of any one of the invention defined in claims 1 through 6, characterized in that, when the reaction agent is liquid, the reaction agent is housed in a microcapsule, and the microcapsule is loaded in the reaction chamber. A liquid reaction agent is housed in a microcapsule, and hence the liquid reaction agent can be handled in the same manner as is a solid reaction agent. Stable and easy storage of the reaction agent into a pump becomes feasible. Therefore, the kinds of usable reaction agents can be considerably broadened in scope.

An eighth invention is directed toward the micropump of any one of the inventions defined in claims 1 through 6, characterized in that, when the reaction agent is formed from first and second liquids, the first liquid is housed in a microcapsule and dispersed in the second liquid. Since the first liquid is substantially dispersed in the second liquid, reaction becomes faster.

A ninth invention is directed toward the micropump of any one of the inventions defined in claims 1 through 6, characterized in that, when the reaction agent is formed from the first and second liquids, the first liquid is housed in a first microcapsule, and the first microcapsule is encapsulated in a second microcapsule along with the second liquid. Since required amounts of two liquids are housed as a pair in one capsule, reaction becomes more stable and faster.

A tenth invention is directed toward the micropump of any one of the inventions defined in claims 1 through 6, characterized in that, when the reaction agent is formed from first and second liquids, the first liquid and the second liquid are mixed together while the first liquid is encapsulated in the first microcapsule and the second liquid is housed in the second microcapsule. Even in the case of two liquid reaction agents, the reaction agents can be handled in the same manner as is a solid reaction agent, and hence the reaction agent can be stably and readily housed in the pump.

An eleventh invention is directed toward the micropump of any one of the inventions defined in claims 1 through 4, characterized in that, when the reaction agent is formed from a liquid and a solid, the liquid is housed in a microcapsule and dispersed in the solid. Even in the case of reaction agents formed from solid and liquid reaction agents, the reaction agents can be housed stably and readily in the pump.

A twelfth invention is directed toward the micropump of any one of the inventions defined in claims 1 through 11, characterized in that a gas derived from reaction of the reaction agent is an inactive gas. Since an inactive gas is produced, no influence is exerted on the human body, the environment, or a sample. A highly safe micropump is obtained.

A thirteenth invention is directed toward the micropump of any one of the inventions defined in claims 1 through 11, characterized in that the reaction agent is a noncontaminating chemical. Use of a noncontaminating chemical enables realization of a highly safe micropump which does not affect the human body or the environment and does not contaminate a sample.

A fourteenth invention is directed toward the micropump of any one of the inventions defined in claims 1 through 13, characterized in that the reaction agent is formed from a plurality of small reaction agents. Since the reaction agent is miniaturized, a reaction speed becomes faster, and responsiveness can be enhanced. Small reaction agents cause reaction simultaneously, and the pressure due to the produced gas exhibits a sharp rise and can reach a target pressure level at a stroke.

A fifteenth invention is directed toward the micropump of the invention, characterized in that a plurality of the small reaction agents are arranged in series. When the small reaction agents are arranged in series, a reaction loss which arises at the end of use becomes smaller.

A sixteenth invention is directed toward the micropump of the invention, characterized in that a plurality of trains, each comprising a predetermined number of the small reaction agents arranged in series, are connected to the channels in parallel. Since small reaction agents to be used in one reaction are aligned in totally the same state, a difference between reactions becomes small, and the reactions become stable.

A seventeenth invention is directed toward the micropump of the invention, characterized in that the small reaction agents are connected directly to the channels. Since a reactant gas fails to pass through the small reaction chambers that have already finished reacting, reaction becomes stable.

An eighteenth invention is directed toward the micropump of the invention, characterized in that the reaction chamber is constituted of a plurality of small reaction chambers, and the small reaction agents are housed in the respective reaction chambers. Since the reaction chambers are individually separated from each other, reaction becomes stable, and a reaction speed for miniaturizing the reaction agent becomes faster because the reaction agent is miniaturized. Thus, responsiveness can be enhanced, and pressure control is easy.

A nineteenth invention is directed toward the micropump of the invention, characterized in that a plurality of the small reaction agents are housed in the reaction chamber. A reaction loss which arises at the end of use is made smaller, and the micropump is not partitioned with small chambers. Hence, packaging efficiency of small reaction agent within a given volume is improved.

A twentieth invention is directed toward the micropump of any one of the inventions defined in claim 1, characterized in that the reaction initiation means is constituted of a plurality of small reaction initiation means. Since a reaction can be controlled on a per-small-reaction-initiation-means basis, reaction becomes stable.

A twenty-first invention is directed toward the micropump, characterized in that the quantity of the reaction agent is sequentially increased in accordance with the volume of a reaction agent gasified through reaction. The quantity of reaction agent is set in consideration of the volume of used reaction agent, thereby producing more stable pressure.

A twenty-second invention is directed toward the micropump of the invention, characterized in that a plurality of the small reaction agents are small reaction agents which are based on a predetermined multiple of small reaction agents of predetermined unit quantity. Packaging efficiency of a reaction agent is enhanced.

A twenty-third invention is directed toward the micropump of the invention defined in claim 1, characterized in that the reaction initiation means is attached to the surface of another structural material which opposes the reaction agent and is to be stacked on the pump structural material. The configuration of the micropump can be simplified, thereby rendering a chip compact and inexpensive.

A twenty-fourth invention is directed toward the micropump of the invention, characterized in that the other structural material is a housing of a device on which a chip is to be set. Provision of the reaction-initiation means on the device is easy, and measurement can be carried out by removable attachment of a chip of the micropump. Even if the chip is replaced or disposed of, the reaction initiation means can be recycled.

A twenty-fifth invention is directed toward the micropump, characterized in that the reaction initiation means is heating means for heating the reaction agent. Control of reaction of the reaction agent is easy, and response is fast.

A twenty-sixth invention is directed toward the micropump of the invention, characterized in that the other structural material is a circuit board. Provision of the reaction initiation means on the circuit board is easy, and the reaction initiation means can be recycled so long as the circuit board is made removable and attachable. Since the reaction initiation means is provided on the circuit board, the configuration of the micropump can be shifted to the circuit board and simplified by combination of the circuit board and the micropump, thereby inexpensively forming a sample processing chip. Moreover, a sensor or a control circuit can be mounted on the circuit board, and hence control function of the reaction initiation means can be realized easily. Control of another chip, reaction control, and detection as well as control of the micropump can be carried out.

A twenty-seventh invention is directed toward the micropump of the invention, characterized in that the reaction initiation means is constituted of a pair of electrodes provided on a heat transfer structural material, and a resistor connected between the electrodes. Reaction control of the reaction agent is easy, and response is fast.

A twenty-eighth invention is directed toward the micropump of any one of the inventions, characterized in that, when the reaction agent has a conductive characteristic, the reaction initiation means has a pair of electrodes to come into contact with the reaction agent, and the reaction agent produces heat at the level of Joule heat. There is obviated a necessity for providing a resistor for use with heating means, and control of reaction of the reaction agent is easy. Moreover, response is fast.

A twenty-ninth invention is directed toward the micropump of any one of the inventions, characterized in that, when the reaction agent has a nonconductive characteristic, a conductive material is mixed into the reaction agent, to thereby impart a conductive characteristic to the reaction agent. Even in the case of a non-conductive reaction agent, the reaction agent produces heat at the level of Joule heat, thereby controlling reaction.

A thirtieth invention is directed toward the micropump of any one of the inventions, characterized in that a pump structural material interposed between the reaction initiation means and the reaction agent has a high heat transfer section for transmitting the heat produced by the reaction initiation means to the reaction agent. The high-heat conduction section enables efficient transfer of the heat produced by the reaction initiation means to the reaction agent.

A thirty-first invention is directed toward the micropump of any one of the inventions, characterized in that the reaction agent is exposed in the pump structural material, and the heat produced by the reaction initiation means is transmitted directly to the reaction agent. Heat of the reaction initiation means is applied directly to the portion where the reaction agent is exposed, and hence response is fast.

A thirty-second invention is directed toward the micropump of the invention defined in claim 1, characterized in that the pump structural material is provided with a heat insulation section interposed between the reaction chamber and the outlet port. Transfer of the heat of the reaction chamber to the gas flowing through the outlet port is prevented, thereby rendering the temperature of the gas stable.

A thirty-third invention is directed toward the micropump of the invention, characterized in that the pump structural material has heat insulation sections disposed between small reaction chambers. Chain reaction of other reaction chambers, which would otherwise be caused by the reaction heat of one of the small reaction chambers, is prevented.

A thirty-fourth invention is directed toward the micropump of the invention, characterized in that the heat insulation section is a slit formed in the pump structural material, and an air layer or liquid layer is formed in the slit. Since the heat insulation section is a slit, processing of the slit is easy.

A thirty-fifth invention is directed toward the micropump of the invention defined in claim 1, characterized in that the pump structural material is provided with a heat radiation section interposed between the reaction chamber and the outlet port. As a result of the produced gas being cooled to a constant temperature, a change in the volume of a produced gas due to a temperature change can be made small, thereby rendering control stable. The temperature of a reactant gas is made safe, and chemical reaction of another connected chip is not affected by temperature.

A thirty-sixth invention is directed toward the micropump of the invention, characterized in that the pump structural material has heat radiation sections disposed between small reaction chambers. As a result of the produced gas being cooled to a constant temperature, a change in the volume of a produced gas due to a temperature change among respective small chambers can be made small, thereby rendering control stable. The temperature of a reactant gas is made safe, and chemical reaction of another connected chip is not affected by temperature.

A thirty-seventh invention is directed toward the micropump of the invention, characterized in that the heat radiation section is a slit formed in the pump structural material, and a coolant is circulated through the inside of the slit. Since the heat radiation section is a slit, processing of the heat radiation section is easy.

A thirty-eighth invention is directed toward the micropump of the invention defined in claim 1, characterized in that a channel is formed in the pump structural material between the reaction chamber and the outlet port to a predetermined length or more, and the temperature of the gas produced by the reaction chamber drops to a temperature below a predetermined temperature at the outlet port. Transfer of the heat of the reaction chamber to the gas flowing through the outlet port is prevented, thereby rendering the temperature of the gas stable.

A thirty-ninth invention is directed toward the micropump of the invention, characterized in that a channel is formed in the pump structural material between the reaction chambers to a predetermined length or more, and the temperature of the gas produced by the small reaction chamber drops to a temperature below a temperature at which a gas causes reaction in the adjacent small chamber. Chain reaction of other reaction chambers, which would otherwise be caused by the reaction heat of one of the small reaction chambers, is prevented.

A fortieth invention is directed toward a micropump unit comprising a pump structural material independently equipped with a plurality of micropumps defined in any of the inventions, and the micropumps can be used solely or in combination. Since a plurality of micropumps are provided independently, one chip enables supply of a plurality of samples, reaction of the samples, and detection of a reaction result. Each of the micropumps has a microstructure, and a plurality of micropumps can be assembled into a chip module. As a result, superior responsiveness, slim profile, recycling, and ease of assembly are achieved.

A forty-first invention is directed toward the micropump unit of the invention, characterized in that each reaction agent of each micropump is formed from a plurality of small reaction agents, and among the micropumps the small reaction agents are of the same configuration. Pressure control is easy, and the sample processing chip can be readily made versatile.

A forty-second invention is directed toward a sample processing chip comprising: a micropump defined in any one of the inventions; a flow passage control chip which is stacked on the micropump, and which supplies a sample by means of a gas ejected from the micropump, thereby controlling a flow passage; and a processing chip for processing a sample supplied from the flow passage control chip. The micropump, the flow passage control chip, and the processing chip are stacked one on top of the other, thereby rendering the sample processing chip compact, slim, and easy to process.

A forty-third invention is directed toward the sample processing chip of the invention, characterized in that the flow passage control chip and the processing chip are assembled in a single chip. Since the flow passage control chip and the processing chip are assembled into a single chip, the sample processing chip can be made more compact, slim, and easy to process. The fluid control chip and the sample processing chip are replaced and disposed, and the micropump can be recycled.

A forty-fourth invention is directed toward the sample processing chip of the invention, characterized in that the micropump and the flow passage control chip are assembled into a single chip. The micropump and the flow passage control chip are assembled in a single chip, and hence the sample processing chip can be made further compact, slim, and easy to process.

A forty-fifth invention is directed toward the sample processing chip of the invention, characterized in that the micropump, the flow passage control chip, and the processing chip are assembled into a single chip. Since the micropump, the flow passage control chip, and the processing chip are assembled into a single chip, a considerably compact, slim sample processing chip can be obtained.

A forty-sixth invention is directed toward a sample processing chip comprising: a micropump unit equipped with the pump structural material defined in the invention; a flow passage control chip in which a plurality of flow passages are formed, which is stacked on the pump structural material, and which supplies a sample through use of a gas ejected from one or more micropumps of the micropump unit and controls the flow passage at this time; and a processing chip for processing the sample supplied from the flow passage control chip. The micropump unit independently provided with a plurality of micropumps, the flow passage control chip, and the processing chip are stacked one on top of the other, thereby rendering the sample processing chip compact, slim, and easy to process. The fluid control chip and the sample processing chip are replaced and disposed of, whereby the micropump unit can be recycled.

A forty-seventh invention is directed toward the sample processing chip of the invention, characterized in that the flow passage control chip and the processing chip are assembled into a single chip. Hence, the sample processing chip can be made further compact, slim, and easy to process.

A forty-eighth invention is directed toward the sample processing chip of the invention, characterized in that the micropump and the flow passage control chip are assembled into a single chip. Hence, the sample processing chip can be made further compact, slim, and easy to process.

A forty-ninth invention is directed toward the sample processing chip of the invention, characterized in that the micropump, the flow passage control chip, and the processing chip are assembled into a single chip. Hence, there can be realized a considerably compact, slim sample processing chip.

A fiftieth invention is directed toward the sample processing chip of the invention, characterized in that a sealing material is interposed between the micropump and the flow passage control chip. Even when the reaction agent is liquid, neither leakage nor evaporation of the reaction agent arises from the micropump, and hence a high sealing characteristic is achieved.

A fifty-first invention is directed toward the sample processing chip of the invention, characterized in that seal material breaking means is provided in the vicinity of a reservoir of the flow passage control chip. When the micropump is attached to the flow passage control chip, the seal material is immediately broken, thereby bringing the micropump into mutual communication with the reservoir.

A fifty-second invention is directed toward a micropump which is stacked on reaction initiation means and produces a predetermined gas in a reaction chamber by means of actuation of the reaction initiation means, the micropump comprising: a pump structural material having the reaction chamber; a reaction agent which is housed in the reaction chamber and produces a gas; and a channel which is provided in the structural material and guides a gas produced by the reaction agent from the reaction chamber to an outlet port. Since the micropump has such a microstructure, gas generation reaction can be effected at high speed, thereby achieving superior responsiveness and great transport force. High-precision micromachining can be performed easily, and the micropump can be made slim. Therefore, another chip is easily assembled by stacking the micropump on the chip, and a high sealing characteristic is achieved.

A fifty-third invention is directed toward the micropump of the invention, characterized in that the reaction initiation means is heating means for heating the reaction agent. Control of reaction of the reaction agent is easy, and reaction is also fast.

A second embodiment group of the invention will now be described by reference to FIGS. 13 to 20.

Ninth Embodiment

A micropump and a sample processing chip, both pertaining to a ninth embodiment of the invention, will be described.

Figure 15:
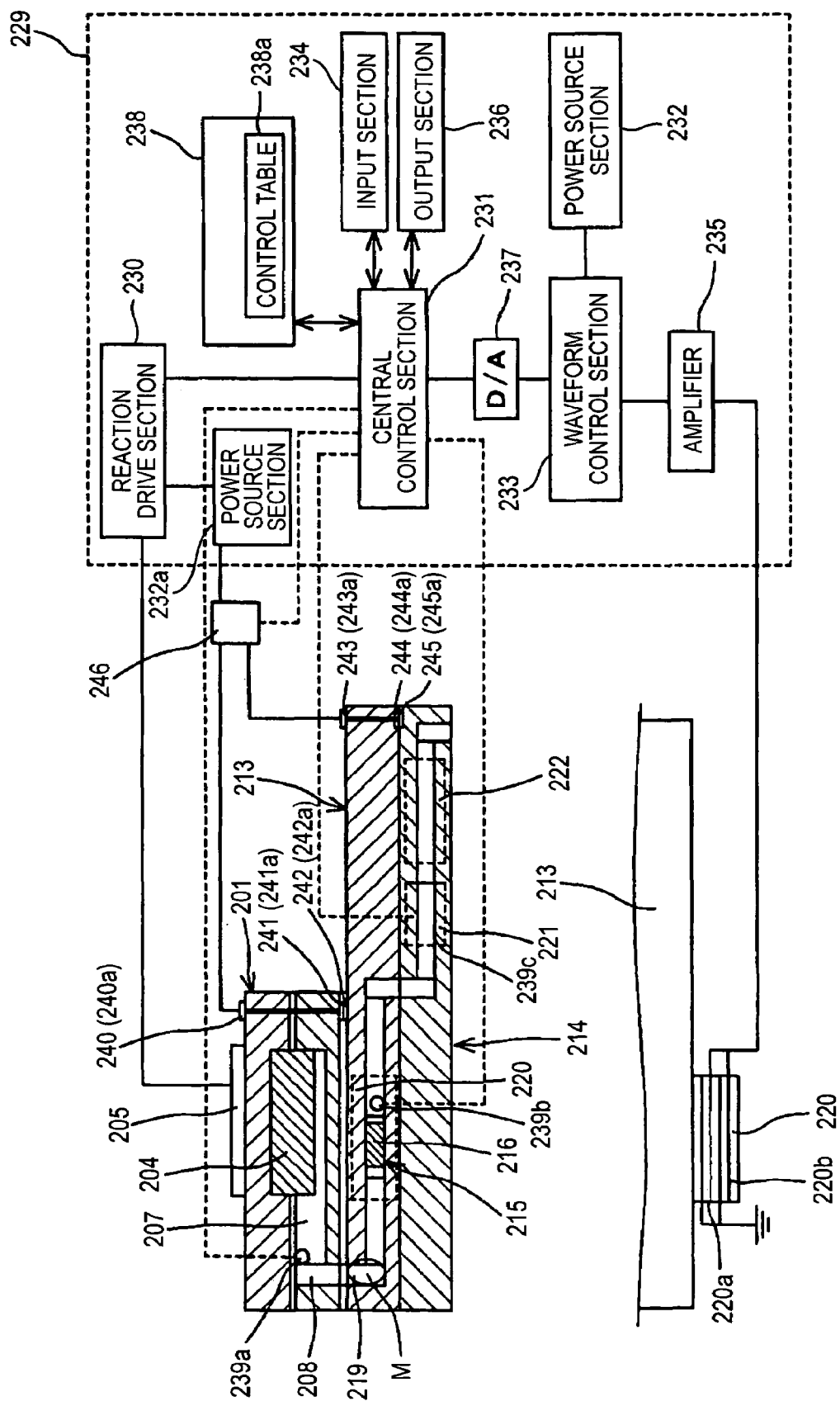
FIG. 15 is a view showing the micropump according to the ninth embodiment of the invention and a controller of a sample processing chip on which the micropumps are stacked.

FIG. 13A is an exploded descriptive view of a micropump according to a ninth embodiment of the invention; FIG. 13B is a cross-sectional view of the micropump shown in FIG. 13A taken along line X-X; FIG. 14A is an exploded perspective view of a sample processing chip on which the micropumps according to the ninth embodiment of the invention are stacked; FIG. 14B is a fragmentary broken enlarged view of a flow passage control chip constituting the sample processing chip shown in FIG. 14A; FIG. 15 is a view showing the micropump according to the ninth embodiment of the invention and a controller of a sample processing chip on which the micropumps are stacked; and FIG. 16 is a descriptive view of the principal section of a placement detection section for detecting completion of lamination of the sample processing chip according to the ninth embodiment of the invention.

In FIGS. 13A and 13B, reference numeral 201 designates a micropump which produces a high-pressure gas by means of chemical reaction, to thereby transfer, by means of the high pressure gas, a sample M stored in a reservoir of another chip remaining in communication with the micropump; 202 designates a first structural material of the micropump 201; 202a designates an indentation formed in the first structural material 202; 203 designates a second structural material of the micropump 201; and 203a designates an indentation formed in the second structural material 203. Reference numeral 204 designates a reaction agent which is stored in the indentations 202a, 203a and produces a gas by means of chemical reaction; and 205 designates reaction initiation section which initiates, interrupts, or stops reaction by application of heat and pressure to the reaction agent 204. Dependent on a reaction temperature, the reaction initiation section 205 can easily control heating operation by means of a heating element, and the reaction initiation section 205 is most suitable for use with a micromachine. Alternatively, reaction may be commenced by application of pressure or the like. Reference numeral 206 designates a reaction chamber formed from the indentations 202a, 203a; 207 designates a channel for introducing a reacted high-pressure gas from the reaction chamber 206 to another chip; and 208 designates a communication hole (i.e., a discharge port of the present embodiment) which is provided at the end of the channel 207 and is intended for establishing connection with another chip.

Figure 16:
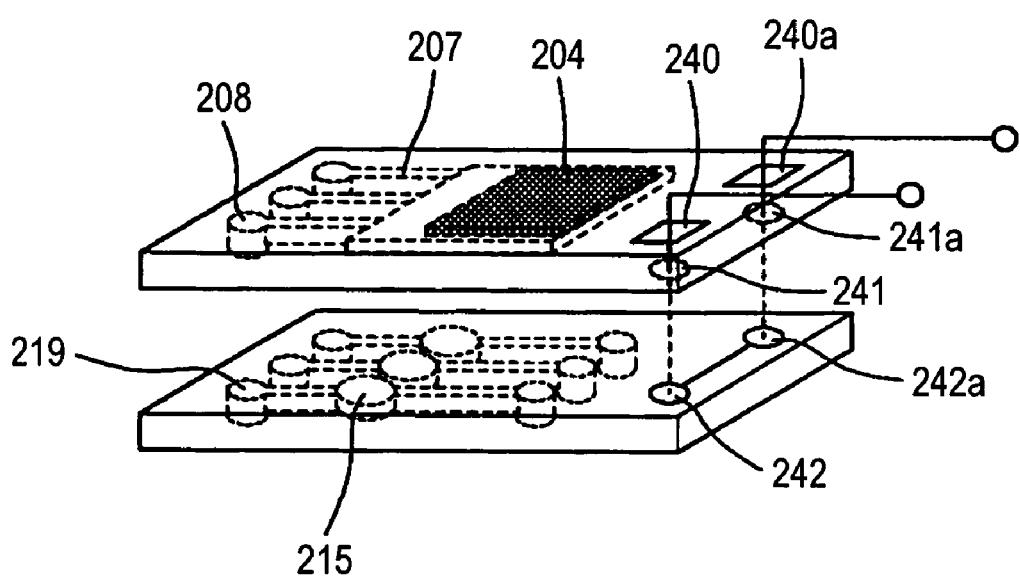
FIG. 16 is a descriptive view of the principal section of a placement detection section for detecting completion of lamination of the sample processing chip according to the ninth embodiment of the invention.
Figure 17:
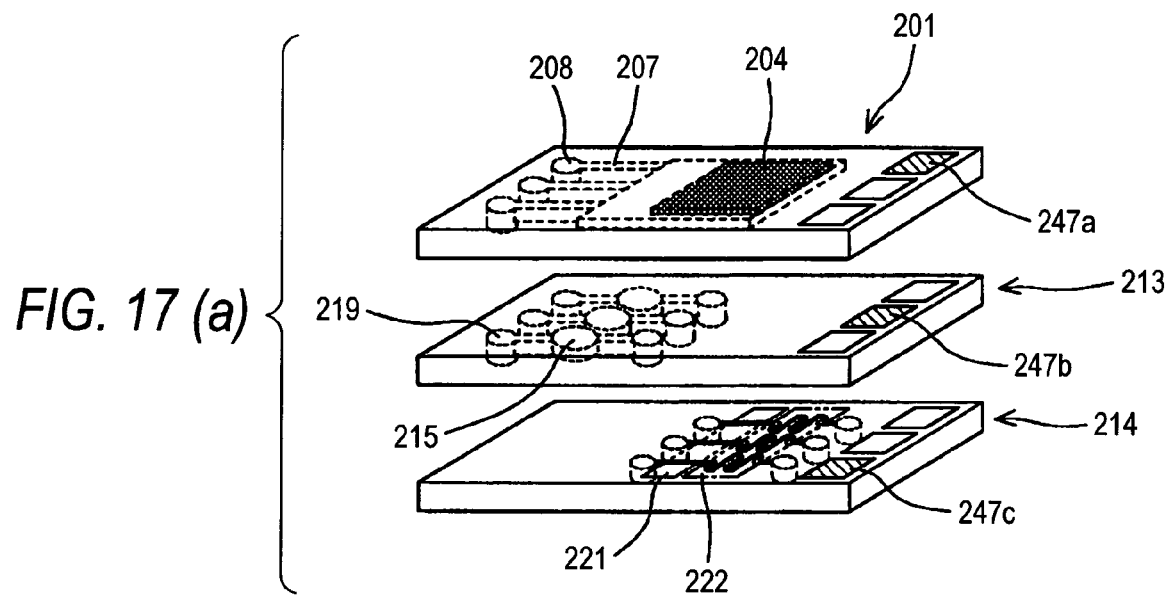
FIG. 17A is a descriptive view of a micropump according to a tenth embodiment of the invention and optical recognition of the order in which the micropumps are stacked on a sample processing chip.
FIG. 17B is a descriptive view of a micropump according to a tenth embodiment of the invention and physical recognition of the order in which the micropumps are stacked on a sample processing chip.
Figure 17:
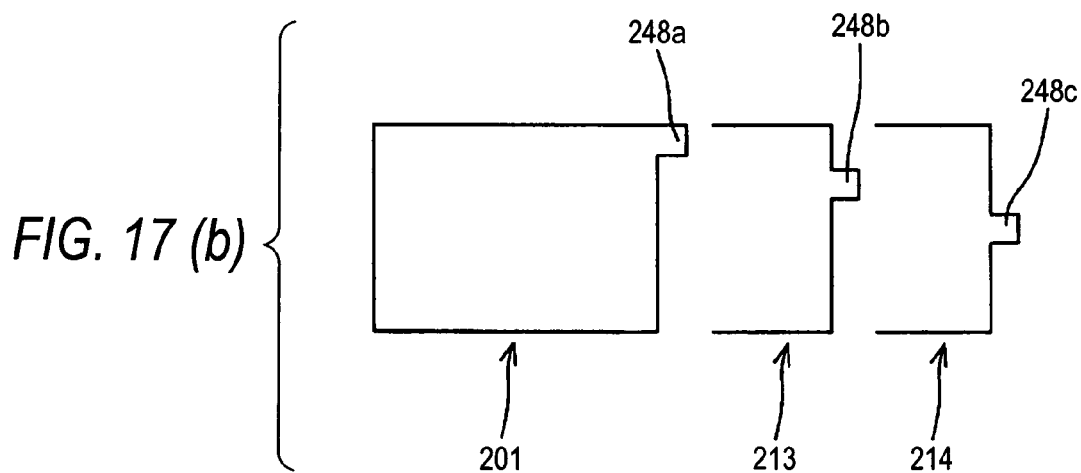

As can be seen from the external view shown in FIG. 16, the reaction agent 204 is divided into small reaction agents, and reaction is induced on a per-small-reaction-agent basis, thereby facilitating control of a reactant gas. In addition, the reaction initiation section 205 is also divided, to thereby provide a plurality of small reaction initiation sections. The small reaction initiation sections and the small reaction agents are caused to correspond to each other, thereby enabling pursuit of reaction on a per-small-reaction-agent basis. A plurality of only small reaction initiation sections are provided, and only predetermined small reaction initiation sections are caused to operate for one reaction agent 204, thereby yielding a similar working-effect.

The first structural material 202 is a sheet-like upper casing for housing the reaction agent 204 within the reaction chamber 206. Similarly, the second structural material 203 is a sheet-like lower casing for housing the reaction agent 203 within the reaction chamber 206. The first and second structural materials 202, 203 are formed from metal, ceramics, glass, resin, or the like and have a thickness ranging from tens of micrometers to millimeters. Etching, machining, laser beam machining, plasma processing, printing, optical forming, or a like technique is appropriate as a method for processing details of the indentations 202a, 203a constituting the reaction chamber 206, the channel 207, and the communication hole 208.

Although various materials are available for the reaction agent 204 which produces a gas by means of chemical reaction, sodium azide, tetrazoles, sodium bicarbonates, or a like material is desirable. Sodium azide and tetrazoles cause reaction when heated to 150° C. or higher, thereby producing an $N_2$ gas. When heated up to 100° C. or higher, sodium bicarbonate causes reaction, thereby producing $N_2$ and $CO_2$ gases. As mentioned above, an inactive gas such as an $N_2$ gas, a $CO_2$ gas, or the like is produced. Hence, the reaction agent does not affect the human body, the environment, or the sample M. Thus, the safety of the micropump 201 is enhanced. Use of a noncontaminating chemical, such as tetrazoles and sodium bicarbonates, as the reaction agent 204 enables realization of the micropump 201 which is highly safe even when discarded.

As mentioned above, the micropump 201 of the ninth embodiment enables realization of accurate correspondence between the position of the reaction agent 204 and that of the reaction initiation section 205 by means of stacking a structural material, the reaction agent 204, and the reaction initiation section 205. As a result, direct control of the micropump in a minute area becomes possible, thereby enabling realization of the micropump 201 whose reaction speed has been increased and which has superior responsiveness. Moreover, a structure embodied by stacking sheet-like structural materials is employed, and hence the micropump 201 is eventually imparted with a chip structure and can constitute a sample processing chip for any of a variety of applications when used in combination with another chip.

There will now be described a sample processing chip embodied by combination of another chip module, such as a flow passage control chip or a reaction detection chip, and the micropump 201. In FIGS. 14A and 14B, reference numeral 201a designates a pump chip (i.e., a pump structural material of the invention) constituting a micropump main body exclusive of the reaction initiation section 205; 212 designates a sealing material interposed between pump chips 201a when the pump chips 201a are stacked; 212a designates an opening connected to the communication hole 208; 213 designates a flow passage control chip for controlling a flow when a sample M is ejected by means of a reactant gas delivered from the micropump 201; and 214 designates a reaction detection chip (i.e., a processing chip of the invention) on which the flow passage control chips 213 are stacked. The flow passage control chip 213 and the reaction detection chip 214 can also be assembled into a single chip.

In addition, the pump chip 201a and the flow passage control chip 213 constitute a single chip which is to serve as a flow passage control unit. The chip is stacked under the reaction detection chip 214, to thereby realize as a whole a sample processing chip in which two chips are stacked. Moreover, the pump chip 201a, and the flow passage control chip 213 can be assembled into one chip. Further, the pump chip 201a, the flow passage control chip 213, and the reaction detection chip 214 can also be assembled into one sample processing chip. Here, the reaction initiation section 205 is preferably formed as a member separate from the chip. The reaction initiation section 205 can be recycled so long as it is rendered removably attached to the chip and disposed beside an analyzer (not shown) on which, e.g., the sample processing chip is mounted.

The flow passage control chip 213 assembled in the form of a module for controlling a flow passage will now be described. Reference numeral 215 designates a microvalve which is provided in the flow passage control chip 213 and is opened and closed by means of the inertia of a valve element derived from application of vibration, the reaction force originating from a V-shaped interior wall surface, and the pressure of supplied fluid. Reference numeral 216 designates a valve element of the microvalve 215; 217 designates a valve chamber; 217a designates a V-shaped valve seat which engages with the valve element 216, to thereby allow interruption and passage of a flow; and 218 designates a channel connected to the microvalve 215. Reference numeral 219 designates a reservoir whose upper opening is connected to the opening 212a of the sealing material 212 and the communication hole 208 and is to be filled with the sample M; and 220 designates a piezoelectric element for applying vibration to the valve element 216 of the microvalve 215 in a direction orthogonal to the flow. Although the embodiments have described the microvalve 215, the embodiments are mere illustrations of some preferred embodiments of the invention. Naturally, the invention is not limited to these embodiments; a diaphragm valve or another flow passage control method which enables realization of a microstructure can be employed.

Next, there will be described the reaction detection chip 214 assembled in the form of a module for subjecting the sample M to chemical reaction. Reference numeral 221 designates a detection section provided with various types of sensors 239c (which will be described later) for measurement purposes; and 222 designates a reaction section formed in a predetermined fluid circuit.

In this chip, the width of the channel 218 and that of the detection section 221 are on the order of micrometers to hundreds of micrometers. The width of the valve chamber 217 is greater than that of the channel 218 and that of the detection section 221 but is substantially of the same order. The length of a valve element is about two to ten times the width of the channel. When pressure (back pressure) originates from the reservoir 219, the valve element 216 can fit into the valve seat 217a without involvement of rattling, by means of a wedge effect. Namely, as a result of application of force to a tapered surface from the direction of back pressure, the force is amplified by means of leverage.

Subsequently, the above-described micropump 201 and a controller of a sample processing chip on which the micropump 201 is stacked will now be described. In FIG. 15, reference numeral 220a designates a piezoelectric layer of PZT (lead zirconate titanate) or the like constituting the piezoelectric element 220; and 220b designates a pair of opposing electrode sheets which oppose each other with the piezoelectric layer 220a sandwiched therebetween and apply a voltage to the piezoelectric layer 220a. One of the opposing electrode sheets 220b is connected to the earth, and a voltage of predetermined drive frequency for control purpose is applied to the other electrode sheet 220b.

Reference numeral 229 designates a controller for controlling the micropump 201 of the ninth embodiment and the entirety of the sample processing chip. Reference numeral 230 designates a reaction drive section for activating the reaction initiation section 205 of the micropump 201; 231 designates a central control section (a control section of the embodiment) for controlling the entire system of the controller; and 232 designates a power source section. Reference numeral 233 designates a waveform control section which changes the frequency and amplitude of a current and those of a voltage, both being supplied from the power source section 232, and shapes a waveform of the current and that of the voltage; 234 designates an input section capable of specifying and controlling shaping of a waveform to be performed by the waveform control section 233 on a per-control-operation basis from the outside; and 235 designates an amplifier for controlling the amplitude of an analog control signal shaped by the waveform control section 233. As a result of a drive current output from the amplifier 235 having changed positively or negatively, repeated expansion or contraction of the piezoelectric element 220 becomes possible.

Reference numeral 236 designates a display section for providing an indication on a display (not shown); 237 designates a digital-to-analog converter; 238 designates a storage section for storing a control program and data for use with the central control section 231; and 238a designates a control table in which are stored control data specifying timings at which power is fed to the reaction drive section 230 and for effecting control operations of the microvalve 215.

Reference numeral 239a designates a pressure sensor provided in the channel 207; 239b designates a vibration detection sensor provided in the channel 218 at a location in the vicinity of the valve seat 217a of the microvalve 215; and 239c designates various sensors provided in the detection section 221. The central control section 231 is constituted as function implementation means which loads a control program to a central processing unit (CPU) from the storage section 238, there by activating the CPU. Therefore, the central control section 231, the input section 234, the display section 236, the storage section 238, and the control table 238a can also be constituted of a personal computer or the like so as to be separated from the reaction drive section 230 and the valve controller. In this case, the reaction drive section 230 and the valve controller become removable. In contrast with an analog signal which is a drive output from the valve controller, a control signal output from the central control section 231 is a mere digital signal, and hence the signal must be subjected to digital-to-analog conversion. Preferably, the central control section 231 subjects as much of the signal as possible to digital processing, thereby simplifying analog processing. Further, when the pump chip 201*a*, the flow passage control chip 213, and the reaction detection chip 214 are replaced, the controller 229 is obviously recycled.

A configuration for recognizing stacked states of respective chips will now be described by reference to FIGS. 15 and 16. In FIGS. 15 and 16, reference numerals 240, 240*a* designate electrodes connected to a power source section 232*a* formed in an upper surface of the pump chip 201*a*; 241, 241*a* designate electrodes formed in a lower surface of the pump chip 201*a*; and 242, 242*a* designate electrodes which are connected together on the flow passage control chip 213 and come into contact and electrical connection with the electrodes 241, 241*a* when the pump chip 201*a* is stacked on the flow passage control chip 213. The electrode 240 and the electrode 241 connect upper and lower surfaces of the pump chip 201*a*, and the electrodes 240*a*, 241*a* connect upper and lower surfaces of the pump chip 201*a*. Similarly, reference numerals 243, 243*a* designate electrodes connected to the power source section 232*a* formed in the upper surface of the flow passage control chip 213; 244, 244*a* designate electrodes formed on the lower surface of the flow passage control chip 213; and 245, 245*a* designate electrodes which are connected together on the reaction detection chip 214 and come into contact and electrical connection with the electrodes 244, 244*a* when the flow passage control chip 213 and the reaction detection chip 214 are stacked one on top of the other. The electrodes 243, 244 are connected together between the upper and lower surfaces of the flow passage control chip 213, and the electrodes 243*a*, 244*a* are connected together between the upper and lower surfaces of the flow passage control chip 213. Reference numeral 246 designate a mount detection section for detecting occurrence of contact between the electrodes 241, 241*a* and the electrodes 242, 242*a*, as well as occurrence of contact between the electrodes 244, 244*a* and the electrodes 245, 245*a*, by means of detecting electrical conduction (i.e., a voltage change). The mount detection section 246, including the electrodes 240, 240*a*, 241, and 241*a*, corresponds to the recognition means of the present embodiment.

When the pump chip 201*a* and the flow passage control chip 213 are mounted properly, the electrodes 241, 241*a* come into contact with the electrodes 242, 242*a*. Since the electrodes 242, 242*a* are connected together, proper mounting of the chips is detected by means of the mount detection section 246. Similarly, when the flow passage control chip 213 and the reaction detection chip 214 are stacked, the electrodes 244, 244*a* come into contact with the electrodes 245, 245*a*, to thereby establish electrical conduction, and, as a result, proper mounting of the chips is detected. These conduction signals indicate occurrence of a match between the stacked position of the pump chip 201*a* and that of the flow passage control chip 213. The conduction signals are input to the central control section 231 as a position match signal. A reaction stop flag to be used for stopping power supply to the reaction initiation section 205 remains set in the central control section 231 until the position match signal is input to the central control section 231. Upon receipt of the position match signal, the central control section 231 sets the reaction stop flag to an OFF position.

By reference to FIG. 15, there will now be described a control method for controlling the micropump 201, the flow passage control chip 213, and the reaction detection chip 214 by means of a controller 229 of the ninth embodiment. First, an explanation is given of a case where the micropump 201 is controlled. These chips are mounted, and mounting of the chips is detected by the mount detection section 246. In accordance with a detection signal, the central control section 231 displays on a display (not shown) a message indicating completion of mounting of the chips. Further, unless the detection signal is input, the central control section 231 is prohibited from applying a voltage to the reaction initiation section 205 and feeding power to the piezoelectric element 220 for activating the microvalve 215.

Next, an input/operation screen is displayed on a display, and required setting is performed by way of the input section 234. If the sample processing chip becomes different, the sample M also becomes different. Therefore, reaction and processing change according to the nature of the loaded reaction detection chip 214. Operation of the micropump 201, the aperture or opening/closing of the microvalve 215, and operations of the sensors 239*c* of the detection section 221 are set for each reaction of the sample M (for each sample processing chip).

When initiation of operation of the micropump 201 is instructed on the display, the central control section 231 loads control data, which are to serve as a target control value, from the control table 238*a* along with the input setting value and commences control operation. The target value is not limited to a constant value and may include a value which varies with time. The reaction drive section 230 operates to convert a source voltage of the power supply section 232*a* to a predetermined voltage and applies the thus-converted voltage to the reaction initiation section 205. The reaction initiation section 205 of the ninth embodiment is heating means such as a heater and starts heating operation. The reaction agent 204 starts reaction with a predetermined time lag, thereby rapidly increasing pressure, whereupon a predetermined reactant gas is discharged to the channel 207. The pressure sensor 239*a* is provided in the channel 207, thereby detecting the pressure and feeding back the thus-detected pressure to the central control section 231. When the detected pressure is lower than a predetermined pressure or flow rate, which are to serve as target values, the central control section 231 further heats the reaction initiation section 205 for promoting reaction. When the detected pressure has exceeded the target pressure or flow rate, the central control section 231 instructs the reaction drive section 230 to suppress heating operation. When the pressure has further exceeded a predetermined threshold value, the heating operation is stopped, thereby stopping heating action of the reaction agent 204.

Incidentally, the central control section 231 subjects the reaction drive section 230 to the above-described control operation and instructs the waveform control section 233 to actuate the piezoelectric element 220. As a result, the piezoelectric element 220 causes vibrations, thereby opening and closing or changing the aperture of the microvalve 215. Since the back pressure of the reactant gas is applied to the sample M, the back pressure is discharged at a stroke when the microvalve 215 is opened, whereupon the sample M flows into the channel 218 located in the vicinity of the seat valve 217*a*. Vibrational changes are detected by the vibration detection sensor 239*b* at two locations, thereby detecting a flow rate. The signal detected by the vibration detection sensor 239*b* is delivered to the central control section 231, where the flow rate of fluid can be computed if the ambient temperature is ascertained.

The sample M that has flowed from the microvalve 215 flows into the detection section 221 of the reaction detection chip 214. The sensors 239*a* of various types are provided in the detection section 221, and predetermined detection operations are performed. The sample M is subjected to predetermined reaction (i.e., the processing of the present invention) performed by the reaction section 222. Although not shown in FIGS. 14 and 15, the detection section 221 may be provided subsequent to the reaction section 222. In this case, residues representing the processing states of the respective sensors 239c are detected. In this case, the sensors 239c maybe sensors which detect the quantity of residue as a change in optical intensity by utilization of fluorescent reaction or the like or sensors which detect the quantity of residue as a change in impedance.

As mentioned above, the micropump and the sample processing chip, both pertaining to the ninth embodiment, detect stacking of the chips by means of the mount detection section 246. Neither report about completion of mounting of the chips nor power supply to the reaction initiation section 205 and the piezoelectric element 220 is performed unless the detection signal is input to the central control section 231. Accordingly, occurrence of reaction of the reaction agent 204 and occurrence of reaction of the sample M, which would otherwise be caused by erroneous activation of the reaction initiation section 205 before assembly of the respective chips, can be prevented. Further, when a plurality of chips are stacked, the electrodes provided on the upper surface and the electrodes provided on the lower surface are arranged so as to be associated with each other between the chips, and hence occurrence of an error in a stacking sequence or stacking direction is prevented. Even if the chips have been mounted erroneously, the failure can be detected by the mount detection section 246. Further, in the case of sample processing chips of different combinations, electrodes are previously provided at positions which would change according to a combination. Even if chips are mounted in an erroneous combination, the mount detection section 246 can detect such a combination.

If predetermined control is specified while target control values are stored in the control table, an expected predetermined characteristic can be realized stably by performing control operation in accordance with the control data of the control table. Further, controllability can be improved by feeding back a delivery pressure and a flow rate. The flow passage control chip 213 can be stacked on the reaction detection chip 214 that detects the sample M and effects reaction of the sample M and used in combination with various reaction detection chips 214, thereby enabling configuration of the sample processing chip having a variety of applications. Optimum control can be performed for any of a variety of applications.

The sample processing chip of the ninth embodiment that has been described above is embodied by forming, in one sample processing chip, one micropump 201 and one reaction detection flow passage (i.e., the flow passage control chip 213 and the reaction detection chip 214). In contrast, a plurality of independent micropumps 201 and a plurality of independent reaction detection flow passages can be provided on one sample processing chip.

Tenth Embodiment

The sample processing chip of the ninth embodiment is for detecting presence/absence of erroneous mounting of the chips by reporting completion of mounting of the chips by utilization of occurrence of contact between electrodes of the respective chips. In contrast, the micropump and the sample processing chip having the micropumps stacked therein, both pertaining to the second embodiment, are for properly recognizing the stacking sequence of the chips rather than detecting occurrence of mounting failures. FIG. 17A is a descriptive view of optical recognition of a micropump according to a tenth embodiment and optical recognition of the sequence in which the micropumps are stacked to constitute a sample processing chip; and FIG. 17B is a descriptive view of physical recognition of a micropump according to a tenth embodiment and physical recognition of the sequence in which the micropumps are stacked to constitute a sample processing chip.

In FIG. 17A, reference numeral 247a designates an optical recognition mark formed on the surface of the pump chip 201a; 247b designates an optical recognition mark formed on the surface of the flow passage control chip 213; and 247c designates an optical recognition mark formed on the surface of the reaction detection chip 214. Color marks representing the respective chips, numerical and character marks, reflection marks to be determined on the basis of light transmittance and reflectivity, a bar code mark, etc., are provided on the optical recognition marks 247a, 247b, and 247c.

If the sequence in which the chips are to be stacked is previously determined as the sequence of the optical recognition marks 247a, 247b, and 247c, occurrence of a failure in stacking sequence can be immediately determined on the basis of sequence of the optical recognition marks 247a, 247b, and 247c. As shown in FIG. 17A, positions at which the optical recognition marks 247a, 247b, and 247c are to be provided may be displaced from each other and arranged in a stacking sequence. In this case, when the stacked chips are viewed in one direction, one can determine at a glance that the optical recognition marks 247a, 247b, and 247c are arranged in a proper sequence and that no failure has arisen in the mounting sequence.

Recognition of the optical recognition marks 247a, 247b, and 247c may be performed manually. However, if these marks are detected by determination means (not shown), such as an image pickup element or a light-receiving element, and a detection signal is input to the central control section 231, automatic recognition will become feasible. Here, the determination means is preferably constituted as being removably detachable. Even at the time of replacement of the pump chip 201a, the flow passage control chip 213, and the reaction detection chip 214, the determination means can be recycled. At this time, as in the case of the electrode of the first embodiment, a detection signal output from, for example, an image pickup element or a light-receiving element, is input to the central control section 231, whereby the respective chips are perceived. Concurrently, placement of the chips at predetermined positions and existence of a match between the positions of the chips are detected, thereby bringing the reaction stop flag into an OFF position. As in the case of the ninth embodiment, when no match exists between the positions of the chips, there can be issued a warning message stating, for example, "There is a problem in the mounting sequence. Change the mounting sequence in predetermined sequence of the optical recognition marks 247a, 247b, and 247c," before issuance of a chip mount completion message. The present embodiment has described a case where the determination means recognizes the sequence of chips in a direction perpendicular to the surfaces of the chips. However, as is obvious, the same effect can be yielded even when end sections of the chips are recognized in the direction parallel to the surfaces of the chips.

By reference to FIG. 17B, there will now be described a case where the determination means physically recognizes the mounting sequence. In FIG. 17B, reference numeral 248a designates a physical recognition mark formed on the pump chip 201a; 248b designates a physical recognition mark formed on the flow passage control chip 213, and 248c designates a physical recognition mark formed on the reaction detection chip 214. Projections, cutouts, and openings formed in respective chips are available as the physical recognition marks 248a, 248b, and 248c.

If the sequence in which the chips are to be stacked is previously determined as the sequence of the physical recognition marks 248a, 248b, and 248c, occurrence of a failure in stacking sequence can be recognized immediately as in the case of the optical recognition marks 247a, 247b, and 247c. As shown in FIG. 17A, shifting positions where the physical recognition marks 248a, 248b, and 248c are to be provided so as to be arranged in the stacking sequence is preferable.

As in the case of the optical recognition marks 247a, 247b, and 247c, the physical recognition marks 248a, 248b, and 248c are detected by means of an image pickup element or electrodes (not shown), and a detection signal is input to the central control section 231, thereby enabling automatic recognition. As shown in FIG. 17B, projections may be offset one by one, and the thus-offset projections may be detected by physical detection means such as a limit switch or the like (not shown). When the chips are stacked in the correct sequence, the stacking sequence may be detected by applying an electric current to the physical detection means. As a result, when the chips are stacked in a correct sequence, a determination can be readily made as to whether or not a mounting failure has arisen, without provision of wires such as those described in connection with the ninth embodiment. As in the case of the optical recognition marks, the physical detection means is preferably provided so as to be removably attachable.

Eleventh Embodiment

Since the pump chip 201a, the flow passage control chip 213, and the reaction detection chip 214, all pertaining to the embodiments are used in a stacked manner, thorough sealing must be effected so as to prevent leakage of a gas or liquid from positions between chips in a state in which gas or liquid can migrate from one chip to another chip. The pump chip 201a and the sample processing chip having the pump chips stacked therein, both pertaining to the eleventh embodiment, can effect thorough sealing so as to prevent leakage of a gas or liquid from positions between the chips in a state in which a gas or liquid can migrate from one chip to another chip. The pump chip 201 and the sample processing chip are easy to manufacture and mount. FIG. 18A is a descriptive view of the micropump according to an eleventh embodiment of the invention and a sheet connector of a sample processing chip on which the micropumps are stacked; FIG. 18B is an enlarged view of a section A which can prevent back flow in one direction through use of the sheet connector shown in FIG. 18A; and FIG. 18C is an enlarged view of the section A which enables easy passage of a gas when bi-directional gas pressure acts on the sheet connector shown in FIG. 18A.

In FIGS. 18A, 18B, and 18C, reference numeral 249 designates a sheet connector which establishes mutual communication between the flow passage of the respective chips, thoroughly seals a reactant gas produced from the reaction agent 204 and fluid migrated among the chips so as to prevent leaking of the gas or liquid to the outside, and permits passage of the reactant gas or liquid in the migrating direction. Resin such as polypropylene or Teflon (registered trademark), rubber/elastomer, or the like is preferable as the sheet connector 249. A material which has elasticity and acts as a member for sealing the pump chip 201a and the flow passage control chip 213 is preferable. Boring of predetermined positions of the sheet connector 249, by way of which the reactant gas or fluid migrates, does not need to be performed, thereby effecting easy sealing.

Reference numeral 249a designates straight micropores, in which no change arises in the cross section of a flow passage and the flow passage penetrates through the micropores (a group of micropores according to the present embodiment); 249b designates conical micropores, in which a portion of the flow passage opposing the flow passage control chip 213 has a smaller cross-sectional area; and 249c shown in FIG. 18D designates barrel-shaped micropores in which the cross-sectional area of the flow passage becomes reduced and again becomes larger toward the flow passage control chip 213. Polypropylene, Teflon (registered trademark), or the like is often utilized as a gas permeable film. The minimum function as the sheet connector 249 is performed unless the micropores 249a, 249b, and 249c are formed in the sheet connector 249. However, forming the micropores 249a, 249b, and 249c for facilitating flow of the reactant gas is much better.

When the sheet connector 249 having the micropores 249a formed therein is attached to the pump chip 201a, a pressure loss of the reactant gas is comparatively smaller as compared with a case where the micropores 249a are not formed. Hence, effective application of pressure to the sample M becomes feasible. In a case where the micropores 249b shown in FIG. 18B are formed, directionality can be imparted to the flow. Specifically, flow of the reactant gas to the flow passage control chip 213 is easy, whereas flow of the sample M filled in the reservoir 219 provided in the flow passage control chip 213 is considerably difficult, thereby preventing occurrence of a reverse flow. In addition, leakage of the sample M; that is, so-called mixed contamination, can be prevented. Further, in a case where the micropores 249c shown in FIG. 18C are formed, a high sealing characteristic is achieved when no pressure is applied to the sheet connector 249. If pressure is applied to the sheet connector, the micropores enable smooth flow of the fluid in any direction.

The micropores 249a, 249b, and 249c provided in the sheet connector 249 may be embodied by providing a plurality of different pores in one sheet connector 249 in accordance with the characteristic/flow rate/pressure of fluid to flow, or the pitch between the pores may be provided at uniform intervals/uneven intervals. Moreover, if the micropores 249a, 249b, and 249c are formed in the entire surface of the sheet connector 249, the single sheet connector 249 can be used regardless of the positions of the communication holes 208, and hence the sheet connector is easy to manufacture and economical. If micropores are formed in a portion of the sheet connector, migration of fluid can be blocked at a specific position, thereby enabling provision of the sheet connector 249 having a higher function.

Twelfth Embodiment

The pump chip 201a and the sample processing chip in which the pump chips are stacked, both pertaining to the eleventh embodiment, prevent outflow of the unused reaction agent 204 to the outside when the sample processing chip is not used while permitting passage of the reactant gas when is use. A sample processing chip of a twelfth embodiment is configured to prevent contamination, such that the sample M does not leak outside after the flow passage control chip 213 has been filled with the sample M. FIG. 19A is a descriptive view of a first contamination prevention configuration of a sample processing chip according to the twelfth embodiment of the invention; FIG. 19B is a descriptive view of a second contamination prevention configuration of a sample processing chip according to the twelfth embodiment of the invention; FIG. 19C is a descriptive view of a third contamination prevention configuration of a sample processing chip according to the twelfth embodiment of the invention; FIG. 20A is a descriptive view of a fourth contamination prevention configuration of a sample processing chip according to the twelfth embodiment of the invention; FIG. 20B is a descriptive view of a fifth contamination prevention configuration of a sample processing chip according to the twelfth embodiment of the invention; and FIG. 20C is a descriptive view of a sixth contamination prevention configuration of a sample processing chip according to the twelfth embodiment of the invention.

In FIGS. 19A, 19B, reference numeral 250 designates a contamination prevention seal material formed from elastic porous material; 251 designates an elastic member, such as a rubber body, adhering to an upper surface of the sealing member 250; and 252 designates a seal material receiver (i.e., a seal material receiving section of the present embodiment) for receiving the force exerted on the elastic member 251 and the seal material 250 at the time of injection of the sample M. The seal material receiver 252 can also retain the sample M within the reservoir 219 by means of surface tension. Reference numeral 260 designates a sample injection member having a geometry analogous to the injection needle. The seal material 250 is intended not only for providing ordinary sealing, but also for preventing contamination of the sample to prevent pollution of the environment.

In FIG. 19C, reference numeral 219a designates a reservoir remaining in mutual communication with an opening for sample injection purpose; and 219b designates a gas inlet port provided apart from the opening of the reservoir 219a.

In the sample processing chip of the twelfth embodiment, the sample injection member 260 is inserted into the contamination prevention seal material 250 in the manner shown in FIG. 19A, thereby filling the reservoir 219 with the sample M. Since the seal material 250 is formed from an elastic porous material, a pore is closed immediately after removal of the sample injection member 260, by means of elastic force. As a result, contamination of the sample M can be prevented, thereby enabling penetration of a high-pressure gas for transport purpose through the porous seal material 250. The above description has mentioned the seal material 250 formed from an elastic porous material. However, the seal material may be formed from any elastic material, whereby the pore that has been formed by insertion of the sample injection member 260 and closed by elastic force is again opened by the pressure of the high-pressure transport gas, thereby permitting penetration of the gas.

The contamination prevention configuration shown in FIG. 19B is embodied by affixing the elastic member 251 on the seal material 250. Presence of the elastic member 251 enables reliable closing of the pore after injection, and the force exerted at the time of insertion of the seal material receiver 252 is received by the elastic member 251. Hence, insertion of the sample injection member 260 is easy, thereby allowing immediate filling of the sample M. Moreover, the surface area of the reservoir 219 is increased as a result of presence of the seal material receiver 252, thereby yielding an effect for retaining the injected sample M by means of surface tension.

In FIG. 19C, the reservoir 219a and the gas inlet port 219b are provided separately from each other. Since the reservoir 219a and the gas inlet port 219b are separated from each other, contamination of the communication hole 208 of the micropump 201 does not arise even when the micropump 201 is used repeatedly.

Although not illustrated, the neighborhood of the reservoirs 219, 219a (exclusive of the reservoirs 219, 219a), an outer surface of the pump chip 201a, the surface of the communication hole 208, and the surface of the channel 208 are subjected to water repellent finishing. Here, prevention of contamination can be readily performed through only surface treatment. Thus, water repellent finishing is very effective for preventing contamination. Provision of water repellent finishing in combination with the contamination prevention configuration is effective.

In FIGS. 20A, 20B, and 20C, reference numeral 253 designates a flexible member (i.e., a cover member of the present embodiment) which is formed from fluid, foam, or a gelling agent, all being inert toward the sample M, and covers the reservoir 219; 254 designates an absorbent such as cotton or nonwoven fabric cloth; and 255 designates a plurality of pins provided in upright positions.

As shown in FIG. 20A, a location above the sample M is covered and blocked by the soft member 253. Hence, there can be prevented contamination of the sample material M and leakage of the sample material M toward the communication hole 208, thereby preventing the leaked sample M from staining surroundings and enabling movement of the sample M in conjunction with the soft member. Even when a gas permeable material formed from foaming material or the like can be used in place of the soft member 253, a similar working effect can be expected. The contamination prevention configuration shown in FIG. 20B is intended for storing the absorbent 254 in the reservoir 219. The absorbent 254 is cotton, nonwoven fabric cloth, or the like, thereby retaining the sample M by means of capillary. However, when pressure of the high-pressure gas is applied to the absorbent, the sample M flows to and is transferred by the channel 218. Similarly, the configuration shown in FIG. 20C also retains the sample M by means of capillarity. However, the configuration differs from that shown in FIG. 20B in that pins 255 retain the sample M by means of surface tension. If the number of seal material receivers 252 is increased, the pins 255 can more effectively retain the sample M.

As mentioned above the pump chip 201a and the sample processing chip, both pertaining to the twelfth embodiment, in which the pump chips 201a are stacked prevent contamination, enable reliable retention of the sample in the reservoir, and enable free transport of the sample processing chip.

Configuration and working-effects of the second embodiment group will now be described.

According to the micropump of the embodiment, the micropump can be assembled into a minute chip module, and the reaction agent is controlled by the reaction initiation section. Hence, easy control and a predetermined characteristic can be stably achieved. A match between the position of a chip of interest and positions of other chips or coincidence of a combination is determined by recognition means, and hence occurrence of an erroneous mounting of other chips or a faulty operation is prevented, the micropump is safe and economical.

Since the recognition means detects a match between the position of a chip of interest and positions of other chips and coincidence of a combination and outputs a match signal, positions and coincidence of a combination can be detected automatically, thereby preventing occurrence of an erroneous mounting of other chips or a faulty operation, and hence the micropump is safe and economical.

Provision of only electrodes enables detection of a match between the position of a chip of interest and positions of other chips and coincidence of a combination and an output of a match signal. Hence, the micropump can be configured inexpensively and becomes more economical. The micropump is equipped with determination means for perceiving chips and/or combination of chips by means of optical recognition marks. Hence, there can be provided a safe, economical micropump which can be assembled into a chip module of microstructure; which can realize easy control and stable predetermined characteristics; which enables easy recognition of a chip; and which prevents occurrence of faulty mounting of another chip or faulty operations. When the determination means is embodied as a physical recognition mark or an electrical recognition mark, there can be provided a safe, economical micropump which enables easy recognition of a chip; and which prevents occurrence of faulty mounting of another chip or faulty operations. Since at least either the determination means or the control section is removably attachable, the determination means or the control section can be recycled and is economical.

According to the sample processing chip of the embodiment, the micropump, the flow passage control chip, and the processing chip can be assembled into a minute chip module, and the reaction agent is controlled by the reaction initiation section. Hence, easy control and a predetermined characteristic can be stably achieved. The control section can easily perform flow passage control and sample processing control operations.

The flow passage control chip and the processing chip can be assembled in to one chip which is easy to handle. Similarly, the micropump and the flow passage control chip are assembled into one chip which is easy to handle. Moreover, the micropump, the flow passage control chip, and the processing chip are assembled into one chip which is easy to handle.

Since the sheet connector is provided and formed from a gas permeable film, only the gas is moved toward the flow passage control chip from the outlet port. The sample does not reversely flow toward the micropump. The portion of the sheet connector other than the location of the outlet port acts as a seal.

Since the sheet connector has a group of micropores, migration of fluid such as a gas or liquid is allowed in only the outlet hole section, and the other area of the sheet connector can act as a seal. Hence, the sheet connector is easy to manufacture. Since the group of micropores are formed from conical micropores, in which the cross-sectional area of the flow passage is reduced in the flowing direction, reverse flow can be prevented, and mixing contamination, which would otherwise stain surroundings as a result of leakage of a sample, can also be prevented. The group of micropores are constituted of barrel shaped micropores, in which the cross-sectional areas of the flow passages are once reduced and again expanded in the flowing direction. When no pressure is applied to the sheet connector, a high sealing characteristic is achieved. When pressure is applied to the sheet connector, the sheet connector permits smooth flow of fluid in both directions. The sheet connector is formed from an elastic sheet, and hence the sheet connector enables more effective passage of fluid and prevention of a reverse flow and sealing.

At least an opening section of the reservoir of the flow passage control chip is provided with a mixing contamination prevention seal material having an elastic sheet. Hence, after injection of a sample, the hole from which the sample injection member has been removed is closed by means of elastic force, thereby preventing contamination. The seal material is formed from an elastic porous material, and hence the hole from which the sample injection member has been removed is closed by elastic force after injection of a sample. As a result, a high-pressure transfer gas can permeate through the seal material, but occurrence of contamination can be prevented.

Since the elastic member is caused to adhere to the seal material, the hole from which the sample injection member is removed can be closed without fail. The seal material receiving section is provided in the reservoir, and hence force exerted at the time of insertion of the sample injection member is received by the seal material receiving section. Hence, insertion of the sample injection member is facilitated, and quick charge of the sample can be performed. Further, the sample injected as a result of presence of the seal material receiving section is retained by surface tension.

Since the sample injection opening differing from the gas inlet port is brought in mutual communication with the reservoir, the sample injection opening is separated from the gas inlet port. Even when the micropump is recycled, contamination of the communication hole of the micropump can is prevented. Since surroundings of the reservoir are subjected to water repellent finishing, contamination can be easily prevented through only surface treatment. Since the reservoir is provided with a cover material for covering a position above the location filled with the sample, the cover material covers and blocks the position above the sample. Hence, there can be prevented contamination of the sample by way of the communication hole or staining of surroundings, which would otherwise be caused by a leaked sample.

The soft member—which serves as a cover material and is formed from inactive fluid, foam, or a gelling agent—permits passage of a gas through the flexible member while flexibly changing its shape. Hence, contamination can be prevented with considerable effectiveness, and a sample can also be retained. A gas permeation material formed from foam or the like enables prevention of contamination, permeation of a gas, and retention of a sample.

Since there is provided an absorbent for absorbing a sample filled in the reservoir, the absorbent can retain a sample by means of capillarity. Similarly, a sample can be retained by means of surface tension through use of a plurality of pins.

According to the sheet connector of the embodiment, a group of micropores are formed in the sheet so as to penetrate there through in a direction in which fluid flows. As a result, fluid can move through only the area of the sheet through which fluid flows. Areas of the sheet connector other than those through which fluid flows act as seals.

Since the group of micropores are constituted of conical micropores, in which the cross-sectional areas of the flow passages are reduced in the direction of flow, occurrence of a reverse flow can be prevented. Similarly, the micropores are formed from barrel-shaped micropores, in which the cross-sectional areas of the flow passages are once reduced and again expanded. Hence, when no pressure is applied to the micropores, a high sealing characteristic is achieved. When pressure is applied to the micropores, the micropores enables smooth, bi-directional flow of fluid. Further, the micropores are formed from elastic material, whereby passage of fluid, prevention of a reverse flow, and sealing can be performed more effectively.

A fifty-third invention is directed toward a micropump comprising: a pump structural material having a reaction chamber formed therein; a reaction agent which is housed in the reaction chamber and produces a gas of predetermined pressure; a reaction initiation section for causing the reaction agent to produce a gas; a channel which is provided in the pump structural material and guides the gas of predetermined pressure produced by the reaction agent to an outlet from the reaction chamber; and a control section for controlling operation of the reaction initiation section, reacted gas being supplied to another chip when the pump structural material is combined with the other chip, the micropump comprising: recognition means for outputting a match signal only when a match exists between the pump structural material and the other chip in terms of position and/or combination. The micropump can be assembled into a minute chip module, and the reaction agent is controlled by the reaction initiation section. Hence, easy control and a predetermined characteristic can be stably achieved. A match between the position of a chip of interest and positions of other chips or coincidence of a combination is determined by recognition means, and therefore there is prevented occurrence of an erroneous mounting of other chips or a faulty operation, and the micropump is safe and economical.

A fifty-fourth second invention is directed toward the micropump of the invention, characterized in that the control section cancels stoppage of operation of the reaction initiation section when the match signal detected by the recognition means is delivered to the control section.

Since the recognition means detects a match between the position of a chip of interest and positions of other chips and coincidence of a combination and outputs a match signal, positions and coincidence of a combination can be detected automatically, thereby preventing occurrence of an erroneous mounting of other chips or a faulty operation, and hence the micropump is safe and economical.

A fifty-fifth invention is directed toward the micropump of the invention, characterized in that the recognition means is constituted of an electrode—which is provided on the surface of the pump structural material and is applied with a predetermined voltage—and produces a match signal when coming into contact with an electrode provided on the other chip. Provision of only electrodes enables detection of a match between the position of a chip of interest and positions of other chips and coincidence of a combination and an output of a match signal. Hence, the micropump can be configured inexpensively and becomes more economical.

A fifty-sixth invention is directed toward a micropump comprising: a pump structural material having a reaction chamber formed therein; a reaction agent which is housed in the reaction chamber and produces a gas of predetermined pressure; a reaction initiation section for causing the reaction agent to produce a gas; a channel which is provided in the pump structural material and guides the gas of predetermined pressure produced by the reaction agent to an outlet from the reaction chamber; and a control section for controlling operation of the reaction initiation section, reacted gas being supplied to another chip when the pump structural material is combined with the other chip, the micropump comprising: an optical recognition mark provided on the pump structural material and/or the other chip; and identification means for performing recognition of a chip and/or identification of a combination by means of the optical recognition mark. Hence, there can be provided a safe, economical micropump which can be assembled into a chip module of microstructure; which can realize easy control and stable predetermined characteristics; which enables easy recognition of a chip; and which prevents occurrence of faulty mounting of another chip or faulty operations.

A fifty-seventh invention is directed toward the micropump of the invention, characterized by comprising a physical recognition mark or an electrical recognition mark in place of the optical recognition mark of the micropump. There can be provided a safe, economical micropump which enables easy recognition of a chip; and which prevents occurrence of faulty mounting of another chip or faulty operations.

A fifty-eighth invention is directed toward the micropump of the invention, characterized in that at least one of the identification means and the control section is removably attachable. Since at least either the determination means or the control section is removably attachable, the determination means or the control section can be recycled and is economical.

A fifty-ninth invention is directed toward a sample processing chip comprising: a micropump including a pump structural material having a reaction chamber formed therein, a reaction agent which is housed in the reaction chamber and produces a gas of predetermined pressure, a reaction initiation section for causing the reaction agent to produce a gas, a channel which is provided in the pump structural material and guides the gas of predetermined pressure produced by the reaction agent to an outlet from the reaction chamber, and a control section for controlling operation of the reaction initiation section, reacted gas being supplied to another chip when the pump structural material is combined with the other chip, the micropump comprising: a flow passage control chip which guides a gas ejected from the micropump from a gas inlet port when used in combination with the micropump, shifts a sample filled in the reservoir, and controls a flow passage at this time; and a processing chip for processing a sample supplied from the flow passage control chip, wherein the control section controls a flow passage and/or processing of a sample. The micropump, the flow passage control chip, and the processing chip can be assembled into a microchip module, and the reaction agent is controlled by mans of the reaction initiation section. Hence, easy control and a predetermined characteristic can be stably achieved. The control section can easily perform flow passage control and sample processing control operations.

An sixtieth invention is directed toward the sample processing chip according to the invention, characterized in that the flow passage control chip and the processing chip are assembled into one piece. The flow passage control chip and the processing chip can be assembled into one chip which is easy to handle.

A sixty-first invention is directed toward the sample processing chip according to the invention, characterized in that the micropump and the flow passage control chip are assembled into one piece. The micropump and the flow passage control chip are assembled into one chip which is easy to handle.

A sixty-second invention is directed toward the sample processing chip according to the invention, characterized in that the micropump, the flow passage control chip, and the processing chip are assembled into one piece. The micropump, the flow passage control chip, and the processing chip are assembled into one chip which is easy to handle.

An sixty-third invention is directed toward the sample processing chip according to any one of the inventions, characterized in that a sheet connector is provided at least one location between the micropump, the flow passage control chip, and the processing chip, and the sheet connector is a gas permeable film. Only a gas is moved toward the flow passage control chip from only the outlet port. The sample does not reversely flow toward the micropump. The portion of the sheet connector other than the location of the outlet port acts as a seal.

A sixty-fourth invention is directed toward the sample processing chip according to any one of the inventions, characterized in that the sheet connector has a group of micropores penetrating there through in a direction in which fluid flows between chips. Only the outlet port section shifts fluid, such as a gas or liquid, and the portion of the sheet connector other than the location of the outlet port can act as a seal. Hence, the sheet connector is easy to manufacture.

A sixty-fifth invention is directed toward the sample processing chip according to the invention, characterized in that a group of the micropores are formed from conical micropores having flow passages whose cross-sectional areas become reduced in the flowing direction. Reverse flow can be prevented, and mixing contamination, which would otherwise stain surroundings as a result of leakage of a sample, can also be prevented.

A sixty-sixth invention is directed toward the sample processing chip according to the invention, characterized in that a group of the micropores are constituted of barrel-shaped micropores having flow passages whose cross-sectional areas become temporarily reduced and again expand in the flowing direction. When no pressure is applied to the sheet connector, a high sealing characteristic is achieved. When pressure is applied to the sheet connector, the sheet connector permits smooth flow of fluid in both directions.

A sixty-seventh invention is directed toward the sample processing chip according to any one of the inventions, characterized in that the sheet connector is constituted of an elastic sheet. Passage of fluid and prevention of a reverse flow and sealing can be performed more effectively.

A sixty-eighth invention is directed toward the sample processing chip according to any one of the inventions, characterized in that a sealing material for preventing mixing contamination having an elastic sheet is provided on at least an opening section of the reservoir of the flow passage control chip. After injection of a sample, the hole from which the sample injection member has been removed is closed by means of elastic force, thereby preventing occurrence of contamination.

A sixty-ninth invention is directed toward the sample processing chip according to the invention, characterized in that the sealing material is formed from an elastic porous material. After injection of a sample, the hole from which the sample injection member has been removed is closed by means of elastic force. As a result, a high-pressure transfer gas can permeate through the seal material, but occurrence of contamination can be prevented.

An seventieth invention is directed toward the sample processing chip according to the invention, characterized in that an elastic member for permitting insertion of a sample injection element is caused to adhere to the sealing material. Since the elastic member is present, the hole from which the sample injection member is removed can be closed without fail.

A seventy-first invention is directed toward the sample processing chip according to any one of the invention, characterized in that a sealing material receiving section is provided in the reservoir. Since force exerted at the time of insertion of the sample injection member is received by the seal material receiving section, insertion of the sample injection member is facilitated, and quick charge of the sample can be performed. Further, the sample injected as a result of presence of the seal material receiving section is retained by surface tension.

A seventy-second invention is directed toward the sample processing chip according to any one of the inventions, characterized in that a sample injection opening differing from the gas inlet port is brought in communication with the reservoir. Even when the micropump is recycled, contamination of the communication hole of the micropump can be prevented, because the sample injection opening and the gas inlet port are separated from each other.

A seventy-third invention is directed toward the sample processing chip according to any one of the inventions, characterized in that a surrounding of the reservoir is rendered water-repellent. Prevention of contamination can be easily performed through only surface treatment.

A seventy-fourth invention is directed toward the sample processing chip according to any one of the inventions, characterized in that the reservoir is provided with a cover material for covering the reservoir filled with a sample. The cover material covers and blocks the position above the sample. Hence, there can be prevented contamination of the sample by way of the communication hole or staining of surroundings, which would other wise be caused by a leaked sample.

A seventy-fifth invention is directed toward the sample processing chip according to the invention, characterized in that the cover material is a flexible member or a gas permeable material formed from fluid, foam, or a gel material, all being inert toward a sample. The soft member which is formed from inactive fluid, foam, or a gelling agent permits passage of a gas while flexibly changing its shape. Hence, contamination can be prevented with considerable effectiveness, and a sample can also be retained. The gas permeable material formed from a foaming material or the like enables prevention of contamination, penetration of a gas, and retaining of a sample.

A seventy-sixth invention is directed toward the sample processing chip according to any one of the inventions, characterized in that the reservoir is provided with an absorbent which absorbs a filled sample. The absorbent can retain a sample by means of capillarity.

A seventy-seventh invention is directed toward the sample processing chip according to any one of the inventions, characterized in that the reservoir is provided with a plurality of pins to be used for retaining a filled sample. A sample can be retained by means of surface tension through use of a plurality of pins.

A seventy-eighth invention is directed toward a sheet connector which is provided between chips to establish mutual communication between flow passages, comprising: a group of micropores penetrating through the sheet in a flowing direction. As a result, fluid can move through only the area of the sheet through which fluid flows. Areas of the sheet connector other than those through which fluid flows act as a seal.

A seventy-ninth invention is directed toward the sheet connector according to the invention, characterized in that the group of micropores are formed from conical micropores having flow passages whose cross-sectional areas become reduced in the flowing direction. Occurrence of a reverse flow can be prevented.

A eightieth invention is directed toward the sheet connector according to the invention, characterized in that the group of micropores are formed from barrel-shaped micropores having flow passages whose cross-sectional areas are temporarily reduced and expand again. When no pressure is applied to the micropores, a high sealing characteristic is achieved. When pressure is applied to the micropores, the micropores enables smooth, bi-directional flow of fluid.

A eighty-first invention is directed toward the sheet connector according to any one of the invention, characterized in that the sheet is formed from an elastic material. Passage of fluid and prevention of a reverse flow, and sealing can be achieved more effectively.

A third embodiment group of the invention will now be described by reference to FIGS. 21 to 26.

Thirteenth Embodiment

A micropump and a sample processing chip, both pertaining to a thirteenth embodiment of the invention, will be described. FIG. 21A is an exploded descriptive view of a micropump according to a thirteenth embodiment of the invention; FIG. 21B is a cross-sectional view of the micropump taken along line X-X in FIG. 21A; FIG. 22A is an exploded perspective view of a sample processing chip on which the micropumps according to the thirteenth embodiment of the invention are stacked; FIG. 22B is a fragmentary broken enlarged view of a flow passage control chip constituting the sample processing chip shown in FIG. 22A; and FIG. 23 is a view showing the micropump according to the thirteen embodiment of the invention and a controller of a sample processing chip on which the micropumps are stacked.

In FIGS. 21A and 21B, reference numeral 301 designates a micropump which produces a high-pressure gas by means of chemical reaction, to thereby transfer, by means of the high pressure gas, a sample M stored in a reservoir of another chip remaining in communication with the micropump; 302 designates a first structural material of the micropump 301; 302a designates an indentation formed in the first structural material 302; 303 designates a second structural material of the micropump 301; and 303a designates an indentation formed in the second structural material 303. Reference numeral 304 designates a reaction agent which is stored in the indentations 302a, 303a and produces a gas by means of chemical reaction; and 305 designates a reaction initiation section which initiates, interrupts, or stops reaction by application of heat and pressure to the reaction agent 304. The reaction initiation section 305 can easily control heating operation by means of a heating element which is dependent on a reaction temperature and is most suitable for use with a micromachine. In addition, reaction may also be commenced by application of pressure or the like. Reference numeral 306 designates a reaction chamber formed from the indentations 302a, 303a; 307 designates a channel for introducing a reacted high-pressure gas from the reaction chamber 306 to another chip; and 308 designates a communication hole (i.e., a discharge port of the present embodiment) which is provided at the end of the channel 307 and is intended for establishing connection with another chip.

The first structural material 302 is a sheet-like upper casing for housing the reaction agent 304 within the reaction chamber 306. Similarly, the second structural material 303 is a sheet-like lower casing for housing the reaction agent 304 within the reaction chamber 306. The first and second structural materials 302, 303 are formed from metal, ceramics, glass, resin, or the like and have a thickness ranging from tens of micrometers to millimeters. Etching, machining, laser beam machining, plasma processing, printing, optical forming, or a like technique is appropriate as a method for processing details of the indentations 302a, 303a constituting the reaction chamber 306, the channel 307, and the communication hole 308.

Although various materials are available for the reaction agent 304 which produces a gas by means of chemical reaction, sodium azide, tetrazoles, sodium bicarbonates, or a like material is desirable. Sodium azide and tetrazoles cause reaction when heated to 150° C. or higher, thereby producing an $N_2$ gas. When heated up to 100° C. or higher, sodium bicarbonate cause reaction, thereby producing $N_2$ and $CO_2$ gases. As mentioned above, an inactive gas such as an $N_2$ gas, a $CO_2$ gas, or the like is produced. Hence, the reaction agent does not affect the human body, the environment, or the sample M. Thus, the safety of the micropump 301 is enhanced. Use of a noncontaminating chemical, such as tetrazoles and sodium bicarbonates, as the reaction agent 304 enables realization of the micropump 301 which is highly safe even when discarded.

As mentioned above, the micropump 301 of the thirteenth embodiment enables realization of accurate correspondence between the position of the reaction agent 304 and that of the reaction initiation section 305 by means of stacking a structural material, the reaction agent 304, and the reaction initiation section 305. As a result, direct control of the micropump in a minute area becomes possible, thereby enabling realization of the micropump 301 whose reaction speed has been increased and which has superior responsiveness. Moreover, there is employed a structure embodied by stacking sheet-like structural materials, and hence the micropump 301 is eventually imparted with a chip structure and can constitute a sample processing chip for a variety of applications when used in combination with another chip.

There will now be described a sample processing chip embodied by combination of another chip module, such as a flow passage control chip or a reaction detection chip, and the micropump 301. In FIGS. 22A and 22B, reference numeral 301a designates a pump chip (i.e., a pump structural material of the invention) constituting a micropump main body exclusive of the reaction initiation section 305; 312 designates a sealing material interposed between pump chips 301a when the pump chips 301a are stacked; 312a designates an opening connected to a communication hole 308; 313 designates a flow passage control chip for controlling a flow when a sample M is ejected by means of a reactant gas delivered from the micropump 301; and 314 designates a reaction detection chip (i.e., a processing chip of the invention) on which the flow passage control chips 313 are stacked. The flow passage control chip 313 and the reaction detection chip 314 can also be assembled into a single chip.

The pump chip 301a and the flow passage control chip 313 constitute a single chip which is to serve as a flow passage control unit. The chip is stacked on the reaction detection chip 314, to thereby realize as a whole a sample processing chip in which two chips are stacked. Moreover, the pump chip 301a and the flow passage control chip 313 can be assembled into one chip. Further, the pump chip 301a, the flow passage control chip 313, and the reaction detection chip 314 can also be assembled into one complete sample processing chip. Here, the reaction initiation section 305 is preferably formed as a member separate from the chip. The reaction initiation section 305 can be recycled so long as it is rendered removably attached to the chip and disposed beside an analyzer (not shown) on which, e.g., the sample processing chip is mounted.

The flow passage control chip 313 will now be described. Reference numeral 315 designates a microvalve which is provided in the flow passage control chip 313 and opened and closed by means of the inertia of a valve element derived from application of vibration, the reaction force originating from a V-shaped interior wall surface, and the pressure of supplied fluid. Reference numeral 316 designates a valve element of the microvalve 315; 317 designates a valve chamber; 317a designates a V-shaped valve seat which engages with the valve element 316, to thereby allow interruption and passage of a flow; and 318 designates a channel connected to the microvalve 315. Reference numeral 319 designates a reservoir which is connected to the opening 312a and the communication hole 308 and filled with the sample M; and 320 designates a piezoelectric element for applying vibration to the valve element 316 of the microvalve 315 in a direction orthogonal to the flow.

Next, there will be described the reaction detection chip 314. Reference numeral 321 designates a detection section provided with various types of sensors 339c (which will be described later) for measurement purposes; and 322 designates a reaction section formed in a predetermined fluid circuit. In the present embodiment, there will be described a microvalve 315. However, this embodiment is a mere illustration of preferred embodiments of the invention. Naturally, the invention is not limited to the embodiment. A diaphragm valve or another flow passage control method which enables use of a microstructure can also be employed.

In this chip, the width of the channel 318 and that of the detection section 321 are on the order of micrometers to hundreds of micrometers. The width of the valve chamber 317 is larger than that of the channel 318 and that of the detection section 321 but is substantially of the same order. The length of a valve element is about two to ten times the width of the channel. When pressure (back pressure) originates from the reservoir 319 in the microvalve 315, the valve element 316 can fit into the valve seat 317a without involvement of rattling, by means of a wedge effect. Namely, as a result of application of force to a tapered surface from the direction of back pressure, the force is amplified by means of leverage.

Subsequently, the above-described micropump 301 and a controller of a sample processing chip on which the micropump 301 is stacked will now be described. In FIG. 23, reference numeral 320a designates a piezoelectric layer, made of, for example, PZT (lead zirconate titanate) or the like, constituting the piezoelectric element 320; and 320b designates a pair of opposing electrode sheets an electrode sheet for applying a voltage to the piezoelectric layer 320a. One of the electrode sheets 320b opposing each other with the piezoelectric layer 320a interposed therebetween is connected to the earth, and a voltage of predetermined drive frequency for control purpose is applied to the other electrode sheet 320b.

Reference numeral 329 designates a controller for controlling the micropump 301 of the embodiment and the entirety of the sample processing chip. Reference numeral 330 designates a reaction drive section for activating the reaction initiation section 305 of the micropump 301; 331 designates a central control section (a control section of the embodiment) for controlling the entire system of the controller; and 332 designates a power source section. Reference numeral 333 designates a waveform control section which changes the frequency and amplitude of a current and those of a voltage, both being supplied from the power source section 332, and shapes a waveform of the current and that of the voltage; 334 designates an input section capable of specifying and controlling shaping of a waveform to be performed by the waveform control section 333 on a per-control-operation basis from the outside; and 335 designates an amplifier for controlling the amplitude of an analog control signal shaped by the waveform control section 333. As a result of a drive current output from the amplifier 335 having changed positively or negatively, repeated expansion or contraction of the piezoelectric element 320 becomes possible.

Reference numeral 336 designates a display section for providing an indication on a display (not shown); 337 designates a digital-to-analog converter; 338 designates a storage section for storing a control program and data for use with the central control section 331; and 338a designates a control table in which are stored control data specifying timings at which power is to be fed to the reaction drive section 330 and for controlling operations of the microvalve 301a.

Reference numeral 339a designates a pressure sensor provided in the channel 307; 339b designates a vibration detection sensor provided in the channel 318 at a location in the vicinity of the valve seat 317a of the microvalve 315; and 339c designates various sensors provided in the detection section 333. The central control section 331 is constituted as function implementation means which loads a control program to a central processing unit (CPU) from the storage section 338, thereby activating the CPU. Therefore, the central control section 331, the input section 334, the display section 336, the storage section 338, and the control table 338a can also be constituted of a personal computer or the like so as to be separated from the reaction drive section 330 and the valve controller. In this case, the reaction drive section 330 and the valve controller become removable. In contrast with an analog signal which is a drive output from the valve controller, a control signal output from the central control section 331 is a mere digital signal, and hence the signal must be subjected to digital-to-analog conversion. Preferably, the central control section 331 subjects as much of the signal as possible to digital processing, thereby simplifying analog processing. Further, when the pump chip 301a, the flow passage control chip 313, and the reaction detection chip 314 are replaced, the controller 329 is obviously recycled.

By reference to FIG. 23, there will now be described a control method for controlling the micropump 301, the flow passage control chip 313, and the reaction detection chip 314 by means of a controller 329 of the thirteenth embodiment. First, an explanation is given of a case where the micropump 301 is controlled. A list of sample processing chips is displayed on a display (not shown), and required settings are performed by way of an input section 334. If the sample processing chip becomes different, the sample M also becomes different. Therefore, reaction and processing change according to the nature of the loaded reaction detection chip 314. Operation of the micropump 301, the aperture or opening/closing of the microvalve 315, and operations of the sensors 339c of the detection section 321 are set for each reaction of the sample M (for each sample processing chip).

When initiation of operation of the micropump 301 is instructed on the display, the central control section 331 loads control data, which are to serve as a target control value, from the control table 338a along with the input setting value, and commences control operation. The target value is not limited to a constant value and may include a value which varies with time. The reaction drive section 330 operates to convert a source voltage of the power supply section 332a to a predetermined voltage and applies the thus-converted voltage to the reaction initiation section 305. The reaction initiation section 305 of the thirteenth embodiment is heating means such as a heater and starts heating operation. The reaction agent 304 starts reaction with a predetermined time lag, thereby rapidly increasing pressure, whereupon a predetermined reactant gas is discharged to the channel 307. The pressure sensor 339a is provided in the channel 307, thereby detecting the pressure and feeding back the thus-detected pressure to the central control section 331. In addition to being provided at the channel 307, the pressure sensor 339a may be provided at any location, so long as the location is in the flow passage of the micropump 301 such as the inside of the reaction chamber 306. Another sensor, such as a flow sensor, may be employed in lieu of the pressure sensor 339a. Moreover, the pressure sensor 339a, the flow sensor, or the like are constituted so as to be removably attachable. As a result, when the micropump 301 is replaced as a result of use of all the reaction agents 304 of the micropump 301, the pressure sensor 339a and the flow sensor can be recycled. When the detected pressure is lower than a predetermined pressure or flow rate, which are to serve as target values, the central control section 331 further heats the reaction initiation section 330 for promoting reaction. When the detected pressure has exceeded the target pressure or flow rate, the central control section 331 instructs the reaction drive section 330 to suppress heating operation. When the pressure has further exceeded a predetermined threshold value, the heating operation is stopped, thereby stopping heating action of the reaction agent 304.

Incidentally, the central control section 331 subjects the reaction drive section 330 to the above-described control operation and instructs the waveform control section 333 to actuate the piezoelectric element 320. As a result, the piezoelectric element 320 causes vibrations, thereby opening and closing or changing the aperture of the microvalve 315. Since the back pressure of the reactant gas is applied to the sample M, the back pressure is discharged at a stroke when the microvalve 315 is opened, whereupon the sample M flows into the channel 318 located in the vicinity of the seat valve 317a. Vibrational changes are detected by the vibration detection sensor 339b at two locations, thereby detecting a flow rate. Here, an optical sensor consisting of a light-emitting element and a light-receiving element, a pressure sensor for detecting pressure, or a flow sensor for detecting a flow rate may be employed in place of the vibration detection sensor 339b. The signal detected by the vibration detection sensor 339b is delivered to the central control section 331, where the flow rate of fluid can be computed if the ambient temperature is ascertained. If a difference exists between the computed flow rate and the target flow rate, the central control section 331 changes the aperture of the microvalve 315 by changing the frequency or amplitude of the piezoelectric element 320. As a result of the vibration detection sensor 339b and the other detection device being constituted to be replaceable or removably attachable, the vibration sensor 339b or other sensors can be recycled even at the time of replacement or disposal of the flow passage control chip 313 and the reaction detection chip 314, and hence the sensors are economical.

The sample M that has flowed from the microvalve 315 flows into the detection section 321 of the reaction detection chip 314. The sensors 339c of various types are provided in the detection section 321, and predetermined detection operations are performed. The sample M is subjected to predetermined reaction (i.e., the processing of the present invention) performed by the reaction section 322. Although not shown in FIGS. 22 and 23, the detection section 321 may be provided subsequent to the reaction section 322. In this case, residues representing the processing states of the respective sensors 339c are detected. In this case, the sensors 339c may be sensors which detect the quantity of residue as a change in optical intensity by utilization of fluorescent reaction or the like or sensors which detect the quantity of residue as a change in impedance.

When, on the basis of detection signals pertaining to pressure and a flow rate, which are detected by the pressure sensor 339a, the vibration detection sensor 339b, and various sensors 339c, an anomaly is considered to have arisen in the reaction developing in the micropump 301 or the reaction of the sample M conducted in the reaction section 322, the central control section 331 immediately stops heating action of the reaction initiation section 305, thereby closing or opening the microvalve 315. For instance, when pressure has become anomalously high in excess of predetermined pressure, the microvalve 305 is opened for relieving purpose. If reaction is not performed at a predetermined timing or a sample is not transported, heating of the reaction initiation section 305 is stopped, thereby closing the microvalve 315.

The quantity of gas emitted from the reaction agent 304 can be controlled by combination of the power fed to the reaction agent 304 with a supply time. Accordingly, more accurate control can be implemented by controlling the power supplied to the reaction initiation section 305 while a time is measured with a timer (not shown).

As mentioned above, if predetermined control is specified while target control values are stored in the control table 338a, the micropump and the sample processing chip, both pertaining to the thirteenth embodiment, can stably realize an expected predetermined characteristic by performing control operation in accordance with the control data of the control table 338a. Further, controllability can be improved by feeding back a delivery pressure and a flow rate. Controlling a total quantity of heat by power enables achievement of a further improvement in controllability. The flow passage control chip 313 can be stacked on the reaction detection chip 314 that detects the sample M and effects reaction of the sample M, and used in combination with various reaction detection chips 314, thereby enabling configuration of the sample processing chip having a variety of applications. Optimum control can be performed for any of a variety of applications.

The sample processing chip of the thirteenth embodiment that has been described above is embodied by forming, in one sample processing chip, one micropump 301 and one reaction detection flow passage (i.e., the flow passage control chip 313 and the reaction detection chip 314). In contrast, a plurality of independent micropumps 301 and a plurality of independent reaction detection flow passages can be provided on one sample processing chip.

Fourteenth Embodiment

Subsequently, a micropump which enables multiple use of the reaction agent 304 and a controller capable of perceiving use or nonuse of the reaction agent 304 will be described. To this end, the pump chip of a fourteenth embodiment has a plurality of small reaction agents and small reaction initiation sections and is equipped with a memory IC. FIGS. 24A to 24C are descriptive views of a reaction agent and a reaction chamber of a micropump according to the fourteenth embodiment of the invention; FIG. 25A is an external view of a memory section for a pre-used reaction agent of the micropump according to the fourteenth embodiment of the invention; and FIG. 25B is a descriptive view of a memory mechanism of the micropump according to the fourteenth embodiment of the invention.

Figure 24:
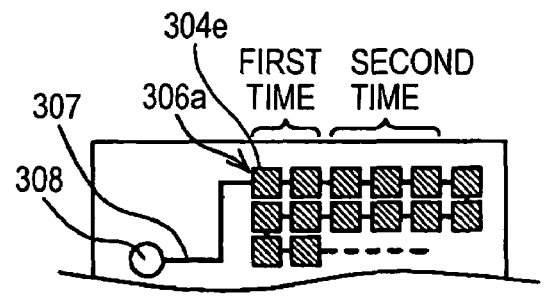
Figure 24:
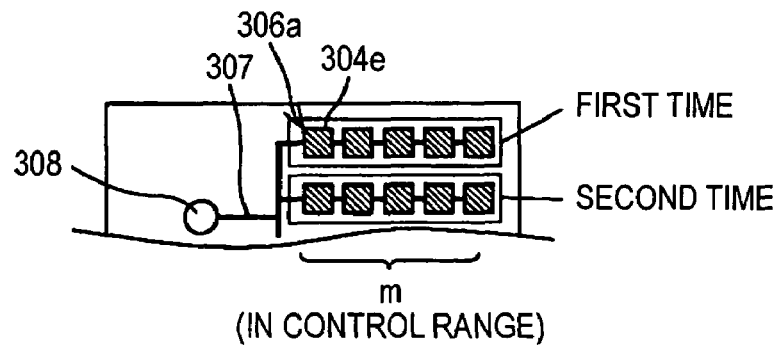
Figure 24:
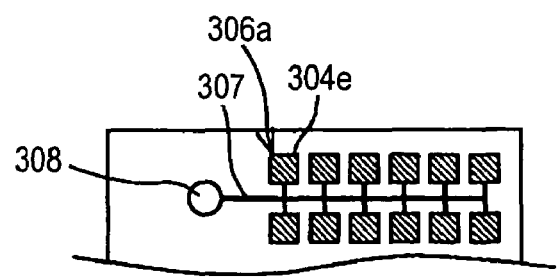

In FIGS. 24A to 25B, reference numeral 304e designates a small reaction agent; 305a designates a small reaction initiation section; and 306a designates a small reaction chamber. FIG. 24A shows a case where a plurality of small reaction chambers 306a are arranged in series and the small reaction agents 304e are housed in the respective small reaction chambers 306a. In this case, the small reaction agents 304e of the small reaction chambers 306a are used in the sequence of increasing distance from the communication hole 308 connected to the reservoir 319. In FIG. 24A, two small reaction agents 304e are used at the first time, and three small reaction agents 304e are used at the second time. Thus, when the small reaction chambers 306a are arranged in series, a loss which arises at the end of use of the reaction agents becomes small.

FIG. 24B shows a case where "n" trains are connected in parallel with the communication hole 308, in correspondence to "n" times, and in which each train is formed by arranging in series "m" small reaction chambers 306a for housing "m" small reaction agents 304e to be used for a single reaction. In this case, "m" small reaction agents 304e used in one reaction are arranged in completely the same state. Hence, a small difference exists between reactions, and the reactions become stable. Next, FIG. 24C shows a case where the small reaction chambers 306a are separately branched from one channel 307. In contrast with the cases shown in FIGS. 24A and 24B, the reactant gas does not pass through the small reaction chambers 306a that have finished reaction, and hence reaction becomes stable. As in the case shown in FIG. 24A, it is evident that the micropump can be utilized a plurality of times, to thereby cause a small loss of reaction agent.

As mentioned above, in relation to the micropump 301 equipped with a plurality of the small reaction agents 304e and the small reaction initiation sections 305a, both pertaining to the fourteenth embodiment, reaction speed is increased by miniaturizing the reaction agents 304, thereby enhancing responsiveness. Specifically, when the small reaction initiation means 305a are activated, the small reaction agents 304e cause reaction simultaneously, and the pressure stemming from the produced gas exhibits a sharp rise and can reach a target pressure momentarily. Since the plurality of small reaction agents 304e are provided, the pump chip 301a can be used a plurality of times without being discarded after a single use. The only requirement is to effect pressure control on the basis of the number and arrangement of the small reaction agents 304e, thus facilitating control.

When the plurality of small reaction agents 304e are provided, effective utilization of the small reaction agents cannot be performed unless the small reaction agents 304e are determined to be used or unused. In FIGS. 25A, 25B, reference numeral 340 designates a memory IC for recording used addresses of the small reaction agents 304e; 341 designates an electrode port section, such as an input/output port for producing an output from the memory IC 340 and an electrode for supplying power; 342 designates a resistor (i.e., memory input element means of the embodiment) which is provided in the vicinity of the small reaction agent 304e and assigned uniquely to the respective small reaction agents 304e and 343 designates filters which are provided in the respective small reaction chambers 306a and which permit passage of only a gas when the small reaction agents 304e have become gasified through reaction. Liquid can be used as the small reaction agent 304e by appropriate selection of the filter 343.

A pull-up voltage (not shown) is applied to a resistor array constituted of the resistors 342. Reaction of the small reaction agent 304e is induced by heating the small reaction initiation section 305a, whereupon the resistor 342 located at a specific location is broken by the heat. As a result of breakage of the resistor, an ON signal is produced and delivered to the memory IC 340. As shown in FIG. 25B, the locations where the resistors 342 are disposed is desirably be set between the small reaction initiation sections 305a and the small reaction agents 304e. In this case, as the resistor 342 is heated prior to the small reaction agent 304e, the resistor 342 is broken without fail. In addition, a portion of the electric current flowing through the small reaction initiation section 305a or an electric current output from another circuit may be caused to flow through the resistor 342, thereby breaking the resistor 342. In this case, the reaction initiation means of the small reaction agent 304e may initiate reaction without heating, or it maybe the case that the reaction of the small reaction agent 304e does not involve heating action. Further, a determination may be made as to whether or not an electric current is applied to the small reaction agent 304e, or a resistance value or dielectric constant may be measured.

The ON signal stemming from breakage of the resistor is input to the memory IC 340 after having been subjected to analog-to-digital conversion. A flag as signed to the use state of the small reaction agent 304e located at the position corresponding to the location of the breakage is changed from an unused state to a used state, and the change is recorded. The unused small reaction agents 304e and the used small reaction agents 304e can be output as a result of the central control section 331 accessing the memory IC 340 by way of the electrode port section 341. As a result, a determination can be readily made as to which one of the small reaction agents 304e is usable. Further, when the pump chip 301a and the flow passage control chip 313 are connected to the central control section 331 or when the small reaction agent 304e is completely used during the course of operation of the micropump 301, an end-of-use notice is sent to the central control section 331 from the memory IC 340, thereby improving convenience. Further, the memory IC 340 is inexpensive. Even when the memory IC 340 is mounted on the pump chip 301a, only a low cost is incurred. If replacement is performed on a per-chip basis, implementation of only the micropump 301 results in considerably facilitated management of the small reaction agent 304e. When no power is supplied to the memory IC340, which condition would arise, e.g., at the time of replacement of the pump chip 301a, use of nonvolatile memory such as flash memory or one-time write memory in conjunction with the memory IC 340 is preferable. Although the fourteenth embodiment has described a case where the use state of the small reaction agent 304e is managed by combination of the memory IC 340 with the resistor 342, a determination can be made as to whether or not the small reaction agent 304e is used, by means of recording an used address of a used small reaction agent 304e through simple use of only the memory IC 340. Further, when the micropump 301 is mounted by use of only the resistor 342, a determination can be made as to whether or not a small reaction agent is used, by electrically scanning the respective resistors 342. Information as to whether or not a small reaction agent is used can be retained without power.

Fifteenth Embodiment

There will now be described a micropump 301 capable of rendering the pressure of a reactant gas constant and another micropump 301 capable of preventing eruption of a high-pressure gas, which would otherwise arise when a sample processing chip is broken after use. FIG. 26A is a descriptive view of a first constant pressure configuration according to a fifteenth embodiment of the invention; FIG. 26B is a descriptive view of a second constant pressure configuration according to the fifteen embodiment of the invention; FIG. 26C is a descriptive view of a first decompression configuration according to the fifteen embodiment of the invention; and FIG. 26D is a descriptive view of a second decompression configuration according to the fifteenth embodiment of the invention.

When the micropump 301 is subjected to pressure control, in many cases pumping the sample M at constant pressure is preferable. As has been described in connection with the thirteenth embodiment, the central control section 331 controls the reaction initiation section 305, thereby effecting constant pressure control. However, in view of the nature of chemical reaction, real-time pressure control is difficult. If pressure can be made constant by means of a structure, a burden on pressure control can be alleviated. The fifteenth embodiment employs a structure for this purpose. In FIGS. 26A, 26B, reference numeral 345 designates a gas permeable film formed from fluorine resin or a porous material; and 346 designates a constant-pressure chamber formed to a volume which is sufficiently larger than that of the channel 307. The pump chip 301a is stacked on the flow passage control chip 313 or a chip formed by assembling, into one piece, the flow passage control chip 313 and the reaction detection chip 314.

As shown in FIG. 26A, a limiting value for relieving a high-pressure gas from the inside of the channel 307 is set by means of selecting the material and thickness of the gas permeable film 345. As a result of provision of the gas permeable film 345 can be set, when predetermined pressure has been achieved, the reactant gas passes through the gas permeable film 345, thus maintaining constant pressure. So long as the constant pressure chamber 346 shown in FIG. 26B is provided, even when a gas inflates in association with transport of the sample M, pressure fluctuations can be suppressed to a minute level, and hence there can be realized a pump characteristic which enables accurate transport control. Since the pressure that has made a steep ascent can be mitigated, there can be realized a pump characteristic which provides constant pressure sufficient for transporting the sample M.

As mentioned above, one or both of the gas permeable film 345 and the constant pressure chamber 346 are provided, and the reaction level of the reaction agent 304 is controlled by the central control section 331, thereby enabling accurate constant pressure control.

Subsequently, there will now be described the micropump 301 which can prevent eruption of a high-pressure gas when the sample processing chip is disassembled after use and when reaction is stopped urgently. When the sample processing chip is disassembled after use of the chip or at the time of emergency stoppage, the micropump 301, the flow passage control chip 313 (i.e., the structural material of the embodiment), and the reaction detection chip 314 are still filled with a high-pressure reactant gas. Therefore, the micropump 301 of the fifteenth embodiment has a structure for enabling escape of the gas by means of depressurizing the micropump at the time of disassembly.

In FIGS. 26C, 26D, reference numeral 347 designates a seal material formed from an elastic material; and 347a designates an elastic rib provided on the seal material 347. The micropump 301 shown in FIG. 26C is provided with a constant-pressure chamber 346 having a sufficiently large volume and has an open structure whose one end is widely open.

When the pump chip 301a is stacked on the flow passage control chip 313 or on a chip formed by assembling, into one piece, the flow passage control chip 313 and the reaction detection chip 314, the pump chip 301a is stacked on the chip with the seal material 347 sandwiched therebetween. The seal material 347 ensures gas tightness with respect to a normal gas pressure. However, in the event that emergency stoppage must be effected for reasons of an anomalous reaction or the like, when the pump chip 301a is disassembled along with the flow passage control chip 313 or the like, the reactant gas escapes from one large opening of the constant-pressure chamber 346 and the communication hole 308. The speed of eruption of the gas can be reduced as compared with a case where the gas erupts from only the communication hole 308. As a result, safety from a high-pressure gas, which would be required at the time of disassembly of the sample processing chip, can be enhanced.

Under the situation where the elastic rib 347a shown in FIG. 26D is provided, when the pump chip 301a is disassembled in a case where the micropump must be urgently stopped for reasons of an anomalous reaction or the like, one large opening of the constant-pressure chamber 346 is gradually opened by means of elasticity of the elastic rib 347a, thereby enabling gradual escape of the high-pressure gas. As a result, when the sample processing chip is disassembled, the high-pressure, hot gas is gradually relieved, thereby enabling escape of the high-pressure, hot gas. The elastic rib 347a shown in FIG. 26D is formed integrally on the seal material 347. However, the same effect is yielded even when the elastic rib 347a is provided on the pump chip 301a. The number of elastic ribs 347a can be determined on the basis of the relationship with the elasticity of the elastic ribs. Avoidance of a constant height enables smoother relief of an internal gas. If the height of the ribs is made constant, sealing of the sample processing chip with uniform elasticity is facilitated.

Configuration and working-effects of the third embodiment group will now be described.

According to a micropump of the embodiment, the detection means detects the pressure or flow rate of the gas and performs feedback control such that the pressure or flow rate approaches a predetermined target level. Hence, control can be carried out such that the pressure and flow rate have predetermined stable characteristics. The reaction start section and the reaction agent are stacked into a microstructure, and hence reaction for generating a gas can be performed at high speed. Since the micropump has superior responsiveness and great transport power and can be slimmed, assembly of the micropump by stacking the micropump on an other chip is easy. The reaction initiation section is stacked as a separate member, and hence the micropump can be recycled.

Pressure or a flow rate can be detected readily by means of a pressure sensor or a flow sensor.

Since the detection means and the control section are removably attachable, the detection means and the control section can be recycled and are economical.

A reaction agent can be subjected to reaction such that predetermined pressure or flow rate (i.e., a target level) is achieved, in accordance with control data pertaining to a predetermined process stored in the storage section.

The total quantity of heat to be applied to the reaction agent is controlled by means of power supplied to the reaction initiation section or a supply time. Thereby, the reaction agent can be subjected to reaction such that predetermined pressure or a predetermined flow rate (i.e., a target level) is achieved, in accordance with control data pertaining to a predetermined process.

Since at least one of the reaction agent and the reaction initiation section is constituted of a small reaction agent or a small reaction initiation section, a reaction speed becomes fast, and a high level of controllability is achieved, thereby enhancing responsiveness.

The pump structural material is provided with at least one memory input element means, and a memory IC which receives an ON signal from the memory input element means as a result of use of respective small reaction agents. A determination as to which one of the reaction agents can be used can be made readily. When all the reaction agents have been used, exhaustion of the reaction agents is reported from the memory IC to the central control section, thereby enhancing convenience. Further, memory is inexpensive. Even when a memory IC is mounted on the pump structural material, low costs will be incurred, thereby considerably facilitating management of the reaction agents.

Since the memory input element means is means for breaking the resistor with reaction heat of the reactant, information about usage of the reactant agent becomes reliable. Since the memory input element means is means for breaking the resistor by utilization of the heat applied to cause reaction of the reaction agent, information about usage of the reaction agent becomes reliable.

Information about use of the reaction agent is detected by means of the possibility of energization of the memory input element means constituted of a reaction agent and electrodes, and the resistance value or the dielectric constant of the memory input element means. Hence, a simple configuration, a low price, and easy detection can be achieved.

The memory IC is provided on the pump structural material and outputs information about the used/unused state of a reaction agent when connected to a control section. Hence, information about the used/unused state of a reaction agent can be added to the micropump, and management of the reaction agent for each micropump becomes considerably easy.

Since there is provided a gas permeable film for permitting passage of a gas from the inside of the flow passage, the pressure of the gas flowing inside of the pump can be made constant without rendering the pump structural material bulky.

Since a constant-pressure chamber is provided, the pressure of the gas flowing through the inside of the chamber can be made constant every easily by forming only a space of predetermined volume even if a change has arisen in the volume of the gas attributable to the flow thereof.

According to the sample processing chip of the embodiment, the micropump, the flow passage control chip, and the processing chip can be controlled in consideration of a processing state of the processing chip that processes a sample. Since the micropump, the flow passage control chip, and the processing chip, respectively, can be removed, any of them can be recycled in accordance with applications.

Since the processing chip is provided with detection means for detecting the processing state of a sample, the control section stops reaction of the reaction agent, thereby stopping the processing in the event that an anomaly arises in the processing state of the processing chip.

By means of the detection means which detects the state and/or pressure of a flow, the flow rate or pressure of at least either the flow passage control chip or the processing chip is detected, thereby determining the flow rate of the sample to be transported. The micropump, the flow passage control chip, and the processing chip can be controlled with high accuracy in accordance with at least either the flow rate of the flow passage control chip or that of the processing chip.

The detection means for detecting the state of a flow is optical means, vibration detection means, or a fluid flow sensor. Hence, a flow rate can be detected easily. Since the detection means for detecting pressure is a pressure sensor, pressure can be detected easily. Since detection means for detecting the state and pressure of a flow is removably attachable, the detection means can be recycled and is therefore economical.

Since the fluid control chip and the processing chip are assembled into one chip, the chip can be made compact, slim, and easy to process. Since the micropump and the flow passage control chip are reassembled into one chip, the chip can be made compact, slim, and easy to process. The micropump, the flow passage control chip, and the processing chip are assembled into a single chip, and hence the chip can be made compact, slim, and easy to process.

When a processing chip for a different sample is attached to the micropump, control data pertaining to the natures of the respective sample processing chips are read from the storage section and taken as target values, and the control is effected in accordance with the thus-read target values, thereby enhancing controllability and facilitating control.

When the pump structural material is separated from the structural element, the opening of the constant-pressure chamber becomes exposed. Hence, the high-pressure gas is discharged from the opening, thereby improving safety.

Elastic ribs are provided on the surface of the seal material. Hence, when the pump structural material is separated from the structural element, the internal gas can be smoothly relieved by means of elasticity of the elastic ribs. Since the ribs are provided on the surface of the pump structural material, internal gas can be smoothly relieved by means of elastic force developing between the rib and the seal material when the pump structural material is separated from the structural element.

A eighty-second invention is directed toward a micropump including a pump structural material having a reaction chamber formed therein; a reaction agent which is housed in the reaction chamber and produces a gas of predetermined pressure; a reaction initiation section which is disposed beside the reaction agent and causes the reaction agent to produce a gas; a channel which is provided in the pump structural material and guides the gas of predetermined pressure produced by the reaction agent to an outlet from the reaction chamber; and a control section for controlling operation of the reaction initiation section, wherein: the channel or the reaction chamber is provided with detection means for detecting the pressure or flow rate of a gas; a signal detected by the detection means is sent to the control section; and the control section controls the reaction initiation section in accordance with the signal such that a pressure or flow rate approaches a predetermined target level. The detection means detects the pressure or flow rate of the gas and performs feedback control such that the pressure or flow rate approaches a predetermined target level. Hence, control can be carried out such that the pressure and flow rate attain predetermined stable characteristics. The reaction start section and the reaction agent are stacked into a microstructure, and hence reaction for generating a gas can be performed at high speed. Since the micropump has superior responsiveness and great transport power and can be slimmed, assembly of the micropump by stacking the micropump on another chip is easy. The reaction start section is stacked as a separate member, and hence the micropump can be recycled.

A eighty-third invention is directed toward the micropump according to the invention, characterized in that the detection means is a pressure sensor for detecting the pressure of a gas or a flow sensor for detecting a flow rate of a gas. Pressure or a flow rate can be detected readily by means of a pressure sensor or a flow sensor.

A eighty-fourth invention is directed toward the micropump according to the invention, characterized in that at least one of the detection means and the control section is removably attachable. Since the detection means and the control section are removably attachable, the detection means and the control section can be recycled and are economical.

A eighty-fifth invention is directed toward the micropump according to any one of the inventions, characterized by further comprising a storage section for storing control data, wherein the control section controls the reaction initiation section in accordance with the control data. A reaction agent can be subjected to reaction such that predetermined pressure or flow rate (i.e., a target level) is achieved, in accordance with control data pertaining to a predetermined process stored in the storage section.

An eighty-sixth invention is directed toward a micropump including a pump structural material having a reaction chamber formed therein; a reaction agent which is housed in the reaction chamber and produces a gas of predetermined pressure; a reaction initiation section which is disposed beside the reaction agent and causes the reaction agent to produce a gas; a channel which is provided in the pump structural material and guides the gas of predetermined pressure produced by the reaction agent to an outlet from the reaction chamber; and a control section for controlling operation of the reaction initiation section, the micropump comprising: a storage section for storing control data, wherein the control section controls the reaction initiation section in accordance with the control data. A reaction agent can be subjected to reaction such that predetermined pressure or flow rate (i.e., a target level) is achieved, in accordance with control data pertaining to a predetermined process stored in the storage section.

An eighty-seventh invention is directed toward the micropump according to the invention, characterized in that the control section performs control operation by means of at least power supplied to the reaction initiation section or a supply time of the power. A total amount of heat to be applied to the reaction agent is controlled in accordance with the power supplied to the reaction initiation section and a supply time. As a result, a reaction agent can be subjected to reaction such that predetermined pressure or flow rate (i.e., a target level) is achieved, in accordance with control data pertaining to a predetermined process.

An eighty-eighth invention is directed toward the micropump according to any one of the inventions, characterized in that at least one of the reaction agent and the reaction initiation section is constituted of a small reaction agent or a small reaction initiation section. A reaction speed becomes faster, and controllability is improved, thereby enhancing responsiveness.

An eighty-ninth invention is directed toward the micropump according to any one of the inventions, characterized in that the pump structural material is provided with at least one memory input element means and a memory IC which receives an ON signal from the memory input element means through use of respective small reaction agents. A determination as to which one of the reaction agents can be used can be made readily. When all the reaction agents have been used, exhaustion of the reaction agents is reported from the memory IC to the central control section, thereby enhancing convenience. Further, memory is inexpensive. Even when a memory IC is mounted on the pump structural material, low costs will be incurred, thereby considerably facilitating management of the reaction agents.

A ninetieth invention is directed toward the micropump according to the invention, characterized in that the memory input element means is a resistor which is provided beside the reaction agent and breaks a line by means of the heat derived from reaction of the reaction agent. Since the resistor is broken with reaction heat of the reaction agent, information about the usage of the reaction agent becomes reliable.

A ninety-first invention is directed toward the micropump according to the invention, characterized in that the reaction initiation section is heating means for heating the reaction agent; and the input element means is a resistor which is disposed beside the reaction agent and breaks a line by means of the heat applied from the reaction initiation section. Since the resistor is broken by the heat applied for reaction, information about the usage of the reaction agent becomes reliable.

An ninety-second invention is directed toward the micropump according to the invention, characterized in that the memory input element means is constituted of the reaction agent and an electrode; energization potential, a resistance value, or a dielectric constant is detected by the electrode; and an ON signal issued when the detected energization potential, resistance value, or dielectric constant has exceeded a threshold value is input to the memory IC. Information about use of the reaction agent is detected by means of energization potential, a resistance value, or a dielectric constant. Hence, a simple configuration, a low price, and easy detection can be achieved.

A ninety-third invention is directed toward the micropump according to the invention, characterized in that the memory IC is provided on the pump structural material and outputs used/unused information about the reaction agent when connected to the control section. Information about the used/unused state of a reaction agent can be added to the micropump, and management of the reaction agent for each micropump becomes considerably easy.

A ninety-fourth invention is directed toward the micropump according to any one of the inventions, characterized in that a flow passage through which a gas produced from the reaction agent flows is provided with a gas permeable film which permits passage of a gas from the flow passage when the pressure of the chamber and the pressure of the gas flowing through the channel becomes high. The pressure of the gas flowing inside of the pump can be made constant without rendering the pump structural material bulky.

A ninety-fifth invention is directed toward the micropump according to any one of the inventions, characterized in that a constant pressure chamber is provided in the flow passage through which the gas produced from the reaction agent flows, for inhibiting a sharp hike in the pressure of the chamber or the pressure of the gas flowing through the inside of the channel. The pressure of the gas flowing through the inside of the chamber can be made constant by forming only a space of predetermined volume even if a change has arisen in the volume of the gas attributable to the flow thereof.

A ninety-sixth invention is directed toward a sample processing chip comprising: a micropump defined in any one of the inventions; a flow passage control chip which is stacked on the micropump, supplies a sample by means of a gas ejected from the micropump, and controls a flow passage at this time; and a processing chip for processing a sample supplied from the flow passage control chip, wherein the control section controls a flow passage and/or processing of a sample. The micropump, the flow passage control chip, and the processing chip can be controlled in consideration of a processing state of the processing chip that processes a sample. Since the micropump, the flow passage control chip, and the processing chip, respectively, can be removed, any of them can be recycled in accordance with applications.

A ninety-seventh invention is directed toward the sample processing chip according the invention having the micropump, characterized in that the processing chip is provided with detection means for detecting a processing state of a sample; and wherein the control section interrupts control of the reaction initiation section when the processing state is beyond a predetermined extent. When an anomaly has arisen in the processing state of the processing chip, the control section stops reaction of the reaction agent, thereby stopping the processing.

A ninety-eighth invention is directed toward the sample processing chip according to the invention, characterized in that at least one of the flow passage control chip and the processing chip is provided with detection means for detecting a flowing state of the sample and/or the pressure of the sample and/or the pressure of a gas produced from the reaction agent; and the control section controls the reaction initiation section in accordance with a signal detected by the detection means the flow rate or pressure of at least either the flow passage control chip or the processing chip is detected, thereby determining the flow rate of the sample to be transported. The micropump, the flow passage control chip, and the processing chip can be controlled with high accuracy in accordance with at least either the flow rate of the flow passage control chip or that of the processing chip.

An ninety-ninth invention is directed toward the micropump according to the invention, characterized in that the detection means for detecting the flowing state is optical means, vibration detection means, or a fluid flow sensor. A flow rate can be detected easily.

A hundredth invention is directed toward the sample processing chip according to the invention, characterized in that detection means for detecting the pressure is a pressure sensor. Pressure can be detected readily.

A hundred-first invention is directed toward the sample processing chip according to any one of the inventions, characterized in that the detection means is removably attachable. Detection means can be recycled and is therefore economical.

A hundred-second invention is directed toward the sample processing chip according to any one of the inventions, characterized in that the flow passage control chip and the processing chip are assembled into one chip. Since the flow passage control chip and the processing chip are assembled into one chip, the chip can be made compact, slim, and easy to process.

A hundred-third invention is directed toward the sample processing chip according to any one of the inventions, characterized in that the micropump and the flow passage control chip are assembled in to one chip. Since the micropump and the flow passage control chip are assembled into one chip, the chip can be made compact, slim, and easy to process.

A hundred-fourth invention is directed toward the sample processing chip according to any one of the inventions, characterized in that the micropump, the flow passage control chip, and the processing chip are assembled into one chip. Since the micropump, the flow passage control chip, and the processing chip are assembled into one chip, the chip can be made further compact, slim, and easy to process.

A hundred-fifth invention is directed toward the sample processing chip according to any one of the inventions, characterized in that, when a processing chip for processing a predetermined sample is attached, control data pertaining to the predetermined sample stored in the storage section are read, thereby controlling the reaction initiation section in accordance with the target value. When a processing chip for a different sample is attached to the micropump, control data pertaining to the nature of the respective sample processing chip are read from the storage section and taken as target values, and the control is effected in accordance with the thus-read target values, thereby enhancing controllability and facilitating control.

A hundred-sixth invention is directed toward the sample processing chip according to the invention, characterized in that the constant pressure chamber reduces the internal pressure of the micropump when an opening is formed in the surface of the pump structural material and when a structural element attached to the pump structural material is separated. When the pump structural material is separated from the structural element, the opening of the constant-pressure chamber becomes exposed. Hence, the high-pressure gas is discharged from the opening, thereby improving safety.

A hundred-seventh invention is directed toward the sample processing chip according to the invention, characterized in that the pump structural material and the structural element to be attached to the pump structural material are attached together while a seal material is sandwiched therebetween; an elastic rib is provided on the surface of the seal material; and the internal pressure of the micropump is reduced when the structural element is separated. The internal gas can be smoothly relieved by means of elasticity of the elastic ribs.

A hundred-eighth invention is directed toward the sample processing chip according to the invention, characterized in that the pump structural material and the structural element to be attached to the pump structural material are attached together while a seal material is sandwiched therebetween; an elastic rib is provided on the surface of the pump structural material; and the internal pressure of the micropump is reduced when the structural element is separated. Internal gas can be smoothly relieved by means of elastic force developing between the rib and the seal material.

Many modifications and variations of the present invention are possible in the light of the above techniques. It is therefore to be understood that within the scope of the invention the invention may be practiced otherwise than as specifically described.

What is claimed is:

1. A micropump comprising:
   a pump structural material having a reaction chamber formed therein;
   a reaction agent which is housed in said reaction chamber and produces a gas of predetermined pressure; and
   a reaction initiation component which is disposed beside said reaction agent and causes said reaction agent to produce a gas, wherein:
   said pump structural material and said reaction initiation component are stacked one on top of the other,
   said reaction agent is liquid, said agent is housed in a microcapsule and said microcapsule is loaded in said reaction chamber,
   said reaction agent is formed from first and second liquids, said first liquid is housed in a microcapsule and dispersed in said second liquid.

2. The micropump according to claim 1, wherein:
   said pump structural material is formed by stacking a first structural material and a second structural material one on top of the other;
   an indentation section is formed in at least either the first or second structural material; and
   said first and second structural materials are stacked so as to oppose each other, thereby constituting said reaction chamber.

3. The micropump according to claim 1, wherein:
   said pump structural material is formed by stacking said structural material, a second structural material, a first intermediate structural material, and a second intermediate structural material;
   an opening to be used for attachment of at least said reaction agent is formed in said first intermediate structural material; and
   at least an opening which is to serve as a channel is formed in said second intermediate structural material.

4. The micropump according to claim 1, wherein:
   said pump structural material is formed by stacking said structural material, a first structural material, and a second structural material one on top of the other, and
   said reaction initiation component is provided within an indentation section of said first structural material.

5. The micropump according to claim 1, wherein a gas derived from reaction of said reaction agent is an inactive gas.

6. The micropump according to claim 1, wherein said reaction agent is a noncontaminating chemical.

7. The micropump according to claim 1, wherein said reaction agent is formed from a plurality of small reaction agents.

8. A micropump comprising:
   a pump structural material having a reaction chamber formed therein;

a reaction agent which is housed in said reaction chamber and produces a gas of predetermined pressure; and a reaction initiation component which is disposed beside said reaction agent and causes said reaction agent to produce a gas, wherein:

said pump structural material and said reaction initiation component are stacked one on top of the other, said reaction agent is liquid, said agent is housed in a microcapsule and said microcapsule is loaded in said reaction chamber, said pump structural material is formed by stacking a first structural material and a second structural material one on top of the other, an indentation section is formed in at least either the first or second structural material, said first and second structural materials are stacked so as to oppose each other, thereby constituting said reaction chamber, said reaction agent is housed in a first indentation section of said first structural material and covered with a sheet material, the reaction agent is formed from first and second liquids, said first and second liquids are housed in said first indentation section in a separated state, and said reaction initiation component releases said first and second liquids from a separated state, to thereby cause said liquids to react with each other.

9. A micropump comprising:
a pump structural material having a reaction chamber formed therein;
a reaction agent which is housed in said reaction chamber and produces a gas of predetermined pressure; and
a reaction initiation component which is disposed beside said reaction agent and causes said reaction agent to produce a gas, wherein:
said pump structural material and said reaction initiation component arc stacked one on top of the other,
said reaction agent is liquid, said agent is housed in microcapsules and said microcapsules are loaded in said reaction chamber, and
said reaction agent is formed from said first and second liquids, said first liquid is housed in a first microcapsule, and said first microcapsule is encapsulated in a second microcapsule along with said second liquid.

10. A micropump comprising:
a pump structural material having a reaction chamber formed therein;
a reaction agent which is housed in said reaction chamber and produces a gas of predetermined pressure; and
a reaction initiation component which is disposed beside said reaction agent and causes said reaction agent to produce a gas, wherein:
said pump structural material and said reaction initiation component are stacked one on top of the other,
said reaction agent is liquid, said agent is housed in microcapsules and said microcapsules are loaded in said reaction chamber,
said reaction agent is formed from first and second liquids, said first liquid and said second liquid are mixed together while said first liquid is encapsulated in a first microcapsule and second liquid is housed in a second microcapsule.

11. A micropump comprising:
a pump structural material having a reaction chamber formed therein;
a reaction agent which is housed in said reaction chamber and produces a gas of predetermined pressure;
reaction initiation component which is disposed beside said reaction agent and causes said reaction agent to produce a gas; and
a channel which is provided in said pump structural material and guides said gas of predetermined pressure produced by said reaction agent to an outlet from said reaction chamber, wherein:
said pump structural material and said reaction initiation component are stacked one on top of the other,
said reaction agent is liquid, said agent is housed in a microcapsule and said microcapsule is loaded in said reaction chamber, and
said reaction agent is formed from first and second liquids, said first liquid is housed in a microcapsule and dispersed in said second liquid.

12. A micropump comprising:
a pump structural material having a reaction chamber formed therein;
a reaction agent which is housed in said reaction chamber and produces a gas of predetermined pressure;
reaction initiation component which is disposed beside said reaction agent and causes said reaction agent to produce a gas; and
a channel which is provided in said pump structural material and guides said gas of predetermined pressure produced by said reaction agent to an outlet from said reaction chamber, wherein:
said pump structural material and said reaction initiation component are stacked one on top of the other,
said reaction agent is liquid, said agent is housed in microcapsules and said microcapsules are loaded in said reaction chamber, and
said reaction agent is formed from first and second liquids, said first liquid is housed in a first microcapsule, and said first microcapsule is encapsulated in a second microcapsule along with said second liquid.

13. A micropump comprising:
a pump structural material having a reaction chamber formed therein;
a reaction agent which is housed in said reaction chamber and produces a gas of predetermined pressure;
reaction initiation component which is disposed beside said reaction agent and causes said reaction agent to produce a gas; and
a channel which is provided in said pump structural material and guides said gas of predetermined pressure produced by said reaction agent to an outlet from said reaction chamber, wherein:
said pump structural material and said reaction initiation component are stacked one on top of the other,
said reaction agent is liquid, said agent is housed in microcapsules and said microcapsules are loaded in said reaction chamber, and
said reaction agent is formed from first and second liquids, said first liquid and said second liquid are mixed together while said first liquid is encapsulated in a first microcapsule and second liquid is housed in a second microcapsule.

* * * * *